(12) United States Patent
Miyata et al.

(10) Patent No.: US 7,656,590 B2
(45) Date of Patent: Feb. 2, 2010

(54) ZOOM LENS AND IMAGING APPARATUS

(75) Inventors: Masato Miyata, Shibuya-ku (JP); Kouki Hozumi, Shibuya-ku (JP); Ichikawa Keisuke, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 3 days.

(21) Appl. No.: 12/221,798

(22) Filed: Aug. 5, 2008

(65) Prior Publication Data

US 2009/0059388 A1 Mar. 5, 2009

(30) Foreign Application Priority Data

Sep. 3, 2007 (JP) ............................. 2007-227538
Sep. 3, 2007 (JP) ............................. 2007-227539

(51) Int. Cl.
*G02B 15/14* (2006.01)

(52) U.S. Cl. .................................... 359/686; 359/676

(58) Field of Classification Search .................. 359/676, 359/686
See application file for complete search history.

(56) References Cited

U.S. PATENT DOCUMENTS 5,576,890 A * 11/1996 Tanaka et al. ............... 359/686
5,585,970 A * 12/1996 Shibayama ................. 359/686
5,710,669 A * 1/1998 Endo .......................... 359/686

FOREIGN PATENT DOCUMENTS

JP 2005-055496 3/2005
JP 2005-156828 6/2005

* cited by examiner

*Primary Examiner*—Joseph Martinez
*Assistant Examiner*—James R Greece
(74) *Attorney, Agent, or Firm*—Kenyon & Kenyon LLP

(57) ABSTRACT

The invention relates to a zoom lens and an imaging apparatus, and more particularly to a slimmed-down zoom lens well fit for imaging apparatus inclusive of video cameras and digital cameras. The zoom lens comprises, in order from its object side, a first lens group having negative refracting power, a second lens group having positive refracting power, a third lens group having negative refracting power and a fourth lens group having positive refracting power. The first lens group consists of one negative component wherein one negative lens and one positive lens are cemented together. Upon zooming from the wide-angle end to the telephoto end and the second lens group moves toward the object side with a decreasing spacing between the first lens group and the second lens group, a changing spacing between the second lens group and the third lens group and a changing spacing between the third lens group and the fourth lens group.

56 Claims, 37 Drawing Sheets

(d)

(e)

(d)

(e)

(d)

(e)

(d)

(e)

(d)

(e)

(d)

(e)

(d)

(e)

(d)

(e)

- 61 Focal length change button
- 46 flush
- 45 shutter button
- 40 camera
- 43 finder optical system
- 60 カバー
- 44 finder optical path
- 42 taking optical path
- 41 imaging optical system

- 43 finder optical system
- 45 shutter button
- 61 focal length change button
- 47 liquid crystal display monitor
- 62 mode select switch

ZOOM LENS AND IMAGING APPARATUS

This application claims benefit of Japanese Application No. 2007-227538 filed in Japan on Sep. 3, 2007 and No. 2007-227539 filed in Japan on Sep. 3, 2007, the contents of which are incorporated by this reference.

BACKGROUND OF THE INVENTION

The present invention relates generally to a zoom lens and imaging apparatus, and more particularly to a zoom lens that is made much more compact and so lends itself to imaging apparatus inclusive of video cameras and digital cameras.

In recent years, attention has been paid to digital cameras as the next-generation cameras superceding film cameras. Those cameras have some wide categories from commercial high-end types to portable low-end types.

For digital cameras or video cameras falling under the portable low-end type category, there are mounting demands toward depth direction size reductions while making sure high image quality. The depth direction of a camera is significantly affected by the thickness of a lens system from an object-side surface to an imaging plane. Zoom lenses in particular tend to increase in terms of that thickness as images are being taken. For this reason, use of the so-called collapsible lens mount is now in vogue, in which the zoom lens is let out of a camera body as images are being taken while it is put away in the camera body as it is carried around.

Among compact zoom lenses so far known in the art, there is a so-called negative-power-ahead type zoom lens comprising, in order from its object side, a first lens group having negative refracting power, a second lens group having positive refracting power and a third lens group having positive refracting power, with its examples set forth in:

Patent Publication 1: JP(A)2002-142484
Patent Publication 2: JP(A)2003-177315
Patent Publication 3: JP(A)2007-65590

However, the zoom lens of Patent Publication 1 works against size reductions of a camera, because the first lens group having negative refracting power includes two lenses with an air spacing between them: the thickness of the first lens group on an optical axis is likely to increase, so that the thickness direction size of a lens barrel is not sufficiently thin even upon received at a lens mount.

The zoom lens of Patent Publication 2 may work for size reductions, because the first lens group having negative refracting power is made up of one negative lens. However, the use of one negative lens alone is likely to give rise to some considerable fluctuations of astigmatism and chromatic aberrations at the wide-angle end or during zooming, rendering it difficult to obtain high zoom ratios.

The zoom lens of Patent Publication 3 may work for size reductions and reductions of chromatic aberrations at the first lens group, because the first lens group having negative refracting power is made up of one lens component having a negative lens and a positive lens (the lens component here is defined as a lens block wherein surfaces contacting air on the optical axis are only two, i.e., an entrance surface and an exit surface). However, it works against making sure the angle of view and brightness because it is difficult to hold back fluctuations of astigmatism and so on.

In view of such problems as mentioned above, one object of the present invention is to provide a zoom lens that goes in favor of size reductions upon received at a lens mount, and enables optical performance to be easily kept intact even when the zoom ratio, brightness, and angle of view is ensured as desired.

Another object is to provide an imaging apparatus equipped with such a zoom lens.

SUMMARY OF THE INVENTION

To attain the aforesaid objects, the zoom lens of the invention basically comprises, in order from its object side, a first lens group having negative refracting power, a second lens group having positive refracting power, a third lens group having negative refracting power and a fourth lens group having positive refracting power, wherein the first lens group consists of one negative component wherein one negative lens and one positive lens are cemented together, and upon zooming from the wide-angle end to the telephoto end, the second lens group moves toward the object side and the third lens group moves with a decreasing spacing between the first lens group and the second lens group, a changing spacing between the second lens group and the third lens group and a changing spacing between the third lens group and the fourth lens group.

Thus, the location of the lens groups having negative refracting power on the object side works for diametrical size reductions of the zoom lens and size reductions of the zoom lens upon received at a lens mount. And the second lens group is moved toward the object side with a decreasing spacing with the first lens group thereby letting the second lens group have a zoom function.

For such a zoom lens, it is preferable that the first lens group is made up of one negative lens component wherein one negative lens and one positive lens are cemented together, because of facilitating reducing the thickness of the first lens group on an optical axis and preventing the first lens group from producing chromatic aberrations.

Because the negative lens is in contact with the positive lens, on the other hand, it is difficult to correct astigmatism. For this reason, the third lens group of negative refracting power is located on the image side of the second lens group of positive refracting power so that they can move with a changing spacing between them, facilitating correction of astigmatism fluctuations and correction of various aberrations such as chromatic aberrations by the adjustment of Petzval s sums. And the fourth lens group of positive refracting power is located on the image side of the third lens group of negative refracting power, thereby spacing an exit pupil from an image plane.

Thus, if some tweaks are made to the setup of the first lens group, the refracting power profile of the lens groups and how to move them, it is possible to achieve a zoom lens that, albeit being of compact size, facilitates holding back aberration fluctuations.

And in the first invention, when a near-intermediate zooming state is defined by any zooming state where the focal length of the whole zoom lens system is given by $0.9 \times \sqrt{(fw \cdot ft)}$ to $1.05 \times \sqrt{(fw \cdot ft)}$ where fw is the focal length of the whole zoom lens system at the wide-angle end and ft is the focal length of the whole zoom lens system at the telephoto end, the aforesaid third lens group satisfies the following condition in any near-intermediate zooming state:

$$\Delta 3G(s)/fw \leq 0 \tag{1}$$

where $\Delta 3G(s)$ is the positional difference of the third lens group at the wide-angle end relative to the near-intermediate zooming state provided that plus and minus signs are indicative of directions of travel of the lens groups toward the object side and the image side, respectively.

This is to make better correction of astigmatism fluctuations upon zooming due to the fact that the first lens group is set up in the form of one negative lens unit. In other words, the position of incidence of an off-axis light beam on the third lens group is spaced away from the optical axis near the intermediate zooming state so as to facilitate reducing field curvature fluctuations while the light beam travels from the wide-angle end to the telephoto end by way of the near-intermediate zooming state.

By positioning the third lens group in such a way not to exceed the upper limit to condition (1), it is easier to make correction of fluctuations upon zooming, and field curvature likely to occur in the near-intermediate zooming state as well.

More preferably, the upper limit to condition (1) should be set at −0.01.

More preferably, the lower limit to condition (1) should be set at −0.5 because of ease of prevention of interferences between the third lens group and the fourth lens group.

Further, the satisfaction of the following condition ensures more effective, easier correction of field curvature in the near-intermediate zooming state:

$$-0.2 < (D3(w)-D3(s))/fw < 0.3 \quad (2)$$

where D3(w) is the spacing between the third lens group and the fourth lens group at the wide-angle end, and D3(s) is the spacing between the third lens group and the fourth lens group in any near-intermediate zooming state that satisfies condition (1).

Abiding by the lower limit to condition (2) facilitates prevention of field curvature from remaining under-corrected, and abiding by the upper limit to condition (2) facilitates prevention of field curvature from remaining overcorrected.

More preferably, the lower and upper limits to condition (2) should be set at −0.1 and 0.2, respectively.

According to another aspect of the invention, the zoom lens of the invention is designed such that upon zooming from the wide-angle end to the telephoto end, the first lens group moves toward the image plane side, and then turns back and moves toward the object side, and when a zooming state at the shortest whole length is defined as one where the first lens group is positioned nearest to the image plane side upon zooming, the aforesaid third lens group satisfies the following condition:

$$\Delta 3G(s)/fw \leq 0 \quad (3)$$

where fw is the focal length of the whole zoom lens system at the wide-angle end, and $\Delta 3G(s)$ is the positional difference of the third lens group at the wide-angle end relative to the zooming state at the shortest whole length, provided that plus and minus signs are indicative of the directions of travel of the lens groups toward the object side and the image side, respectively.

By allowing the first lens group to move toward the image side, and then turn back and move toward the object side, it can have a compensator function while reducing an increase in the whole length even at an increased zoom ratio. And by abiding by the upper limit to condition (3) when the first lens group gets closest to the image plane, it is possible to correct fluctuations upon zooming. This also works for correction of field curvature likely to occur near the shortest zooming state.

More preferably, the upper and lower limits to condition (3) should be set at −0.01 and −0.5, respectively, because of ease of prevention of interferences between the third lens group and the fourth lens group.

It is further preferable that the focal length of the whole zoom lens system in the zooming state at the shortest whole length satisfies the following condition:

$$0.9 < fs/\sqrt{(fw \cdot ft)} < 1.10 \quad (3A)$$

where fs is the focal length of the whole zoom lens system in the zooming state where, upon zooming, the first lens group is positioned nearest to the image plane side, and ft is the focal length of the whole zoom lens system at the telephoto end.

Abiding by the lower limit to condition (3A) facilitates holding back an increase in the whole length on the telephoto side, and abiding by the upper limit to condition (3A) facilitates holding back an increase in the whole length on the wide-angle side and makes it easy to obtain the effect of the third lens group on correction of field curvature.

Satisfaction of the following condition ensures more effective correction of field curvature.

$$-0.2 < (D3(w)-D3(s))/fw < 0.3 \quad (4)$$

where D3(w) is the spacing between the third lens group and the fourth lens group at the wide-angle end, and D3(s) is the spacing between the third lens group and the fourth lens group in the zooming state at the shortest whole length.

More preferably, the lower and upper limits to condition (4) should be set at −0.1 and 0.2, respectively.

Further, as the amount of movement of the first lens group satisfies the following condition, it ensures more effective correction of field curvature.

$$-0.5 < \Delta 1G(s)/fw < -0.1 \quad (5)$$

where $\Delta 1G(s)$ is the positional difference of the first lens group at the wide-angle end relative to the zooming state at the shortest whole length provided that plus and minus signs are indicative of the directions of travel of the lens groups toward the object side and the image side, respectively.

It is preferable to abide by the lower limit to condition (5), because the amount of movement of the first lens group on the wide-angle side is decreased to keep fluctuations of aberrations or the like in check. Abiding by the upper limit to condition (5) ensures the amount of movement of the first lens group on the wide-angle side; this facilitates maintaining the compensator function of the first lens group on the wide-angle side, and makes it easy to move the third lens group for correction of aberrations as well.

More preferably, the lower and upper limits to condition (5) should be set −0.4 and −0.2, respectively.

According to yet another aspect of the invention, the third lens group moves toward the image plane side, and then turns back and moves to the object side.

By moving the third lens group the first thing toward the image plane side, off-axis light beams incident on the third lens group gain height, going in favor of correction of the amount of fluctuations of astigmatism and so on upon zooming. And the influences of astigmatism wane on the telephoto side; if the third lens group is turned back and moved toward the object side, it then enables the height of incidence of the off-axis light beams to grow low, going in favor of diameter reductions of the third lens group.

Further, satisfaction of the following condition ensures more effective correction of field curvature.

$$-0.2 < (D3(w)-D3(s))/fw < 0.3 \quad (6)$$

where D3(w) is the spacing between the third lens group and the fourth lens group at the wide-angle end, D3(s) is the spacing between the third lens group and the fourth lens group in the zooming state where the third lens group is positioned nearest to the image plane side, and fw is the focal length of the zoom lens at the wide-angle end.

Abiding by the lower limit to condition (6) facilitates prevention of field curvature from under-correction, and abiding by the upper limit to condition (6) facilitates prevention of field curvature from overcorrection.

More preferably, the lower and upper limits to condition (6) should be set at −0.1 and 0.2, respectively.

In each of the inventions according to the aforesaid aspects, it is preferable to satisfy the aforesaid requirements at the same time, because a small-format zoom lens that is more reduced in terms of field curvature and astigmatism fluctuations is achievable, working more for making sure zoom ratios, brightness, and angles of view.

In any of the aforesaid inventions, it is further preferable to satisfy the following requirements singly or at the same time, because the zoom lens performs much better, grows much smaller, and costs much lower.

$$0.1 < \Sigma G1d/fw < 0.25 \qquad (7)$$

where $\Sigma G1d$ is the thickness of the first lens group on the optical axis, and fw is the focal length of the whole zoom lens system at the wide-angle end.

Condition (7) is to define the preferable thickness of the first lens group. Abiding by the lower limit to condition (7) works for making sure the axial thickness of the positive lens and the edge thickness of the negative lens in the first lens group and ensuring the refractive power of each lens, going in favor of reductions of aberrations. Abiding by the upper limit to condition (7) goes in favor of size reductions of the zoom lens upon received in a lens amount, because the first lens group is slimmed down.

More preferably, the lower and upper limits to condition (7) should be set at 0.12 and 0.22, respectively.

It is further preferable that the lens surface located nearest to the image side in the first lens group is a concave surface, and that lens surface is an aspheric surface. This is effective for correction of astigmatism and coma at the first lens group.

It is also preferable that the lens surface located nearest to the object side in the first lens group is a concave surface, and that lens surface is an aspheric surface having negative refracting power decreasing with a distance from the optical axis. This facilitates making sure the first lens group has negative refracting power, going in favor of correction of axial aberrations on the telephoto side. This also works for size reductions and slimming-down, and reductions of distortion on the wide-angle wide as well, because the aspheric surface holds back the amount of bulging of the peripheral portion from the concave surface on the object side.

Preferably, the positive lens in the first lens group is made of a resin material. More preferably, the positive lens in the first lens group is made of an energy-curing type resin, and the negative lens component in the first lens group has the positive lens formed directly on its lens surface.

If an organic material such as resin or an organic material with inorganic fine materials dispersed in it to vary its optical performance is used as the optical material for the positive lens in the first lens group, it then facilitates processing into thin lenses. To make the lens as thin as possible, it is preferable to rely upon a method wherein the energy-curing type resin such as an ultraviolet-curing type resin is used and formed directly on the negative lens to fabricate a cemented lens, because when the cementing surface is in an aspheric shape, its fabrication is facilitated.

Preferably, the cementing surface of the positive and negative lenses in the first lens group is in an aspheric shape. Configuring the cementing surface of the positive and negative lenses as an aspheric shape allows for effective correction of fluctuations of astigmatism and chromatic aberrations produced at the first lens group upon zooming. If the positive lens is molded of resin, then it facilitates fabrication of such an aspheric cementing surface.

Preferably, the following condition is satisfied.

$$30 < (vdL1n - vdL1p) < 50 \qquad (8)$$

where vdL1n is the Abbe constant of the negative lens in the first lens group, and vdL1p is the Abbe constant of the positive lens in said first lens group.

Condition (8) is to define the preferable material for the first lens group. Abiding by the lower limit to condition (8) facilitates correction of chromatic aberrations of the first lens group, and abiding by the upper limit to condition (8) goes in favor of the availability of material combinations for the positive and negative lens and productivity.

More preferably, the lower and upper limits to condition (8) should be set at 33 and 40, respectively.

Preferably, the second lens group is made up of, in order from the object side, a positive lens component having positive refracting power and a negative lens component having negative refracting power. Such minimum lens components count is capable of holding back various aberrations such as spherical aberrations, chromatic aberrations, astigmatism and coma produced at the second lens group, going in favor of size reductions and slimming-down.

Preferably, the second lens group is made up of, in order from the object side, a lens unit having positive refracting power and a lens unit having negative refracting power, because the front principal point can get closer to the object side of the second lens group so that it can get closer to the first lens group at the telephoto end, going in favor of zoom sharing with the amount of movement of the second lens group.

The second lens group takes a main zooming role: to let it have higher optical performance, aberrations within the second lens group should have been well corrected. For the second lens group it is thus preferable to comprise two positive lenses and one negative lens, thereby making sure good enough correction of aberrations such as spherical aberrations, astigmatism and coma. The incorporation of a cemented lens in the second lens group is also effective for correction of axial chromatic aberration and chromatic aberration of magnification.

Further, if the second lens group is made up of, in order from the object side, a first positive lens and a cemented lens of a second positive lens and a negative lens, then it works for bringing the front principal point in front of the second lens group.

Alternatively, the second lens group may as well be made up of, in order from the object side, one positive lens and one negative lens, because correction of spherical aberrations, astigmatism, chromatic aberrations and coma is facilitated while the thickness of the second lens group on the optical axis is reduced, and because the principal points are easily brought more on the object side, going in favor of making sure zoom ratios. More preferably in this case, the second lens group is made up of a double-convex positive lens and a negative meniscus lens convex on its object side, working more for reducing aberrations and making sure zoom ratios while taking hold of positive refracting power.

Further and more preferably, the following conditions are satisfied.

$$ndL2p > 1.65 \tag{10A}$$

$$vdL2p > 40.0 \tag{10B}$$

$$vdL2n < 30.0 \tag{10C}$$

where ndL2p is the d-line refractive index of the positive lens in the second lens group, vdL2p is the Abbe constant of the positive lens in the second lens group, and vdL2n is the Abbe constant of the negative lens in said second lens group.

Allowing the positive lens in the second lens group to abide by the lower limit to condition (10A) makes it easy to hold back the occurrence of astigmatic at the third lens group. Letting the positive lens in the second lens group abide by the lower limit to condition (10B), and the negative lens abide by the upper limit to condition (10C) goes in favor of correction of axial chromatic aberration and chromatic aberration of magnification at the third lens group.

Preferably, the lower limit to condition (10A) should be set at 1.68. A lens material that satisfies the upper limit to condition (10A) here is still available; however, it is more preferable to reduce that upper limit down to 2.2 or lower, because fabrication errors for surface shape are easily eased.

Preferably, the lower limit to condition (10B) should be set at 45. A lens material that satisfies the upper limit to condition (10B) is still available; however, it is more preferable to reduce that upper limit down to 75 or lower, because the influences of anomalous dispersion of the material are diminished.

Preferably, the upper limit to condition (10C) should be set at 25. A lens material that satisfies the lower limit to condition (10C) is still available; however, it is more preferable to reduce that lower limit down to 17 or more, because of availability.

Preferably, the lens surface located nearest to the object side in the second lens group is an aspheric surface. An axial light beam diverges and strikes on the surface located nearest to the object side in the second lens group: configuring that surface as an aspheric surface is effective for correction of spherical aberrations.

As that aspheric surface is configured in such a way as to have positive refracting power getting small with a distance from the optical axis, it is effective for size reductions of the second lens group while keeping the occurrence of spherical aberrations in check.

Preferably, the negative lens in the third lens group has at least one aspheric surface. Then, this aspheric surface is preferably the image plane-side lens surface of the negative lens. At the negative lens in the third lens group, there is a likely large difference in ray height between an off-axis chief ray passing through its outermost side at the wide-angle end and an off-axis chief ray passing through its outermost side at the telephoto end: the location of the aspheric surface works more for adjustment of fluctuations of astigmatism and distortion upon zooming. This also goes more in favor of effective adjustment of fluctuations of aberrations, because the height of the incident off-axis chief ray from the optical axis grows higher at the image plane-side surface than at the object-side surface of the negative lens.

Preferably, the negative lens in the third lens group is made of a resin material. Even the resin material is capable of correction of aberrations on practicable levels, contributing to making zoom lenses less costly. Processing into aspheric surfaces is also easy.

Preferably, the following condition is satisfied:

$$2.2 < \{\beta 2(t)/\beta 2(w)\}/\{\beta 3(t)/\beta 3(w)\} < 3.0 \tag{11}$$

where $\beta 2(t)$ is the transverse magnification of the second lens group at the telephoto end, $\beta 2(w)$ is the transverse magnification of the second lens group at the wide-angle end, $\beta 3(t)$ is the transverse magnification of the third lens group at the telephoto end, and $\beta 3(w)$ is the transverse magnification of the third lens group at the wide-angle end.

Condition (11) is to define the preferable contribution of the second and third lens groups to zooming. Abiding by the lower limit to condition (11) keeps the contribution of the third lens group to zooming appropriately in check, making it easier to obtain the effect on correction of field curvature. Abiding by the upper limit to condition (11) keeps the contribution of the second lens group appropriately in check, facilitating reductions of the influences of deterioration of the second lens group due to assembling errors. Alternatively, this makes sure the contribution of the third lens group to zooming, working for ensuring zoom ratios.

Preferably, the lower and upper limits to condition (11) should be set at 2.4 and 2.8, respectively.

Preferably, the fourth lens group is made up of one positive lens. Even such a minimum lenses count is capable of correction of aberrations on practicable levels, working for size reductions and slimming-down.

Preferably, the positive lens in the fourth lens group has at least one aspheric surface. Preferably, that aspheric surface is the image plane-side lens surface of the positive lens. At the positive lens in the fourth lens group, there is a large difference in ray height between an off-axis chief ray passing through its outermost side at the wide-angle end and an off-axis chief ray passing through its outermost side at the telephoto end: the location of the aspheric surface works more for adjustment of fluctuations of astigmatism and distortion upon zooming. This also goes more in favor of effective adjustment of fluctuations of aberrations, because the height of the incident off-axis chief ray from the optical axis grows higher at the image plane-side surface than at the object-side surface of the negative lens.

Preferably, the positive lens in the fourth lens group is made of a resin material. Even the resin material is capable of correction of aberrations on practicable levels, contributing to making zoom lenses less costly. Processing into aspheric surfaces is also easy.

Preferably, the fourth lens group is positioned more on the image side at the telephoto end than at the wide-angle end. This allows the fourth lens group to have also a zooming function, going more in favor of making sure zoom ratios.

The aforesaid zoom lens may be used as a taking optical system for imaging apparatus.

The aforesaid zoom lens is preferably used for imaging apparatus employing an imaging device susceptible of oblique incidence of light, because the exit pupil is easily separate from the image plane.

That is, the imaging apparatus of the invention comprises a zoom lens and an imaging device located on the image side of the zoom lens and adapted to convert an image formed by the zoom lens into electrical signals, wherein said zoom lens is any one of the aforesaid zoom lenses.

The arrangement being like such, it is possible to obtain an imaging apparatus of high performance that is reduced in size upon received at a lens mount.

Preferably, the following condition is satisfied.

$$-1.2 < Hf2/Y < -0.7 \tag{9}$$

where Hf2 is the distance on the optical axis from the object-side lens surface in the second lens group to the front principal point of the second lens group, provided that there is a minus sign involved when the front principal point is on an object side with respect to the second lens group, and Y is the maximum image height within a possible effective imaging area.

If the first lens group is made up of one negative lens component to slim down the first lens group and the zoom ratio is ensured while reducing the amount of movement of the second lens group having a main zooming function, it is then possible to reduce the amount of movement of the second lens group, leading to a size reduction of the lens barrel for movement and, hence, resulting in the ability to receive the zoom lens at a lens mount in a more compact fashion.

Condition (9) is to define the preferable principal point position of the second lens group: it is to reduce the amount of movement of the second lens group while making sure the zooming function of the second lens group. Placing the front principal point position of the second lens group in front of the second lens group permits the amount of movement of the second lens group to be reduced upon zooming.

Abiding by the upper limit to condition (9) makes sure bringing the principal point position on the object side with respect to the second lens group, working for the size reduction and slimming-down of the zoom lens, and abiding by the lower limit to condition (9) prevents the principal point from getting too close to the object side, making it easy to prevent deterioration of performance due to decentration.

More preferably, the lower and upper limits to condition (9) should be set at −1.0 and −0.75, respectively.

The imaging apparatus may comprise an image processor adapted to implement signal processing for correction of aberrations contained in electrical signals. Permission of aberrations of the zoom lens works more for further size reductions.

When the zoom lens has a focusing function, each of the aforesaid conditions may be applied to where focusing is on the longest distance.

Focusing from a far object to a nearby object may be implemented by letting out the first lens group, letting out the whole zoom lens, moving the second, the third and the fourth lens group, and so on. To reduce loads on driving, focusing should preferably be implemented with the third lens group of negative refracting power or the fourth lens group of positive refracting power.

Further, the imaging apparatus of the invention includes a zoom lens basically comprising, in order from its object side, a first lens group having negative refracting power, a second lens group having positive refracting power, a third lens group having negative refracting power and a fourth lens group having positive refracting power, wherein the first lens group is made up of one negative lens where one negative lens and one positive lens are cemented together, and upon zooming, there is a decreasing spacing between the first lens group and the second lens group, there is a changing spacing between the second lens group and the third lens group, and there is a changing spacing between the third lens group and the fourth lens group.

Thus, the location of the lens groups having negative refracting power on the object side works for diametrical size reductions of the zoom lens and size reductions of the zoom lens upon received at a lens mount. And the spacing between the first lens group and the second lens group is narrowed thereby letting the second lens group have a zooming function.

For such a zoom lens, it is preferable that the first lens group is made up of one negative lens component where one negative lens and one positive lens are cemented together, because of facilitating reducing the thickness of the first lens group on the optical axis and preventing the first lens group from producing chromatic aberrations. Because the negative lens is in contact with the positive lens, on the other hand, it is difficult to correct astigmatism.

For this reason, the third lens group of negative refracting power is located on the image side of the second lens group of positive refracting power so that they can move with a changing spacing between them. It is thus easy to make correction of astigmatism fluctuations and correction of various aberrations such as chromatic aberrations by adjustment of Petzval s sums.

And the fourth lens group of positive refracting power is located on the image side of the third lens group of negative refracting power, thereby spacing an exit pupil from an image plane.

Thus, if some tweaks are made to the setup of the first lens group, the refracting power profile of the lens groups and how to move them, it is possible to achieve an imaging apparatus equipped with a zoom lens that, albeit being of compact size, facilitates holding back aberration fluctuations.

As the first lens group is made up of one negative component, on the other hand, it causes the rear principal point position of the first lens group to lie almost halfway across the first lens group: to offer a sensible tradeoff between making sure zoom ratios and size reductions, it is preferable to place the front principal point of the second lens group in front thereby satisfying the following condition.

$$-1.2 < Hf2/Y < -0.7 \tag{12}$$

where Hf2 is the distance on the optical axis from the object-side lens surface in the second lens group to the front principal point of the second lens group, provided that there is a minus sign involved when the front principal point is on an object side with respect to the second lens group, and Y is the maximum image height within a possible effective imaging area.

Condition (12) is to define the preferable principal point of the second lens group: it is to facilitate holding back the amount of movement of the second lens group while making sure the second lens group has a zooming function.

Placing the front principal point of the second lens group having a zooming function appropriately on the object side (the front side) works for reductions of the whole length of the zoom lens, because it is easy to make sure the zoom sharing of the second lens group without increasing the spacing between the first and second lens groups at the wide-angle end.

Abiding by the upper limit to condition (12) shifts the principal points to the object side, working for the size reduction and slimming-down of the zoom lens, and abiding by the lower limit to condition (12) prevents the principal points from getting too close to the object side, facilitating holding back performance deterioration due to decentration.

More preferably, the lower and upper limits to condition (12) should be set at −1.0 and −0.75, respectively.

Further, satisfaction of the foregoing requirements singly or in combination works more for size reductions, high performance and low cost.

Preferably, the following condition is satisfied.

$$0.1 < \Sigma G1d/fw < 0.25 \qquad (7)$$

where ΣG1d is the thickness of the first lens group on the optical axis, and fw is the focal length of the whole zoom lens system at the wide-angle end.

Condition (7) is to define the preferable thickness of the first lens group. Abiding by the lower limit to condition (7) works for making sure the axial thickness of the positive lens and the edge thickness of the negative lens in the first lens group: it facilitates making sure the refracting power of each lens, going in favor of aberration reductions. Abiding by the upper limit to condition (7) enables the first lens group to be slimmed down, going in favor of size reductions of the zoom lens upon received at the lens mount.

More preferably, the lower and upper limits to condition (7) should be set at 0.12 and 0.22, respectively.

More preferably, the lens surface located nearest to the image side in the second lens group should be concave, and that lens surface should be aspheric, because of getting more effective for correction of astigmatism and coma at the first lens group.

Preferably, the lens surface located nearest to the object side in the first lens group is concave, and that lens surface is an aspheric surface having negative refracting power decreasing with a distance from the optical axis. This arrangement facilitates making sure the first lens group has negative refracting power, going in favor of correction of axial aberrations on the telephoto side. The use of the aspheric surface is also helpful for reducing the amount of bulging of the peripheral portion from the concave surface on the object side, going in favor of size reductions and slimming-down, and reductions of distortion on the wide-angle side as well.

Preferably, the positive lens in the first lens group is formed of a resin material. More preferably, the positive lens in the first lens group should be formed of an energy-curing type resin material, and the negative lens component in the first lens group should have a positive lens directly formed on the lens surface of a negative lens.

If an organic material such as resin or an organic material with inorganic fine particles dispersed in it to vary its optical properties is used as the optical material for the positive lens in the first lens group, it then facilitates processing into a thin lens. And, to reduce lens thickness as much as possible, it is preferable to use an energy-curing type resin such as an ultraviolet-curing type resin and form a cemented lens by forming it directly on the negative lens, because the cemented lens is more easily fabricated even with an aspheric cementing surface.

Preferably, the cementing surface of the positive lens and negative lens in the first lens group is aspheric. By configuring the cementing surface of the positive lens and negative lens as the aspheric surface, it is possible to make good enough correction of fluctuations of astigmatism and chromatic aberrations occurring at the first lens group upon zooming. If the positive lens is molded of resin, such an aspheric cementing surface is also easy to fabricate.

It is preferable to satisfy the following condition (8).

$$30 < (vdL1n - vdL1p) < 50 \qquad (8)$$

where vdL1n is the Abbe constant of the negative lens in the first lens group, and vdL1p is the Abbe constant of the positive lens in said first lens group.

Condition (8) is to define the preferable material for the first lens group. Abiding by the lower limit to condition (8) facilitates correction of chromatic aberrations at the first lens group. Abiding by the upper limit to condition (8) goes in favor of the availability and productivity of positive and negative lens combinations.

More preferably, the lower and upper limits to condition (8) should be set at 33 and 40, respectively.

Preferably, the second lens group comprises, in order from the object side, a positive lens component having positive refracting power and a negative lens component having negative refracting power. This minimum lens components count capable of holding back various aberrations such as spherical aberrations, chromatic aberrations, astigmatism and coma goes in favor of size reductions and slimming-down.

Further, if the second lens group is made up of, in order from the object side, a lens unit having positive refracting power and a lens unit having negative refracting power, it is then possible to bring the front principal point position closer to the object side of the second lens group and bring that principal point closer to the first lens group at the telephoto end, going in favor of making sure zoom sharing with respect to the amount of movement of the second lens group.

Preferably, the second lens group is made up of, in order from the object side, a first positive lens, and a cemented lens of a second positive lens and a negative lens. The second lens group, because of being a main zooming one, may as well have been corrected for aberrations occurring inside to make sure much higher optical performance. Therefore, the second lens group is made up of two positive lenses and one negative lens for the purpose of good enough correction of various aberrations such as spherical aberrations, astigmatism and coma. The incorporation of the cemented lens also gets effective of correction of longitudinal chromatic aberration and chromatic aberration of magnification.

If the second lens group is made up of, in order from the object side, the first positive lens, and the cemented lens of the second positive lens and negative lens, it also works for bringing the front principal point position in front of the second lens group.

Alternatively, the second lens group may be made up of, in order from the object side, one positive lens and one negative lens. This arrangement facilitates correction of spherical aberrations, astigmatism, chromatic aberrations, coma and so on while reducing the axial thickness of the second lens group, and goes in favor of making sure zoom ratios as well, because it is easy to bring the principal points closer to the object side.

More specifically, if the second lens group is made up of a double-convex positive lens and a negative meniscus lens convex on its object side, it then goes more in favor of reducing aberrations and making sure zoom ratio while taking hold of positive refracting power.

It is further preferable to satisfy the following conditions:

$$ndL2p > 1.65 \qquad (10A)$$

$$vdL2p > 40.0 \qquad (10B)$$

$$vdL2n < 30.0 \qquad (10C)$$

where ndL2p is the d-line refractive index of the positive lens in the second lens group, vdL2p is the Abbe constant of the positive lens in the second lens group, and vdL2n is the Abbe constant of the negative lens in said second lens group.

Letting the positive lens in the second lens group abide by the lower limit to condition (10A) facilitates preventing the third lens group from producing astigmatism. Letting the positive lens in the second lens group abide by the lower limit to condition (10B) and the negative lens abide by the upper limit to condition (10C) goes in favor of correction of longitudinal chromatic aberration and chromatic aberration of magnification at the third lens group.

More preferably, the lower limit to condition (10A) should be set at 1.68. There is an upper limit to condition (10A) indicative of a lens material from which lenses may be fabricated; however, that upper limit should be set at 2.2 or lower because fabrication errors may be allowed for surface shape.

More preferably, the lower limit to condition (10B) should be set at 45. There is an upper limit to condition (10B) indicative of a lens material from which lenses may be fabricated; however, that upper limit should be set at 75 or lower because the influences of the anomalous dispersion of the material are kept more in check.

More preferably, the upper limit to condition (10C) should be set at 25. There is a lower limit to condition (10C) indicative of a lens material from which lenses may be fabricated; however, that lower limit should be set at 17 or more because of material availability.

Preferably, the lens surface located nearest to the object side in the second lens group is aspheric. Axial light beams diverge and strike upon the surface located nearest to the object side in the second lens group; the use of the aspheric surface there gets effective for correction of spherical aberrations.

It is effective to configure that aspheric surface to have positive refracting power decreasing with a distance from the optical axis, because it works for diminishing the size of the second lens group while keeping the occurrence of spherical aberrations in check.

Preferably, the third lens group is made up of one negative lens. Even this minimum lens count is capable of correction of aberrations on a practical level, going in favor of size reductions and slimming-down.

Preferably, the negative lens in the third lens group has at least one aspheric surface applied to its image plane-side surface. Regarding the negative lens in the third lens group, there is a likely increasing difference in ray height between an off-axis chief ray passing through its outermost side at the wide-angle end and an off-axis chief ray passing through its outermost side at the telephoto end; the location of the aspheric surface there works for adjustment of fluctuations of astigmatism and distortion upon zooming. In addition, it is possible to implement more effective adjustment of aberration fluctuations, because incident off-axis chief rays from the optical axis gain a lot more height on the image plane-side surface than on the object-side surface.

Preferably, the negative lens in the third lens group is formed of resin. Even the resin material is capable of correction of aberrations on a practical level, contributing to making the zoom lens less costly. It also makes aspheric processing easier.

It is preferable to satisfy the following condition (11).

$$2.2 < \{\beta 2(t)/\beta 2(w)\}/\{\beta 3(t)/\beta 3(w)\} < 3.0 \quad (11)$$

where $\beta 2(t)$ is the transverse magnification of the second lens group at the telephoto end, $\beta 2(w)$ is the transverse magnification of the second lens group at the wide-angle end, $\beta 3(t)$ is the transverse magnification of the third lens group at the telephoto end, and $\beta 3(w)$ is the transverse magnification of the third lens group at the wide-angle end.

Condition (11) is to define the preferable ratio of the second and third lens groups contributing to zooming. Abiding by the lower limit to condition (11) keeps the contribution of the third lens group to zooming moderately in check, making it easy to obtain effects on correction of field curvature. Abiding by the upper limit to condition (11) keeps the contribution of the second lens group to zooming moderately in check, facilitating reducing the influences on performance deterioration of assembly errors of the second lens group. Otherwise, it makes sure the contribution of the third lens group to zooming, going in favor of making sure zoom ratios.

More preferably, the lower and upper limits to condition (11) should be set at 2.4 and 2.8, respectively.

Preferably, the fourth lens group is made up of one positive lens. Even this lenses count is capable of correction of aberrations on a practical level, going in favor of size reductions and slimming-down.

Preferably, the positive lens in the fourth lens group has at least one aspheric surface applied to its image plane-side surface. Regarding the positive lens in the fourth lens group, there is an increasing difference in ray height between an off-axis chief ray passing through its outermost side at the wide-angle end and an off-axis chief ray passing through its outermost side at the telephoto end; the location of the aspheric surface there works for reductions of fluctuations of astigmatism and distortion upon zooming, particularly because incident off-axis chief rays from the optical axis gain a lot more height on the image plane-side surface than on the object-side surface.

Preferably, the positive lens in the fourth lens group is formed of resin. Even the resin material is capable of correction of aberrations on a practical level, contributing to making the zoom lens less costly. It also makes aspheric surface formation easier.

Preferably, the fourth lens group is positioned more on the image side at the telephoto end than at the wide-angle end. This allows the fourth lens group to have also a zooming function, going more in favor of making sure zoom ratios.

Preferably, the aperture stop is interposed between spaces on the object and image sides of the second lens group in such a way as to move in unison with the second lens group. As a result, it is easy to diminish the size of the second lens group even when it has a main zooming function, going in favor of size reductions as the zoom lens is put away, and reductions of aberrations at the second lens group.

Preferably, the first, the second, the third, and the fourth lens group moves as described below. Upon zooming from the wide-angle end to the telephoto end, the first lens group moves toward the image plane side, and then turns back and moves; the second lens group moves toward the object side; the third lens group moves such that its distance from the second lens group grows longer at the telephoto end than at the wide-angle end; and the fourth lens group moves more toward the image plane side at the telephoto end than at the wide-angle end.

The first lens group is designed to move first toward the image plane side on the wide-angle side; this gives the second lens group the zooming function even with a reduced amount of movement of the second lens group toward the object side. At the same time, fluctuations of the exit pupil on the wide-angle side are reduced, too, so that height fluctuations of light rays incident on the third lens group can be kept more in check and correction of off-axis aberrations is easier. And on the telephoto side the first lens group moves toward the object side, going more in favor of making sure a moving space for the second lens group, and zoom ratios as well.

Movement of the fourth lens group also allows it to have a zooming function, going in favor of gaining higher zoom ratios while holding back fluctuations of aberrations, and movement of the third lens group during zooming works for adjustment of off-axis light rays incident on the third lens group, and reductions of fluctuations of field curvature.

When any zooming state where the focal length of the whole zoom lens system becomes from $0.95 \times \sqrt{(fw \cdot ft)}$ to $1.05 \times \sqrt{(fw \cdot ft)}$ is defined as a near-intermediate zooming state, the first, the second, the third, and the fourth lens group moves in such a way as to satisfy the following conditions in any near-intermediate zooming state.

$$-0.6 < \Delta 1GWS/fw < -0.1 \qquad (13)$$

$$-4.0 < \Delta 1GWS/\Delta 1GST < -0.25 \qquad (14)$$

$$0.3 < \Delta 2GWS/\Delta 2GST < 0.95 \qquad (15)$$

$$-20.0 < \Delta 3GWS/\Delta 3GST < 0.5 \qquad (16)$$

$$-0.5 < \Delta 4GST/\Delta 4GWS < 1.5 \qquad (17)$$

where $\Delta 1GWS$ is a positional difference of the first lens group at the wide-angle end relative to the near-intermediate zooming state, $\Delta 2GWS$ is a positional difference of the second lens group at the wide-angle end relative to the near-intermediate zooming state, $\Delta 3GWS$ is a positional difference of the third lens group at the wide-angle end relative to the near-intermediate zooming state, $\Delta 4GWS$ is a positional difference of the fourth lens group at the wide-angle end relative to the near-intermediate zooming state, $\Delta 1GST$ is a positional difference of the first lens group at the telephoto end relative to the near-intermediate zooming state, $\Delta 2GST$ is a positional difference of the second lens group at the telephoto end relative to the near-intermediate zooming state, $\Delta 3GST$ is a positional difference of the third lens group at the telephoto end relative to the near-intermediate zooming state, and $\Delta 4GST$ is a positional difference of the fourth lens group at the telephoto end relative to the near-intermediate zooming state, provided that plus and minus signs are indicative of the directions of travel of the lens groups toward the object side and the image side, respectively, $\Delta 3GST$ is a positive value, $\Delta 4GWS$ is a negative value, and fw is a focal length of the zoom lens at the wide-angle end.

Condition (13) is to define the preferable movement of the first lens group. Abiding by the lower limit to condition (13) prevents the amount of movement of the first lens group toward the image side from growing too large and so curtails its total length at the wide-angle end, working for diametrical size reductions of the first lens group. Abiding by the upper limit to condition (13) makes sure the amount of movement of the first lens group toward the image side and ensures the load on zooming of the first lens group with respect to the amount of movement of the second lens group on the wide-angle side; this is preferable in view of making sure zoom ratios and reductions of aberration fluctuations.

More preferably, the lower and upper limits to condition (13) should be set at −0.5, especially −0.4 and −0.15, especially −0.2, respectively.

Condition (14) is to define the preferable movement of the first lens group. Abiding by the lower limit to condition (14) curtails its whole length at the wide-angle end, going in favor of size reductions, and abiding by the upper limit to condition (14) curtails its whole length at the telephoto end, going in favor of size reductions.

More preferably, the lower and upper limits to condition (14) should be set at −3.0, especially −2.5 and −0.33, especially −0.4, respectively.

Condition (15) is to define the preferable movement of the second lens group. Abiding by the lower limit to condition (15) makes sure a suitable amount of movement of the second lens group on the wide-angle end, going in favor of making sure zoom ratios and the function of the third lens group of correcting field curvature. Abiding by the upper limit to condition (15) prevents the amount of movement of the second lens group from growing too large on the wide-angle side; this is preferable in view of aberration correction, because fluctuations of the position of the third lens group on which off-axis light rays strike are held back.

More preferably, the lower and upper limits to condition (15) should be set at 0.4, especially 0.5 and 0.90, especially 0.80, respectively.

Condition (16) is to define the preferable movement of the third lens group. Abiding by the lower limit to condition (16) prevents the third lens group from moving overly toward the image side on the wide-angle side, going in favor of correction of field curvature. This is also preferable to make sure a space for the movement of the fourth lens group as it is let out for focusing. Otherwise, this may be preferable for size reductions, because the effective diameter of the fourth lens group is easily curtailed on the telephoto side. Abiding by the upper limit to condition (16) goes in favor of making sure the function of the third lens group of correcting field curvature.

More preferably, the lower and upper limits to condition (16) should be set at −10.0, especially −5.0, more especially −3.0 and 0.2, especially 0, more especially −0.03, respectively.

Condition (17) is to define the preferable movement of the fourth lens group. Abiding by the lower and upper limit ranges given by condition (17) goes in favor of making sure zoom ratios while holding back aberration fluctuations by the movement of the fourth lens group on the wide-angle side. Abiding by the upper limit to condition (17) works for curtailing the whole length of the fourth lens group at the wide-angle end.

More preferably, the lower and upper limits to condition (17) should be set at −0.3, especially −0.2, more especially −0.15 and 1.0, especially 0.85, more especially 0.7, respectively.

The imaging apparatus may have an image processor portion adapted to implement signal processing for correction of aberrations contained in electrical signals. Allowing for the aberrations of the zoom lens goes more in favor of size reductions and so on.

When the zoom lens has a focusing function, the aforesaid respective conditions may be extended to states upon focusing on the farthest distance.

Focusing from a far object to a nearby object may be implemented as by letting out the first lens group or the whole zoom lens, or the movement of the second, the third and the fourth lens group. To ease off driving loads, focusing should preferably be implemented by the third lens group of negative refracting power or the fourth lens group of positive refracting power.

According to the invention, there is a zoom lens provided that goes in favor of making it small upon put away at a lens mount, and rendering it easy to make sure optical performance even with the desired zoom ratio, brightness and angle of view maintained.

Further, there is a compact imaging apparatus provided that comprises such a zoom lens.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

Figure 1:
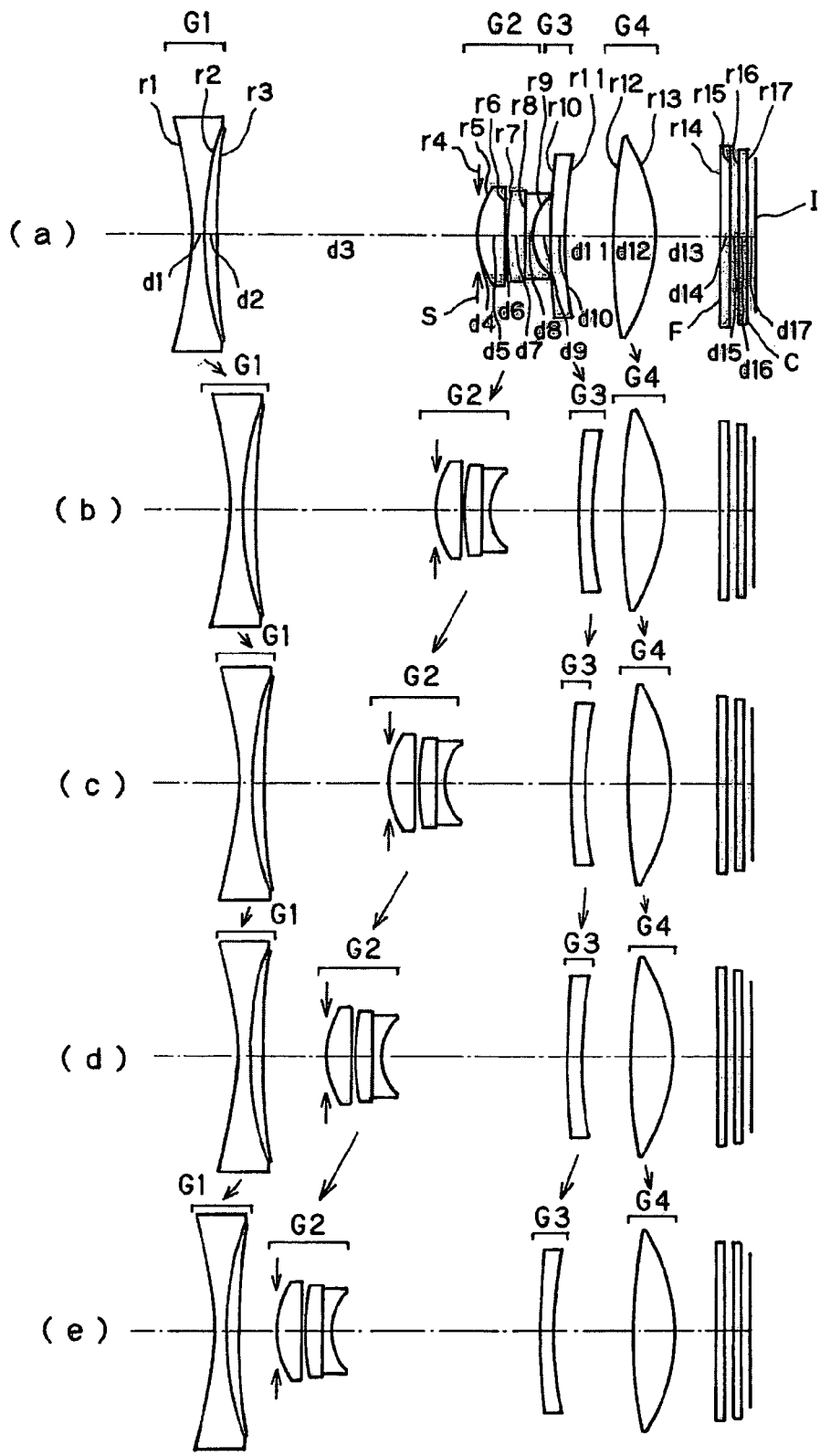
FIG. 1 is illustrative in lens arrangement section of Example 1 of the inventive zoom lens at the wide-angle end (a), in an intermediate setting (b) and at the telephoto end (c), respectively, upon focusing at an object point at infinity.

With each of the examples given below, there is a compact zoom lens achieved that permits the first lens group having negative refracting power to have a small axial thickness and a lens barrel to be received compactly at a lens mount, albeit having high imaging capability at a zoom ratio of as high as about 3 and a angle of view of as wide as about 60° at the wide-angle end. There is also a less costly zoom lens achieved that is well fit for an electronic imaging device such as CCDs or CMOSs.

In Examples 1-6, the second lens groups are each made up of, in order from the object side, a positive lens, and a cemented lens of a positive lens and a negative lens, and in Examples 7-11, the second lens groups are each made up of, in order from the object side, a positive lens and a negative lens.

In Examples 1-11, the third lens groups are each made of a resin material.

In Example 1, 4, 6, 10, and 11, the fourth lens group is made of a vitreous material, and in Example 2, 3, 5, 7, and 9 the fourth lens group is made of a resin material.

In Example 1, 2, 3, 10, and 11, the cementing surface of a negative lens and a positive lens in the first lens group is defined by an aspheric surface.

In each example, the first lens group moves toward the image side and then toward the object side upon zooming from the wide-angle to the telephoto end. In each of Examples 1-9, the first lens group is positioned more on the image side at the telephoto end than at the wide-angle end. In Example 10, and 11, the first lens group is positioned more on the object side at the telephoto end than at the wide-angle end.

In each example, the second lens group moves toward the object side alone upon zooming from the wide-angle end to the telephoto end.

In each example, the third lens group moves toward the image side and then toward the object side. The state where the third lens group is positioned nearest to the image side differs for each example: in Example 1, 8, 9, and 10, the third lens group is positioned nearest to the image side as shown in the second figure from above; in Example 2, 3, 4, 5, 7, and 11, the third lens group is positioned nearest to the image side as shown in the third figure from above; and in Example 6, the third lens group is positioned nearest to the image side as shown in the fourth figure from above. In Example 2, 3, and 6, the third lens group is positioned more on the image side at the telephoto end than at the wide-angle end. In Example 1, 4, 5, 7, 8, 9, 10, and 11, the third lens group is positioned more on the object side at the telephoto end than at the wide-angle end.

In each example, the fourth lens group moves and is positioned more on the image side at the telephoto end than at the wide-angle end. In Example 1, 4, 6, 10, and 11, the fourth lens group moves toward the image side only. In Example 2, 3, 5, 7, 8, and 9, the fourth lens group moves toward the image side and then toward the object side.

In Examples 1 through 11, the effective imaging area is supposed to have a constant rectangular shape throughout the zooming state. In each example, the values of the conditions are obtained upon focusing on an object point at infinity. Total length is represented by the axial distance from the entrance surface to the exit surface of the zoom lens plus a back focus. The back focus is indicated on an air basis.

Examples 1 to 11 of the inventive zoom lens are now explained. FIGS. 1 to 11 are illustrative in lens arrangement section of Examples 1 to 11 at the wide-angle end (a), at the point (b) of change on the wide-angle side, in an intermediate setting (c) (where the first lens group is positioned nearest to the image side), at the point (d) of change on the telephoto side, and at the telephoto end (e), respectively, upon focusing on an object point at infinity. Throughout FIGS. 1-11, G1 is indicative of the first lens group, G2 the second lens group, S the aperture stop, G3 the third lens group, G4 the fourth lens group, F an optical low-pass filter, C a cover glass of CCD that is an electronic imaging device, I the image plane of CCD. Note here that for a near infrared sharp cut coating, for instance, the coating may be applied directly to the optical low-pass filter F or another infrared cut absorption filter may be disposed.

Example 1

This example is directed to a zoom lens made up of, in order from its object side, the first lens group G1 having negative refracting power, the aperture stop S, the second lens group G2 having positive refracting power, the third lens group G3 having negative refracting power and the fourth lens group G4 having positive refracting power, as shown in FIG. 1.

Reference is now made to what states the respective components move in upon zooming from the wide-angle end to the telephoto end. Here, the point of change on wide-angle side is defined by the point of change in the direction of movement of the second G2 or the fourth lens group G4 from the wide-angle end up to the intermediate setting, and the point of change on the telephoto side by the point of change in the direction of movement of the second G2 or the fourth lens group G4 from the intermediate setting up to the telephoto end. The same shall apply hereinafter.

The first lens group G1 moves toward the image side from the wide-angle end to the intermediate setting, moves toward the object side from the intermediate setting to the telephoto end, and moves in a concave locus toward the object side from the wide angle end to the telephoto end. At the telephoto end, the first lens group G1 is positioned a little more on the image side than at the wide-angle end.

From the wide-angle end to the telephoto end, a set of the aperture stop S and the second lens group G2 moves integrally toward the object side with a decreasing spacing with the first lens group G1 and an increasing spacing with the third lens group G3. That set is positioned more on the object side at the telephoto end than at the wide-angle end.

From the wide-angle end to the point of change on the wide-angle side, the third lens group G3 moves toward the image side with an increasing spacing with the second lens group G2 and a decreasing spacing with the fourth lens group G4; from the point of change on the wide-angle side to the telephoto end, it moves toward the object side with an increasing spacing with the second G2, and the fourth lens group G4; and from the wide-angle end to the telephoto end, it moves in a concave locus toward the object side. The third lens group G3 is positioned a little more on the object side at the telephoto end than at the wide-angle end.

From the wide-angle end to the point of change on the wide-angle side, the fourth lens group G4 moves toward the image side with a decreasing spacing with the third lens group G3, and from the point of change on the wide-angle side to the telephoto end, it moves toward the image side with an increasing spacing with the third lens group G3. At the telephoto end, the fourth lens group G4 is positioned more on the object side than at the wide-angle end.

In order from the object side, the first lens group G1 is made up of a cemented lens of a double-concave negative lens and a double-convex positive lens; the second lens group G2 is made up of a double-convex positive lens, and a cemented lens of a positive meniscus lens convex on its object side and a negative meniscus lens convex on its object side; the third lens group G3 is made up of one negative meniscus lens convex on its object side; and the fourth lens group G4 is made up of one double-convex positive lens.

Seven aspheric surfaces are used: three at all surfaces of the cemented lens in the first lens group G1, two at both surfaces of the double-convex positive lens in the second lens group G2, one at the image-side surface of the negative meniscus lens in the third lens group G3, and one at the image-side surface of the double-convex positive lens in the fourth lens group G4.

Example 2

Figure 2:
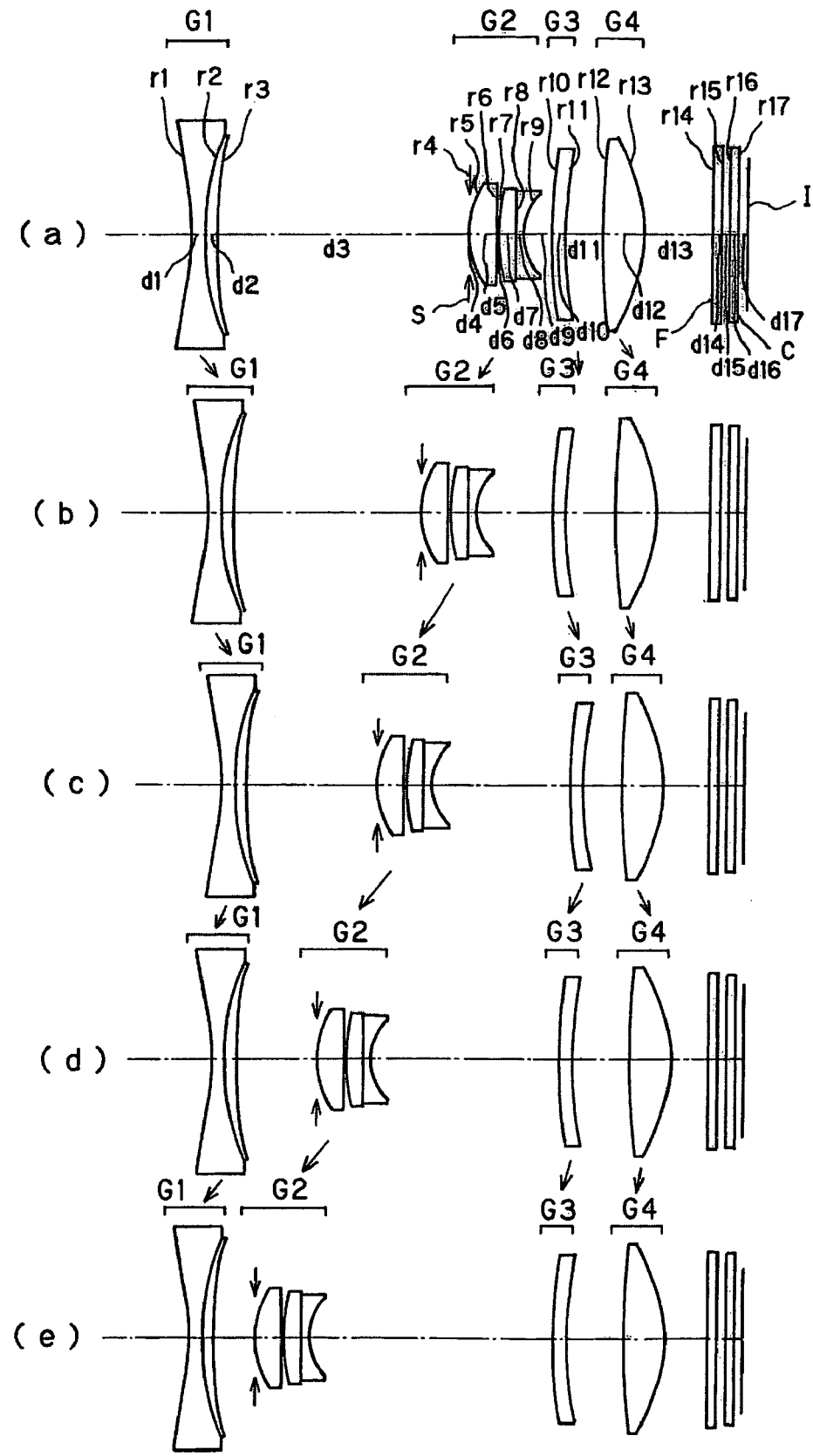
FIG. 2 is illustrative, as in FIG. 1, of Example 2 of the inventive zoom lens.

This example is directed to a zoom lens made up of, in order from its object side, the first lens group G1 having negative refracting power, the aperture stop S, the second lens group G2 having positive refracting power, the third lens group G3 having negative refracting power and the fourth lens group G4 having positive refracting power, as shown in FIG. 2.

Reference is now made to what states the respective components move in upon zooming from the wide-angle end to the telephoto end.

The first lens group G1 moves toward the image side from the wide-angle end to the intermediate setting, moves toward the object side from the intermediate setting to the telephoto end, and moves in a concave locus toward the object side from the wide angle end to the telephoto end. At the telephoto end, the first lens group G1 is positioned a little more on the image side than at the wide-angle end.

From the wide-angle end to the telephoto end, a set of the aperture stop S and the second lens group G2 moves integrally toward the object side with a decreasing spacing with the first lens group G1 and an increasing spacing with the third lens group G3. At the telephoto end, that set is positioned more on the object side than at the wide-angle end.

From the wide-angle end to the point of change on the wide-angle side, the third lens group G3 moves toward the image side with an increasing spacing with the second G2, and with the fourth lens group G4; from the point of change on the wide-angle side to the intermediate setting, it moves toward the image side with an increasing spacing with the second G2 and a decreasing spacing with the fourth lens group G4; from the intermediate setting to the point of change on the telephoto side, it moves toward the object side with an increasing spacing with the second 2, and the fourth lens group G4; from the point of change on the telephoto side to the telephoto end, it moves toward the object side with an increasing spacing with the second lens group G2 and a decreasing spacing with the fourth lens group G4; and from the wide-angle end to the telephoto end, it moves in a concave locus toward the object side. At the telephoto end, the third lens group G3 is positioned a little more on the object side than at the wide-angle end.

The fourth lens group G4 moves toward the image side with an increasing spacing with the third lens group G3 from the wide-angle end to the point of change on the wide-angle side, with a decreasing spacing with the third lens group G3 from the point of change on the wide-angle side to the intermediate setting, and with an increasing spacing with the third lens group G3 from the intermediate setting to the point of change on the telephoto side, and it moves in a concave locus toward the object side from the wide-angle end to the telephoto end. At the telephoto end, the fourth lens group G4 is positioned more on the image side than at the wide-angle end.

In order from the object side, the first lens group G1 is made up of a cemented lens of a double-concave negative lens and a positive meniscus lens convex on its object side; the second lens group G2 is made up of a double-convex positive lens, and a cemented lens of a positive meniscus lens convex on its object side and a negative meniscus lens convex on its object side; the third lens group G3 is made up of one negative meniscus lens convex on its object side; and the fourth lens group G4 is made up of one double-convex positive lens.

Seven aspheric surfaces are used: three at all surfaces of the cemented lens in the first lens group G1, two at both surfaces of the double-convex positive lens in the second lens group G2, one at the image-side surface of the negative meniscus lens in the third lens group G3, and one at the image-side surface of the double-convex positive lens in the fourth lens group G4.

Example 3

Figure 3:
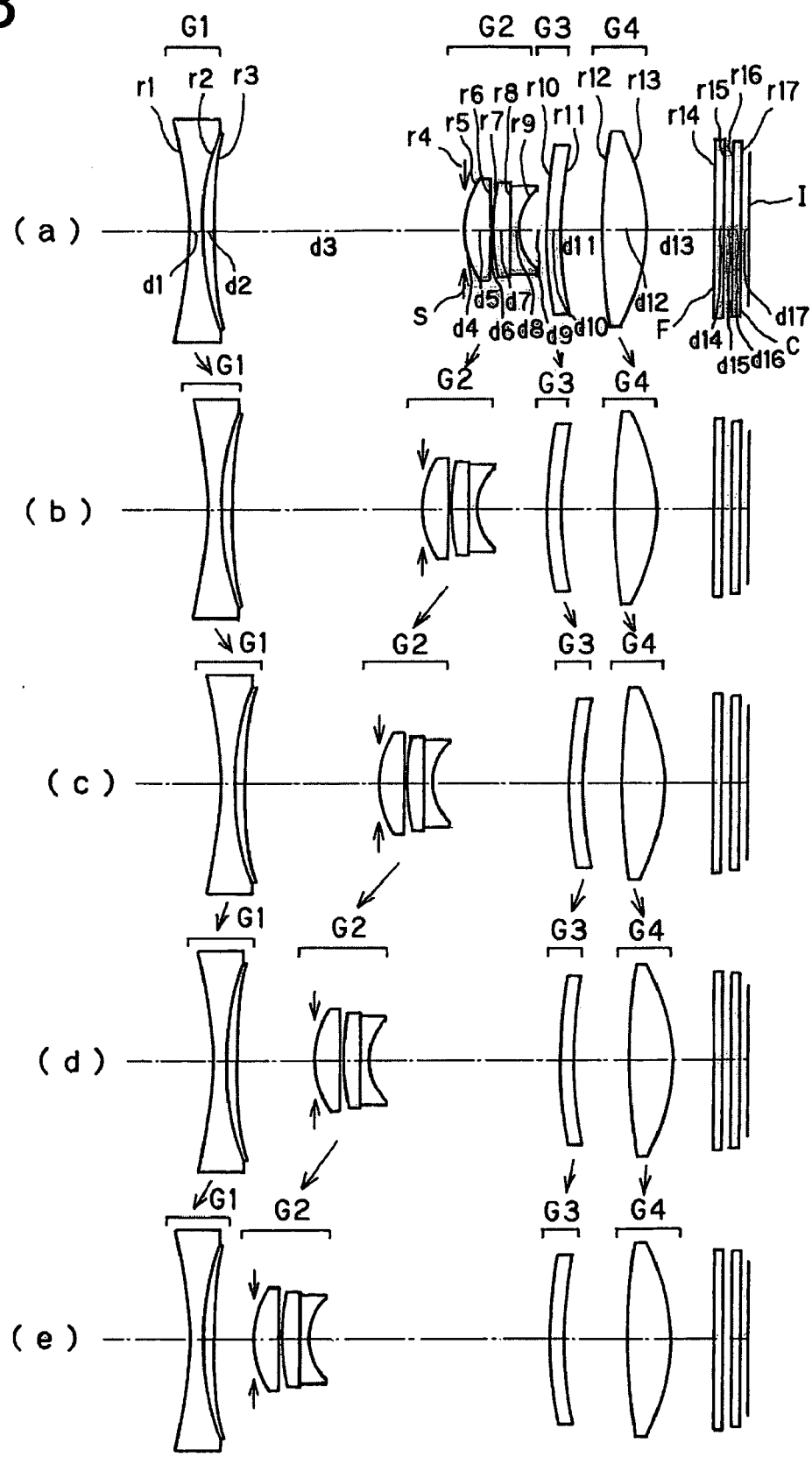
FIG. 3 is illustrative, as in FIG. 1, of Example 3 of the inventive zoom lens.

This example is directed to a zoom lens made up of, in order from its object side, the first lens group G1 having negative refracting power, the aperture stop S, the second lens group G2 having positive refracting power, the third lens group G3 having negative refracting power and the fourth lens group G4 having positive refracting power, as shown in FIG. 3.

Reference is now made to what states the respective components move in upon zooming from the wide-angle end to the telephoto end.

The first lens group G1 moves toward the image side from the wide-angle end to the intermediate setting, moves toward the object side from the intermediate setting to the telephoto end, and moves in a concave locus toward the object side from the wide-angle end to the telephoto end. At the telephoto end, the first lens group G1 is positioned a little more on the image side at the wide-angle end.

From the wide-angle end to the telephoto end, a set of the aperture stop S and the second lens group G2 moves integrally toward the object side with a decreasing spacing with the first lens group G1 and an increasing spacing with the third lens group G3. At the telephoto end, that set is positioned more on the object side than at the wide-angle end.

The third lens group G3 moves toward the image side with an increasing spacing with the second G2, and the fourth lens group G4 from the wide-angle end to the point of change on the wide-angle side, moves toward the image side with an increasing spacing with the second lens group G2 and a decreasing spacing with the fourth lens group G4 from the point of change on the wide-angle side to the intermediate setting, moves toward the object side with an increasing spacing with the second G2, and the fourth lens group G4 from the intermediate setting to the telephoto end, and moves in a concave locus toward the object side from the wide-angle end to the telephoto end. At the telephoto end, the third lens group G3 is positioned a little more on the image side than at the wide-angle end.

The fourth lens group G4 moves toward the image side with an increasing spacing with the third lens group G3 from the wide-angle end to the point of change on the wide-angle side, with a decreasing spacing with the third lens group G3 from the point of change on the wide-angle side to the intermediate setting, and with an increasing spacing with the third lens group G3 from the intermediate setting to the telephoto end, and moves in a concave locus toward the object side from the wide-angle end to the telephoto end. At the telephoto end, the fourth lens group G4 is positioned more on the image side than at the wide-angle end.

In order from the object side, the first lens group G1 is made up of a cemented lens of a double-concave negative lens and a positive meniscus lens convex on its object side; the second lens group G2 is made up of a double-convex positive lens, and a cemented lens of a positive meniscus lens convex on its object side and a negative meniscus lens convex on its object side; the third lens group G3 is made up of one negative meniscus lens convex on its object side; and the fourth lens group G4 is made up of one double-convex positive lens.

Seven aspheric surfaces are used: three at all surfaces of the cemented lens in the first lens group G1, two at both surfaces of the double-convex positive lens in the second lens group G2, one at the image-side surface of the negative meniscus lens in the third lens group G3, and one at the image-side surface of the double-convex positive lens in the fourth lens group G4.

Example 4

Figure 4:
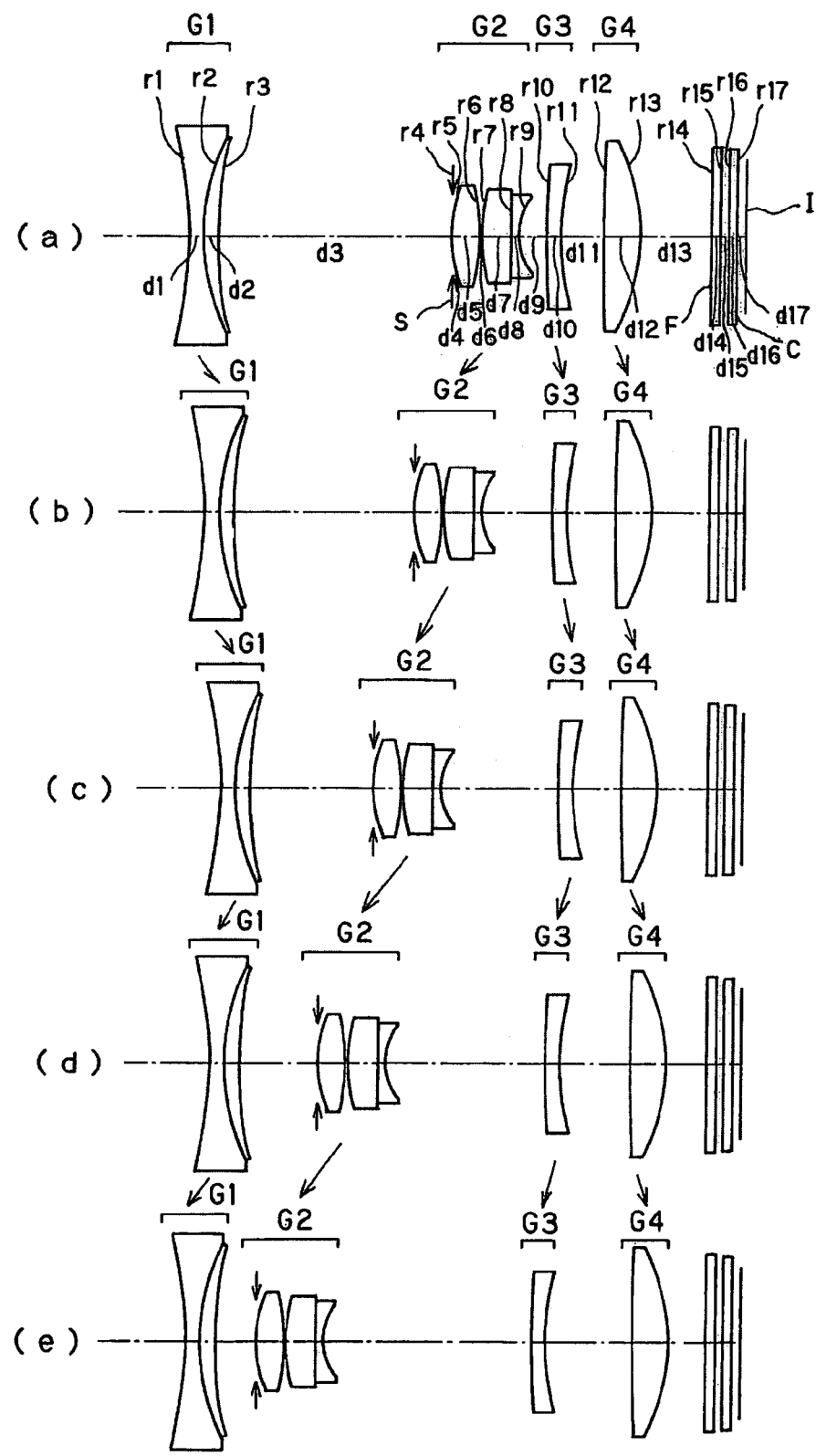
FIG. 4 is illustrative, as in FIG. 1, of Example 4 of the inventive zoom lens.

This example is directed to a zoom lens made up of, in order from its object side, the first lens group G1 having negative refracting power, the aperture stop S, the second lens group G2 having positive refracting power, the third lens group G3 having negative refracting power and the fourth lens group G4 having positive refracting power, as shown in FIG. 4.

Reference is now made to what states the respective components move in upon zooming from the wide-angle end to the telephoto end.

The first lens group G1 moves toward the image side from the wide-angle end to the intermediate setting, moves toward the object side from the intermediate setting to the telephoto end, and moves in a concave locus toward the object side from the wide-angle end to the telephoto end. At the telephoto end, the first lens group G1 is positioned a little more on the image side than at the wide-angle end.

From the wide-angle end to the telephoto end, a set of the aperture stop S and the second lens group G2 moves integrally toward the object side with a decreasing spacing with the first lens group G1 and an increasing spacing with the third lens group G3. At the telephoto end, that set is positioned more on the object side than at the wide-angle end.

The third lens group G3 moves toward the image side with an increasing spacing with the second G2, and the fourth lens group G4 from the wide-angle end to the point of change on the wide-angle side, moves toward the image side with an increasing spacing with the second lens group G2 and a decreasing spacing with the fourth lens group G4 from the point of change on the wide-angle side to the intermediate setting, moves toward the object side with an increasing spacing with the second G2, and the fourth lens group G4 from the intermediate setting to the telephoto end, and moves in a concave locus toward the object side from the wide-angle end to the telephoto end. At the telephoto end, the third lens group G3 is positioned a little more on the image side than at the wide-angle end.

The fourth lens group G4 moves toward the image side with an increasing spacing with the third lens group G3 from the wide-angle end to the point of change on the wide-angle side, with a decreasing spacing with the third lens group G3 from the point of change on the wide-angle side to the intermediate setting, and with an increasing spacing with the third lens group G3 from the intermediate setting to the telephoto end. At the telephoto end, the fourth lens group G4 is positioned more on the image side than at the wide-angle end.

In order from the object side, the first lens group G1 is made up of a cemented lens of a double-concave negative lens and a positive meniscus lens convex on its object side; the second lens group G2 is made up of a double-convex positive lens, and a cemented lens of a positive meniscus lens convex on its object side and a negative meniscus lens convex on its object side; the third lens group G3 is made up of one negative meniscus lens convex on its object side; and the fourth lens group G4 is made up of one double-convex positive lens.

Six aspheric surfaces are used: two at the surfaces nearest to the object and image sides of the cemented lens in the first lens group G1, two at both surfaces of the double-convex positive lens in the second lens group G2, one at the image-side surface of the negative meniscus lens in the third lens group G3, and one at the image-side surface of the double-convex positive lens in the fourth lens group G4.

Example 5

Figure 5:
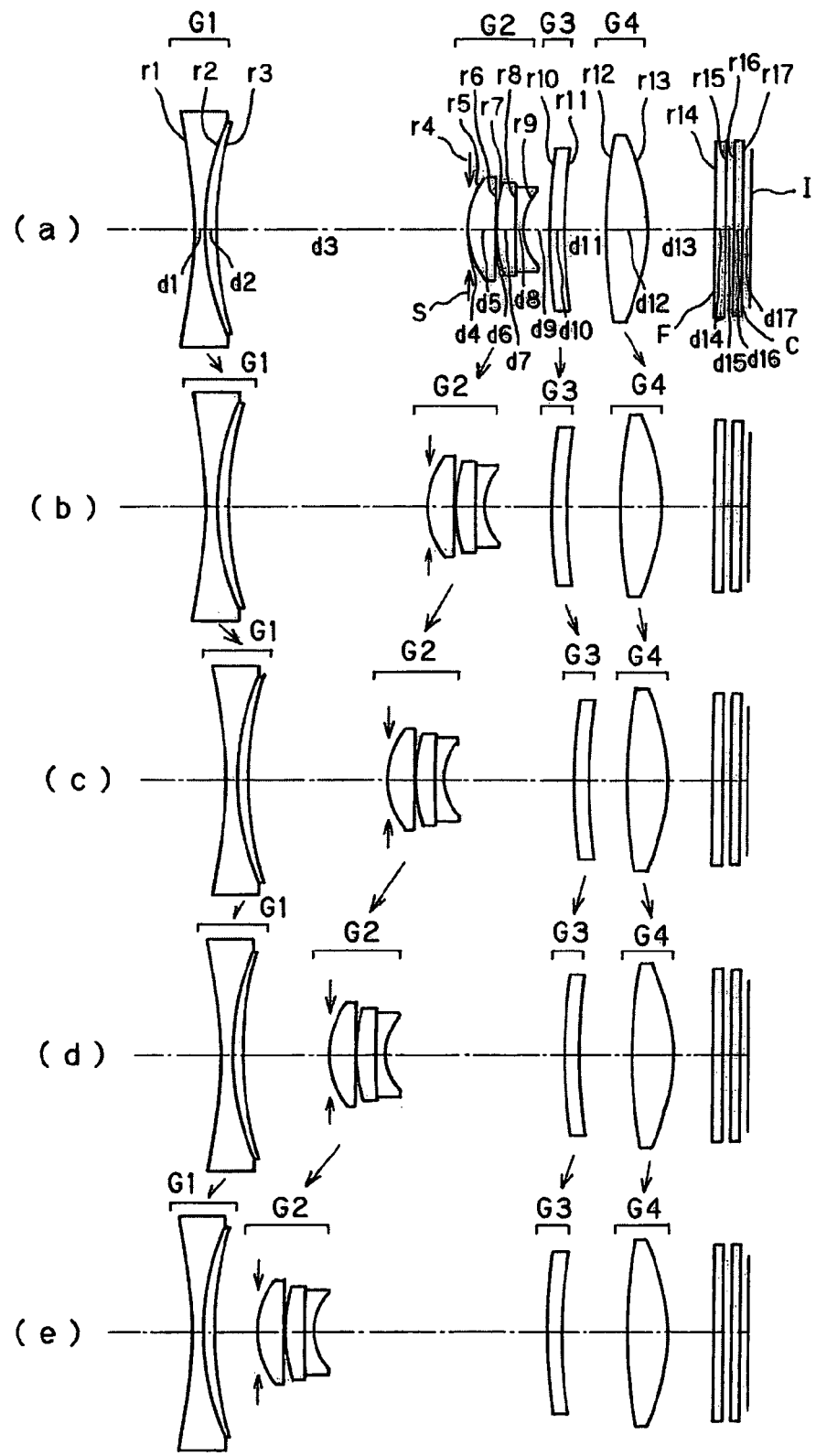
FIG. 5 is illustrative, as in FIG. 1, of Example 5 of the inventive zoom lens.
Figure 6:
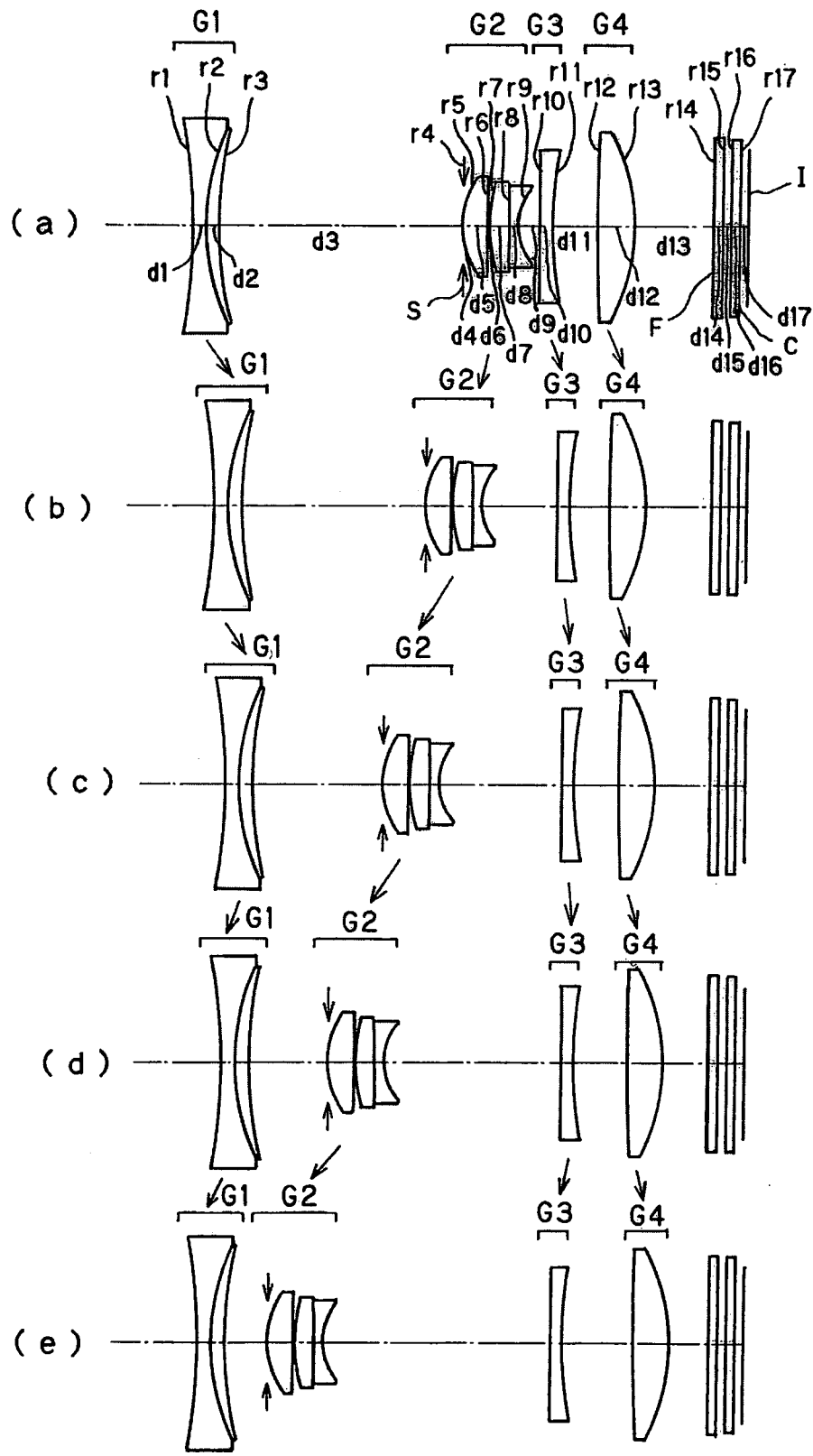
FIG. 6 is illustrative, as in FIG. 1, of Example 6 of the inventive zoom lens.

This example is directed to a zoom lens made up of, in order from its object side, the first lens group G1 having negative refracting power, the aperture stop S, the second lens group G2 having positive refracting power, the third lens group G3 having negative refracting power and the fourth lens group G4 having positive refracting power, as shown in FIG. 5.

Reference is now made to what states the respective components move in upon zooming from the wide-angle end to the telephoto end.

The first lens group G1 moves toward the image side from the wide-angle end to the intermediate setting, moves toward the object side from the intermediate setting to the telephoto end, and moves in a concave locus toward the object side from the wide-angle end to the telephoto end. At the telephoto end, the first lens group G1 is positioned more on the image side than at the wide-angle end.

From the wide-angle end to the telephoto end, a set of the aperture stop S and the second lens group G2 moves integrally toward the object side with a decreasing spacing with the first lens group G1 and an increasing spacing with the third lens group G3. At the telephoto end, that set is positioned more on the object side than at the wide-angle end.

The third lens group G3 moves toward the image side with an increasing spacing with the second G2, and the fourth lens group G4 from the wide-angle end to the point of change on the wide-angle side, moves toward the image side with an increasing spacing with the second lens group G2 and a decreasing spacing with the fourth lens group G4 from the point of change on the wide-angle side to the intermediate setting, moves toward the object side with an increasing spacing with the second G2, and the fourth lens group G4 from the intermediate setting to the telephoto end, and moves in a concave locus toward the object side from the wide-angle end to the telephoto end. At the telephoto end, the third lens group G3 is positioned a little more on the image side than at the wide-angle end.

The fourth lens group G4 moves toward the image side with an increasing spacing with the third lens group G3 from the wide-angle end to the point of change on the wide-angle side, with a decreasing spacing with the third lens group G3 from the point of change on the wide-angle side to the intermediate setting, and with an increasing spacing with the third lens group G3 from the intermediate setting to the point of change on the telephoto side, moves toward the object side with an increasing spacing with the third lens group G3 from the point of change on the telephoto side to the telephoto end, and moves in a concave locus toward the object side from the wide-angle end to the telephoto end. At the telephoto end, the fourth lens group G4 is positioned more on the image side than at the wide-angle end.

In order from the object side, the first lens group G1 is made up of a cemented lens of a double-concave negative lens and a positive meniscus lens convex on its object side; the second lens group G2 is made up of a double-convex positive lens, and a cemented lens of a positive meniscus lens convex on its object side and a negative meniscus lens convex on its object side; the third lens group G3 is made up of one negative meniscus lens convex on its object side; and the fourth lens group G4 is made up of one double-convex positive lens.

Six aspheric surfaces are used: two at the surfaces nearest to the object and image sides of the cemented lens in the first lens group G1, two at both surfaces of the double-convex positive lens in the second lens group G2, one at the image-side surface of the negative meniscus lens in the third lens group G3, and one at the image-side surface of the double-convex positive lens in the fourth lens group G4.

Example 6

This example is directed to a zoom lens made up of, in order from its object side, the first lens group G1 having negative refracting power, the aperture stop S, the second lens group G2 having positive refracting power, the third lens group G3 having negative refracting power and the fourth lens group G4 having positive refracting power, as shown in FIG. 5.

Reference is now made to what states the respective components move in upon zooming from the wide-angle end to the telephoto end.

The first lens group G1 moves toward the image side from the wide-angle end to the intermediate setting, moves toward the object side from the intermediate setting to the telephoto end, and moves in a concave locus toward the object side from the wide-angle end to the telephoto end. At the telephoto end, the first lens group G1 is positioned a little more on the image side than at the wide-angle end.

From the wide-angle end to the telephoto end, a set of the aperture stop S and the second lens group G2 moves integrally toward the object side with a decreasing spacing with the first lens group G1 and an increasing spacing with the third lens group G3. At the telephoto end, that set is positioned more on the object side than at the wide-angle end.

The third lens group G3 moves toward the image side with an increasing spacing with the second lens group G2 and a decreasing spacing with the fourth lens group G4 from the wide-angle end to the point of change on the wide-angle side, moves toward the image size with an increasing spacing with the second G2, and the fourth lens group G4 from the point of change on the wide-angle side to the point of change on the telephoto side, moves toward the object side with an increasing spacing with the second G2, and the fourth lens group G4 to the point of change on the telephoto side to the telephoto end, and moves in a concave locus toward the object side from the wide-angle end to the telephoto end. At the telephoto end, the fourth lens group G4 is positioned more on the image side than at the wide-angle end.

The fourth lens group G4 moves toward the image side with a decreasing spacing with the third lens group G3 from the wide-angle end to the point of change on the wide-angle side, and moves toward the image side with an increasing spacing with the third lens group G3 from the point of change on the wide-angle side to the telephoto end. At the telephoto end, the fourth lens group G4 is positioned more on the image side than at the wide-angle end.

In order from the object side, the first lens group G1 is made up of a cemented lens of a double-concave negative lens and a positive meniscus lens convex on its object side; the second lens group G2 is made up of a double-convex positive lens, and a cemented lens of a double-convex positive lens and a double-concave negative lens; the third lens group G3 is made up of one negative meniscus lens convex on its object side; and the fourth lens group G4 is made up of one double-convex positive lens.

Six aspheric surfaces are used: two at the surfaces nearest to the object and image sides of the cemented lens in the first lens group G1, two at both surfaces of the double-convex positive lens in the second lens group G2, one at the image-side surface of the negative meniscus lens in the third lens group G3, and one at the image-side surface of the double-convex positive lens in the fourth lens group G4.

Example 7

Figure 7:
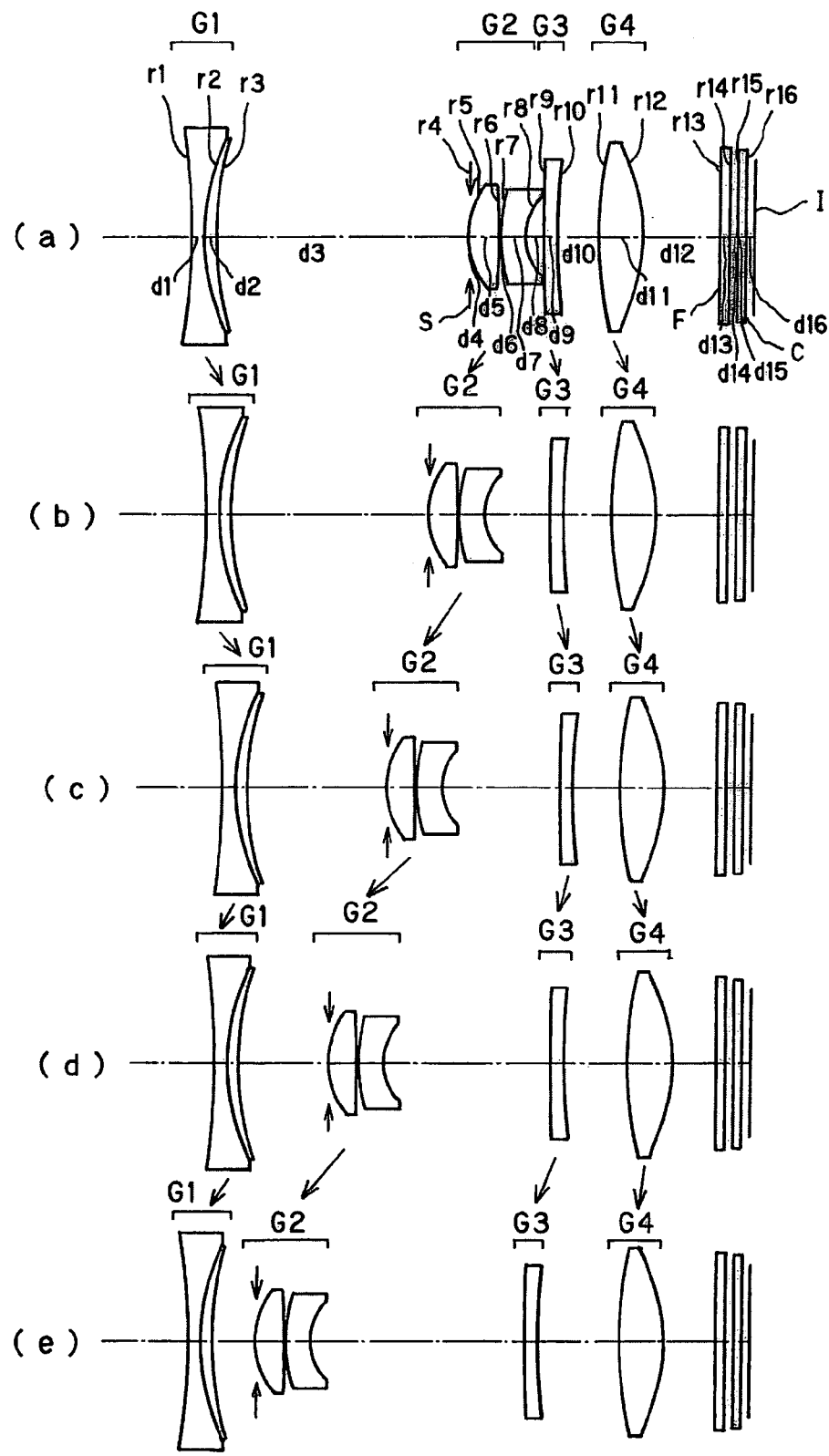
FIG. 7 is illustrative, as in FIG. 1, of Example 7 of the inventive zoom lens.

This example is directed to a zoom lens made up of, in order from its object side, the first lens group G1 having negative refracting power, the aperture stop S, the second lens group G2 having positive refracting power, the third lens group G3 having negative refracting power and the fourth lens group G4 having positive refracting power, as shown in FIG. 7.

Reference is now made to what states the respective components move in upon zooming from the wide-angle end to the telephoto end.

The first lens group G1 moves toward the image side from the wide-angle end to the intermediate setting, moves toward the object side from the intermediate setting to the telephoto end, and moves in a concave locus toward the object side from the wide-angle end to the telephoto end. At the telephoto end, the first lens group G1 is positioned a little more on the image side than at the wide-angle end.

From the wide-angle end to the telephoto end, a set of the aperture stop S and the second lens group G2 moves integrally toward the object side with a decreasing spacing with the first lens group G1 and an increasing spacing with the third lens group G3. At the telephoto end, that set is positioned more on the object side than at the wide-angle end.

The third lens group G3 moves toward the image side with an increasing spacing with the second G2, and the fourth lens group G4 from the wide-angle end to the point of change on the wide-angle side, moves toward the image side with an increasing spacing with the second lens group G2 and a decreasing spacing with the fourth lens group G4 from the point of change on the wide-angle side to the intermediate setting, moves toward the object side with an increasing spacing with the second G2, and the fourth lens group G4 from the intermediate setting to the telephoto end, and moves in a concave locus toward the object side from the wide-angle end to the telephoto end. At the telephoto end, the third lens group G3 is positioned more on the object side than at the wide-angle end.

The fourth lens group G4 moves toward the image side with an increasing spacing with the third lens group G3 from the wide-angle end to the point of change on the wide-angle side, with a decreasing spacing with the third lens group G3 from the point of change on the wide-angle side to the intermediate setting, moves toward the image side with an increasing spacing with the third lens group G3 from the intermediate setting to the point of change on the telephoto side, moves toward the object side with an increasing spacing with the third lens group G3 from the point of change on the telephoto side to the telephoto end, and moves in a concave locus toward the object side from the wide-angle end to the telephoto end. At the telephoto end, the fourth lens group G4 is positioned more on the image side than at the wide-angle end.

In order from the object side, the first lens group G1 is made up of a cemented lens of a double-concave negative lens and a positive meniscus lens convex on its object side; the second lens group G2 is made up of a double-convex positive lens and a negative meniscus lens convex on its object side; the third lens group G3 is made up of one negative meniscus lens convex on its object side; and the fourth lens group G4 is made up of one double-convex positive lens.

Six aspheric surfaces are used: two at the surfaces nearest to the object and image sides of the cemented lens in the first lens group G1, two at both surfaces of the double-convex positive lens in the second lens group G2, one at the image-side surface of the negative meniscus lens in the third lens group G3, and one at the image-side surface of the double-convex positive lens in the fourth lens group G4.

Example 8

Figure 8:
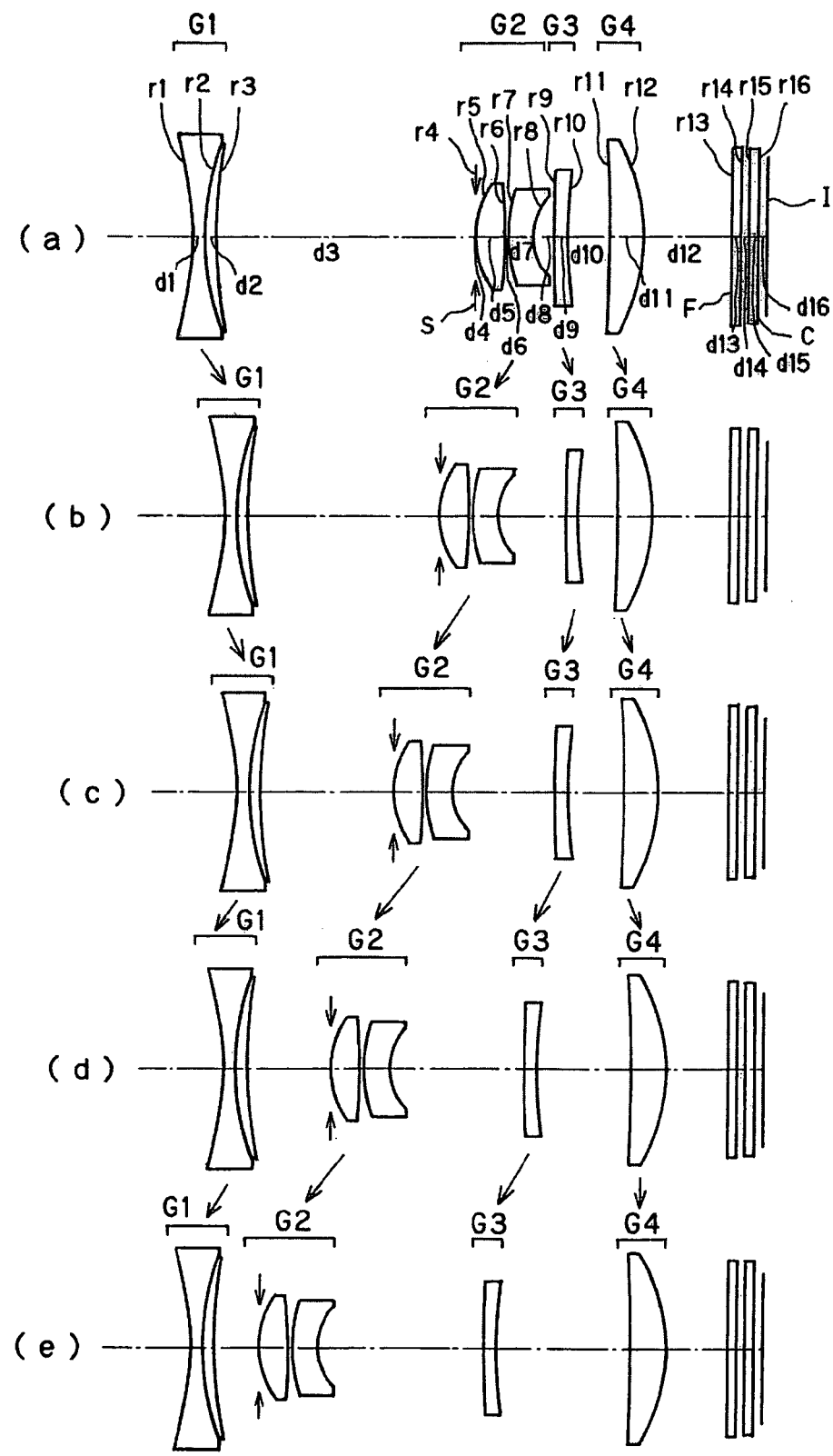
FIG. 8 is illustrative, as in FIG. 1, of Example 8 of the inventive zoom lens.

This example is directed to a zoom lens made up of, in order from its object side, the first lens group G1 having negative refracting power, the aperture stop S, the second lens group G2 having positive refracting power, the third lens group G3 having negative refracting power and the fourth lens group G4 having positive refracting power, as shown in FIG. 8.

Reference is now made to what states the respective components move in upon zooming from the wide-angle end to the telephoto end.

The first lens group G1 moves toward the image side from the wide-angle end to the intermediate setting, moves toward the object side from the intermediate setting to the telephoto end, and moves in a concave locus toward the object side from the wide-angle end to the telephoto end. At the telephoto end, the first lens group G1 is positioned a little more on the image side than at the wide-angle end.

From the wide-angle end to the telephoto end, a set of the aperture stop S and the second lens group G2 moves integrally toward the object side with a decreasing spacing with the first lens group G1 and an increasing spacing with the third lens group G3. At the telephoto end, that set is positioned more on the object side than at the wide-angle end.

The third lens group G3 moves toward the image side with an increasing spacing with the second lens group G2 and a decreasing spacing with the fourth lens group G4 from the wide-angle end to the point of change on the wide-angle side, moves toward the object side with an increasing spacing with the second G2, and the fourth lens group G4 from the point of change on the wide-angle side to the telephoto end, and moves in a concave locus toward the object side from the wide-angle end to the telephoto end. At the telephoto end, the third lens group G3 is positioned more on the object side than at the wide-angle end.

The fourth lens group G4 moves toward the image side with a decreasing spacing with the third lens group G3 from the wide-angle end to the point of change on the wide-angle side and with an increasing spacing with the third lens group G3 from the point of change on the wide-angle side to the point of change on the telephoto side, moves toward the object side with an increasing spacing with the third lens group G3 from the point of change on the telephoto side to the telephoto end, and moves in a concave locus toward the object side from the wide-angle end to the telephoto end. At the telephoto end, the fourth lens group G4 is positioned more on the image side than at the wide-angle end.

In order from the object side, the first lens group G1 is made up of a cemented lens of a double-concave negative lens and a positive meniscus lens convex on its object side; the second lens group G2 is made up of a double-convex positive lens and a negative meniscus lens convex on its object side; the third lens group G3 is made up of one negative meniscus lens convex on its object side; and the fourth lens group G4 is made up of one positive meniscus lens convex on its image side.

Six aspheric surfaces are used: two at the surfaces nearest to the object and image sides of the cemented lens in the first lens group G1, two at both surfaces of the double-convex positive lens in the second lens group G2, one at the image-side surface of the negative meniscus lens in the third lens group G3, and one at the image-side surface of the positive meniscus lens in the fourth lens group G4.

Example 9

Figure 9:
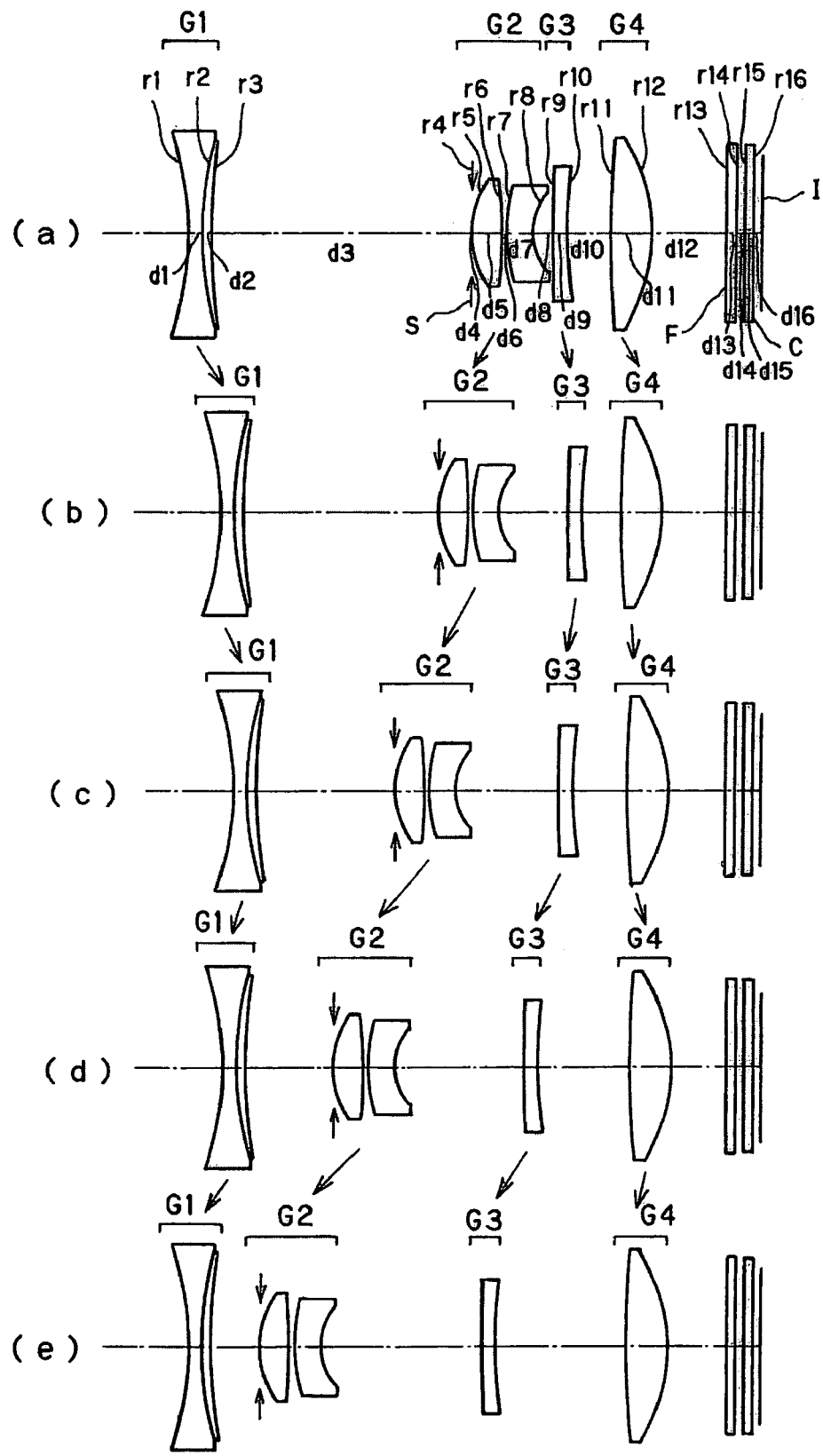
FIG. 9 is illustrative, as in FIG. 1, of Example 9 of the inventive zoom lens.

This example is directed to a zoom lens made up of, in order from its object side, the first lens group G1 having negative refracting power, the aperture stop S, the second lens group G2 having positive refracting power, the third lens group G3 having negative refracting power and the fourth lens group G4 having positive refracting power, as shown in FIG. 9.

Reference is now made to what states the respective components move in upon zooming from the wide-angle end to the telephoto end.

The first lens group G1 moves toward the image side from the wide-angle end to the intermediate setting, moves toward the object side from the intermediate setting to the telephoto end, and moves in a concave locus toward the object side from the wide-angle end to the telephoto end. At the telephoto end, the first lens group G1 is positioned a little more on the image side than at the wide-angle end.

From the wide-angle end to the telephoto end, a set of the aperture stop S and the second lens group G2 moves integrally toward the object side with a decreasing spacing with the first lens group G1 and an increasing spacing with the third lens group G3. At the telephoto end, that set is positioned more on the object side than at the wide-angle end.

The third lens group G3 moves toward the image side with an increasing spacing with the second lens group G2 and a decreasing spacing with the fourth lens group G4 from the wide-angle end to the point of change on the wide-angle side, moves toward the object side with an increasing spacing with the second G2, and the fourth lens group G4 from the point of change on the wide-angle side to the telephoto end, and moves in a concave locus toward the object side from the wide-angle end to the telephoto end. At the telephoto end, the third lens group G3 is positioned more on the object side than at the wide-angle end.

The fourth lens group G4 moves toward the image side with a decreasing spacing with the third lens group G3 from the wide-angle end to the point of change on the wide-angle side and with an increasing spacing with the third lens group G3 from the point of change on the wide-angle side to the point of change on the telephoto side, moves toward the object side with an increasing spacing with the third lens group G3 from the point of change on the telephoto side to the telephoto end, and moves in a concave locus toward the object side from the wide-angle end to the telephoto end. At the telephoto end, the fourth lens group G4 is positioned more on the image side than at the wide-angle end.

In order from the object side, the first lens group G1 is made up of a cemented lens of a double-concave negative lens and a positive meniscus lens convex on its object side; the second lens group G2 is made up of a double-convex positive lens and a negative meniscus lens convex on its object side; the third lens group G3 is made up of one negative meniscus lens convex on its object side; and the fourth lens group G4 is made up of one double-convex positive lens convex on its image side.

Seven aspheric surfaces are used: two at the surfaces nearest to the object and image sides of the cemented lens in the first lens group G1, two at both surfaces of the double-convex positive lens in the second lens group G2, one at the image-side surface of the negative meniscus lens in the third lens group G3, and two at both surfaces of the double-convex positive lens in the fourth lens group G4.

Example 10

Figure 10:
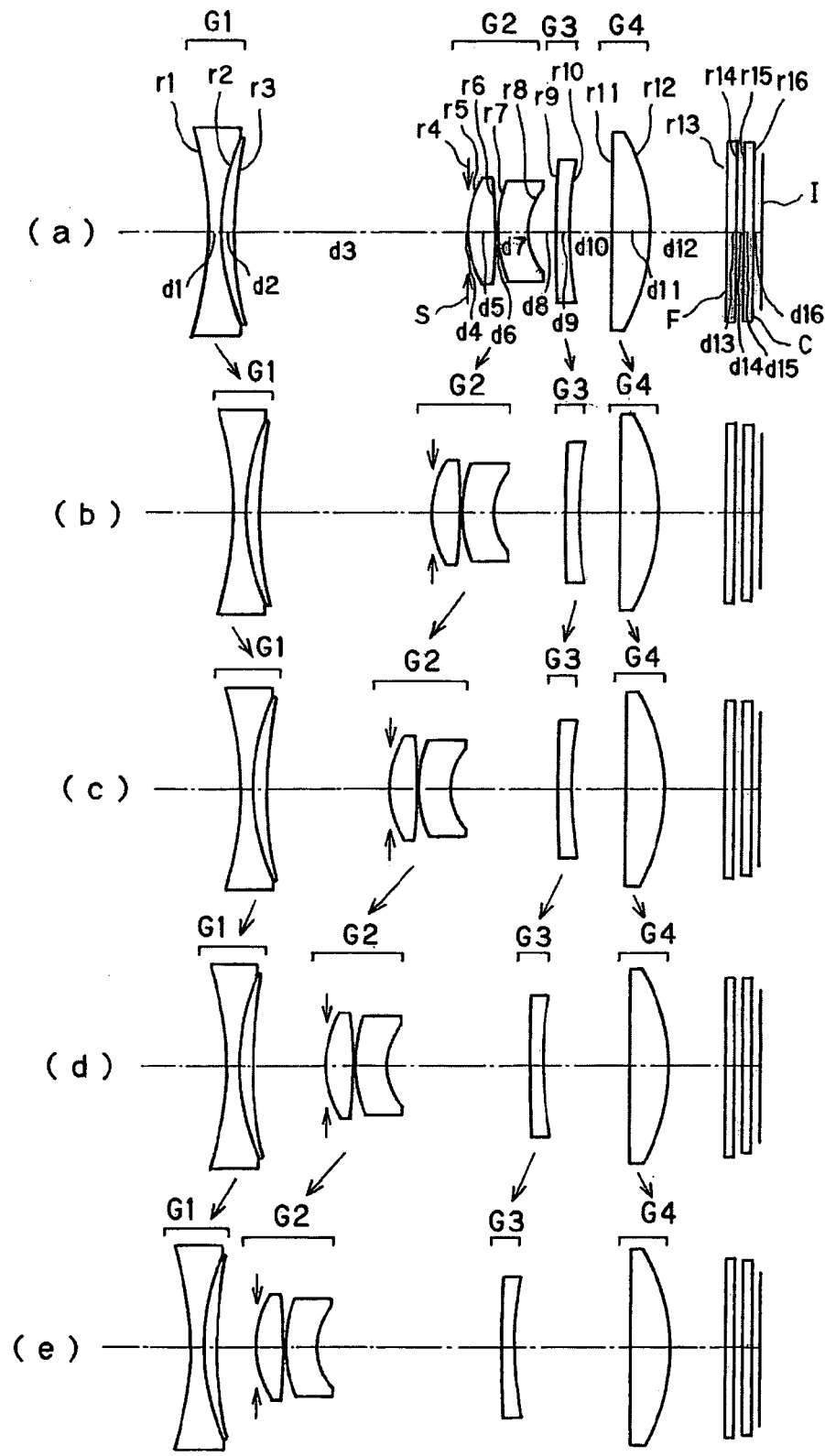
FIG. 10 is illustrative, as in FIG. 1, of Example 10 of the inventive zoom lens.

This example is directed to a zoom lens made up of, in order from its object side, the first lens group G1 having negative refracting power, the aperture stop S, the second lens group G2 having positive refracting power, the third lens group. G3 having negative refracting power and the fourth lens group G4 having positive refracting power, as shown in FIG. 10.

Reference is now made to what states the respective components move in upon zooming from the wide-angle end to the telephoto end.

The first lens group G1 moves toward the image side from the wide-angle end to the intermediate setting, moves toward the object side from the intermediate setting to the telephoto end, and moves in a concave locus toward the object side from the wide-angle end to the telephoto end. At the telephoto end, the first lens group G1 is positioned a little more on the image side than at the wide-angle end.

From the wide-angle end to the telephoto end, a set of the aperture stop S and the second lens group G2 moves integrally toward the object side with a decreasing spacing with the first lens group G1 and an increasing spacing with the third lens group G3. At the telephoto end, that set is positioned more on the object side than at the wide-angle end.

The third lens group G3 moves toward the image side with an increasing spacing with the second lens group G2 and a decreasing spacing with the fourth lens group G4 from the wide-angle end to the point of change on the wide-angle side, moves toward the object side with an increasing spacing with the second G2, and the fourth lens group G4 from the point of change on the wide-angle side to the telephoto end, and moves in a concave locus toward the object side from the wide-angle end to the telephoto end. At the telephoto end, the third lens group G3 is positioned more on the object side than at the wide-angle end.

The fourth lens group G4 moves toward the image side with a decreasing spacing with the third lens group G3 from the wide-angle end to the point of change on the wide-angle side and with an increasing spacing with the third lens group G3 from the point of change on the wide-angle side to the telephoto end. At the telephoto end, the fourth lens group G4 is positioned more on the image side than at the wide-angle end.

In order from the object side, the first lens group G1 is made up of a cemented lens of a double-concave negative lens and a positive meniscus lens convex on its object side; the second lens group G2 is made up of a double-convex positive lens and a negative meniscus lens convex on its object side; the third lens group G3 is made up of one negative meniscus lens convex on its object side; and the fourth lens group G4 is made up of one double-convex positive lens.

Seven aspheric surfaces are used: three at all surfaces of the cemented lens in the first lens group G1, two at both surfaces of the double-convex positive lens in the second lens group G2, one at the image-side surface of the negative meniscus lens in the third lens group G3, and one at the image-side surface of the double-convex positive lens in the fourth lens group G4.

Example 11

Figure 11:
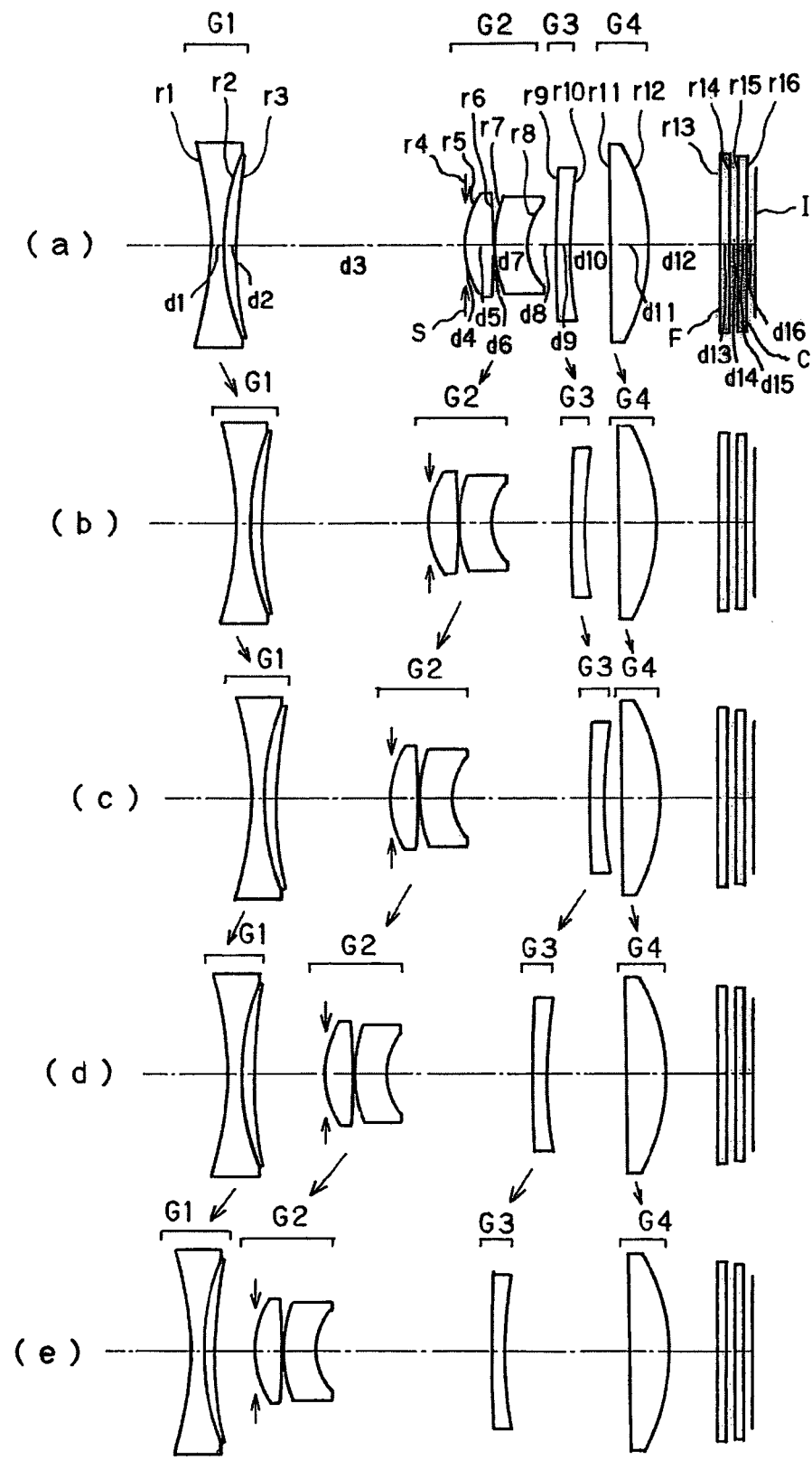
FIG. 11 is illustrative, as in FIG. 1, of Example 11 of the inventive zoom lens.
Figure 12:
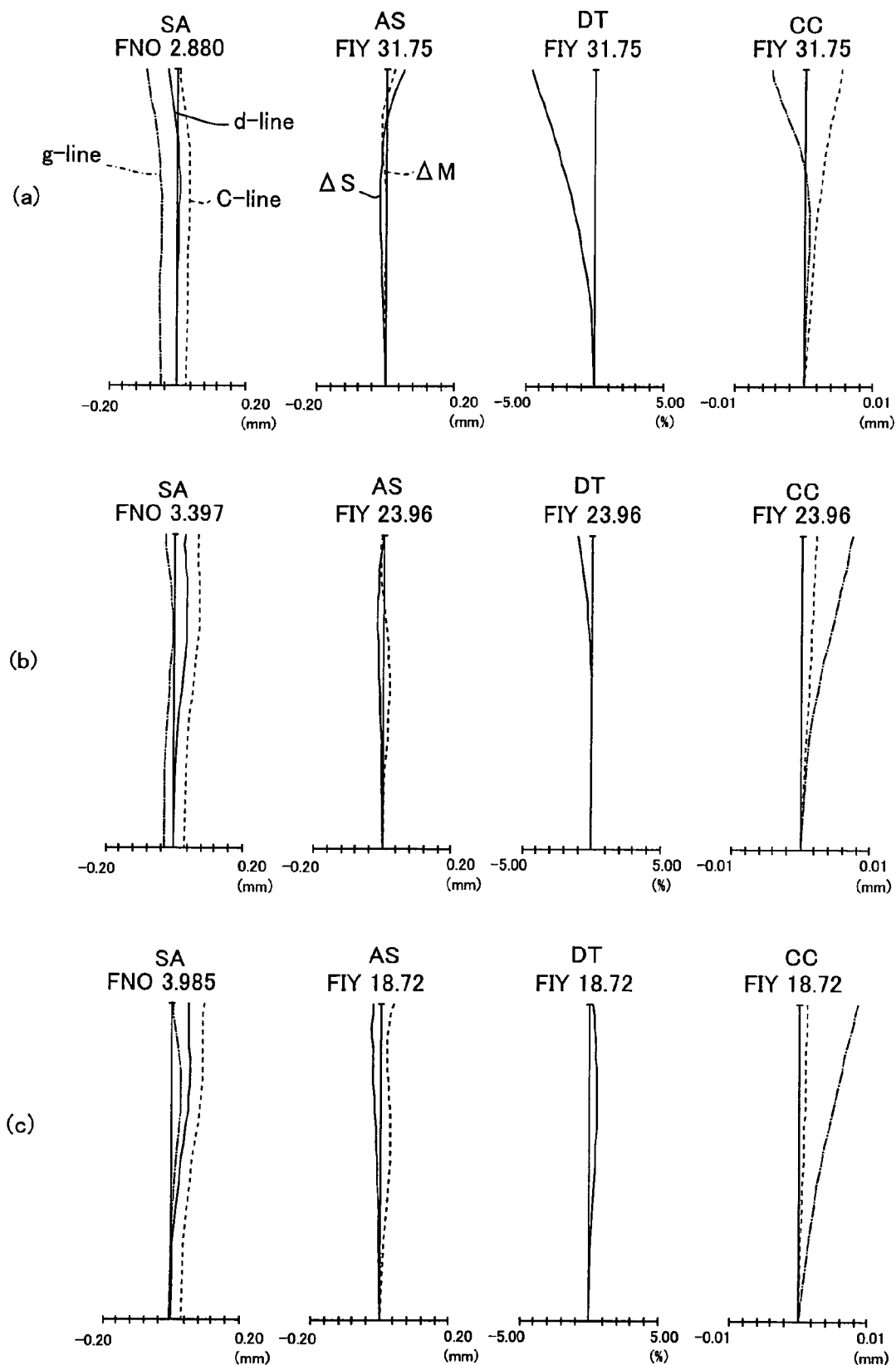
FIG. 12 is an aberration diagram for Example 1 upon focusing on an object point at infinity.
Figure 13:
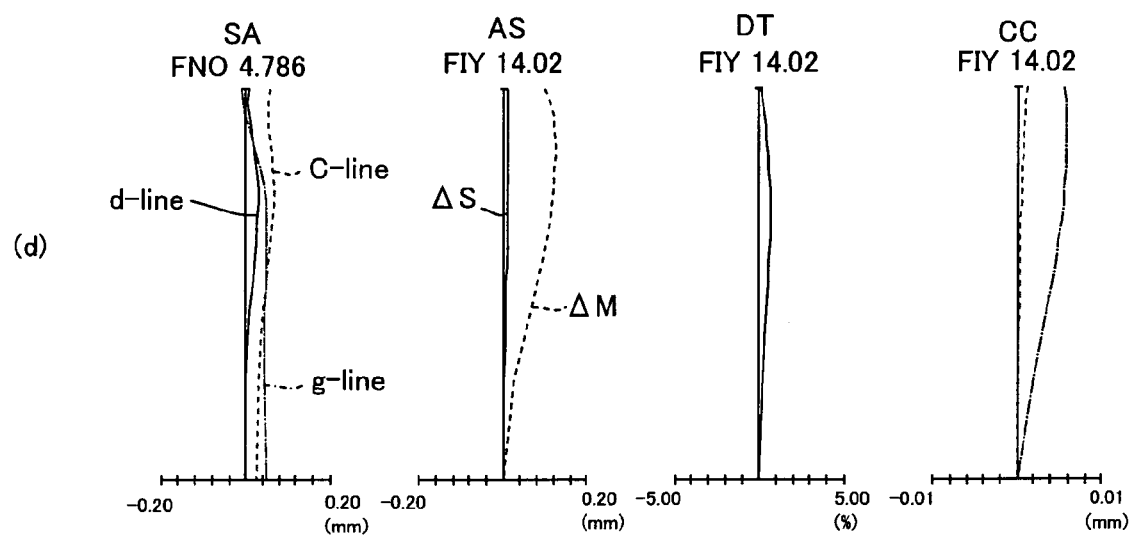
FIG. 13 is an aberration diagram for Example 1 upon focusing on an object point at infinity.
Figure 13:
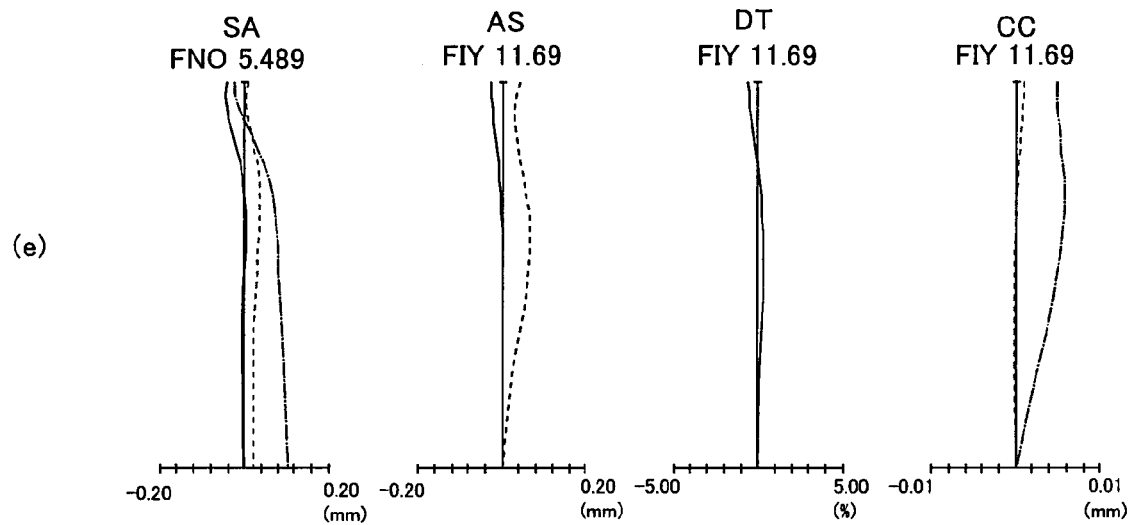
Figure 14:
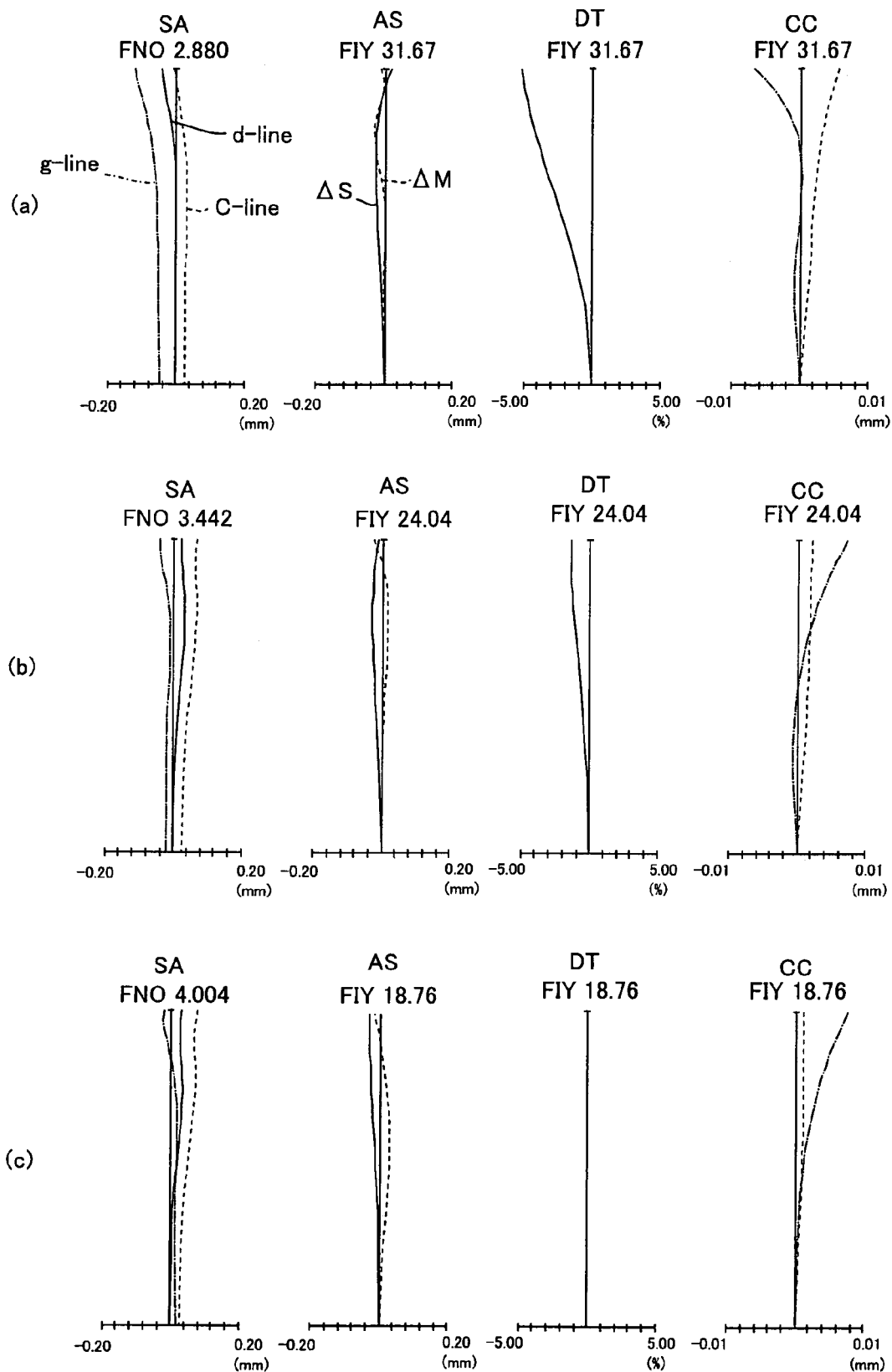
FIG. 14 is an aberration diagram for Example 2 upon focusing on an object point at infinity.
Figure 15:
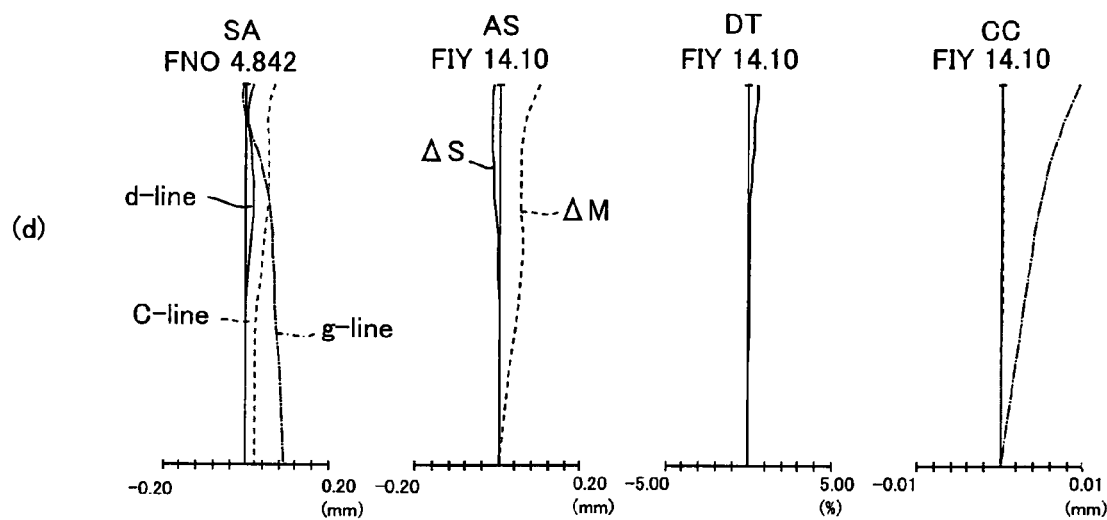
FIG. 15 is an aberration diagram for Example 2 upon focusing on an object point at infinity.
Figure 15:
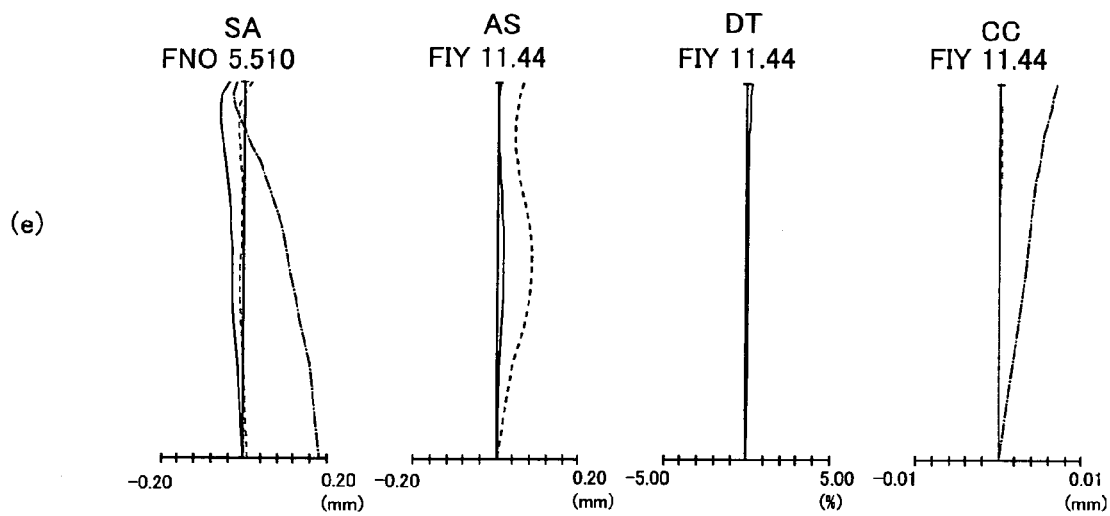
Figure 16:
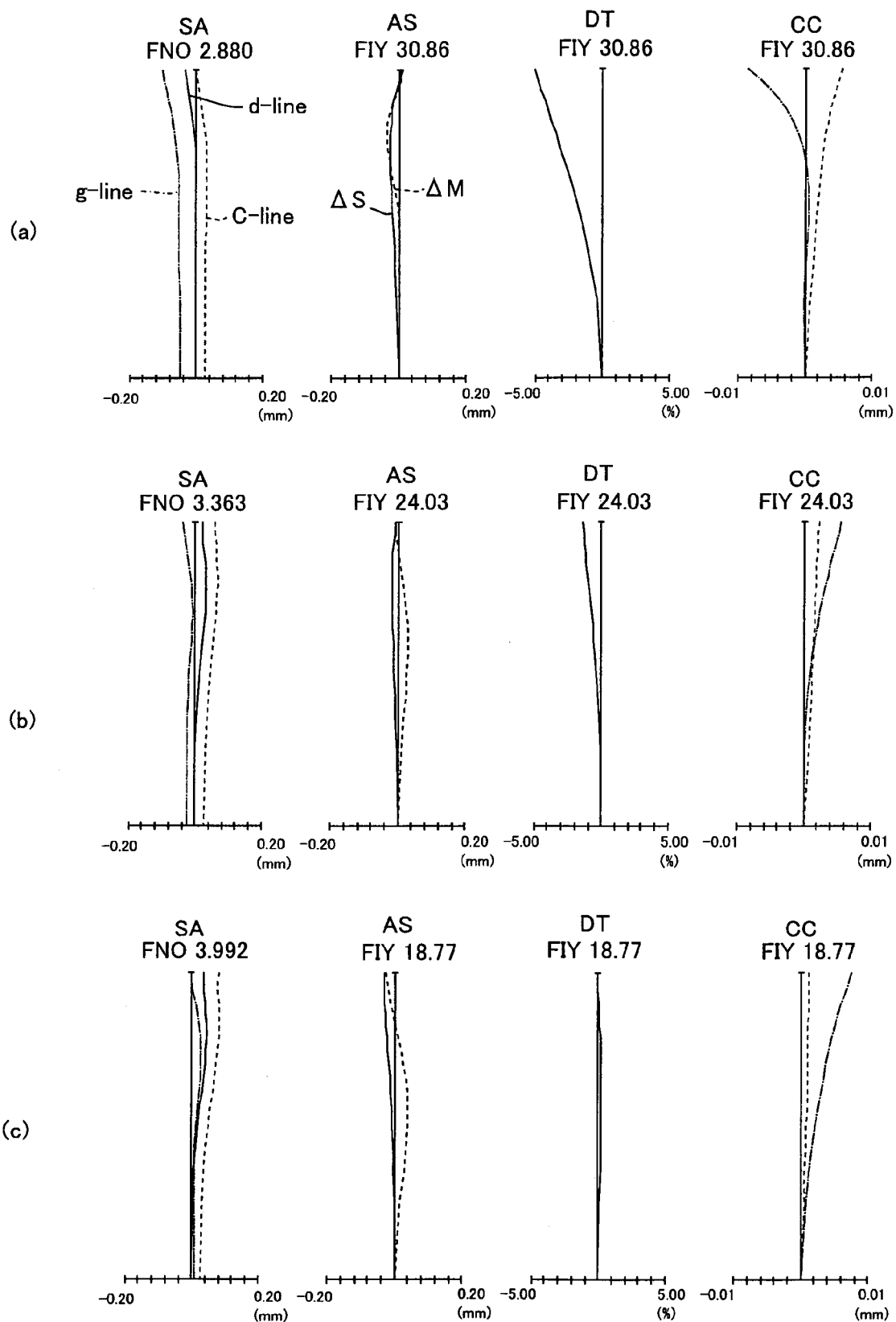
FIG. 16 is an aberration diagram for Example 3 upon focusing on an object point at infinity.
Figure 17:
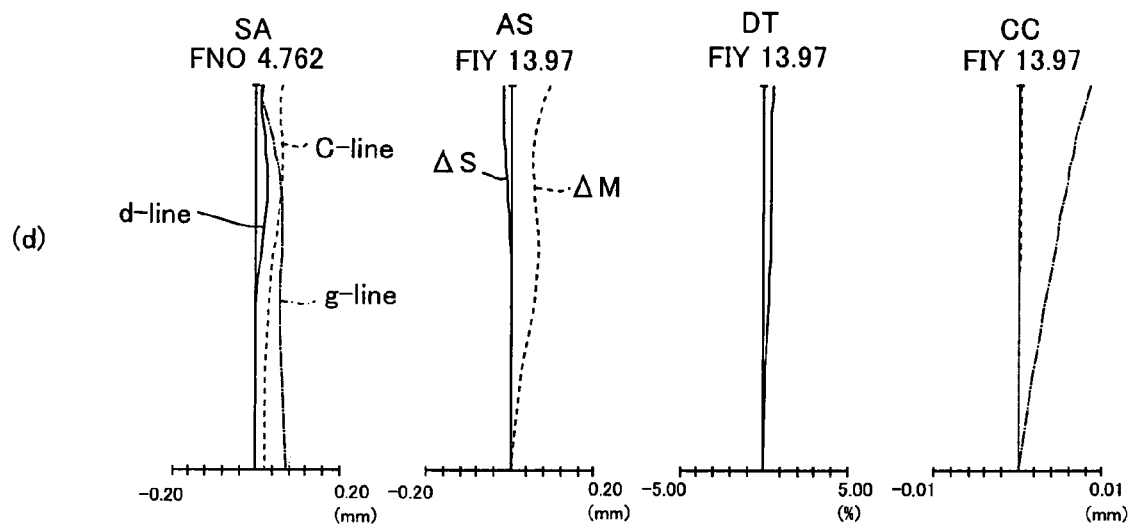
FIG. 17 is an aberration diagram for Example 3 upon focusing on an object point at infinity.
Figure 17:
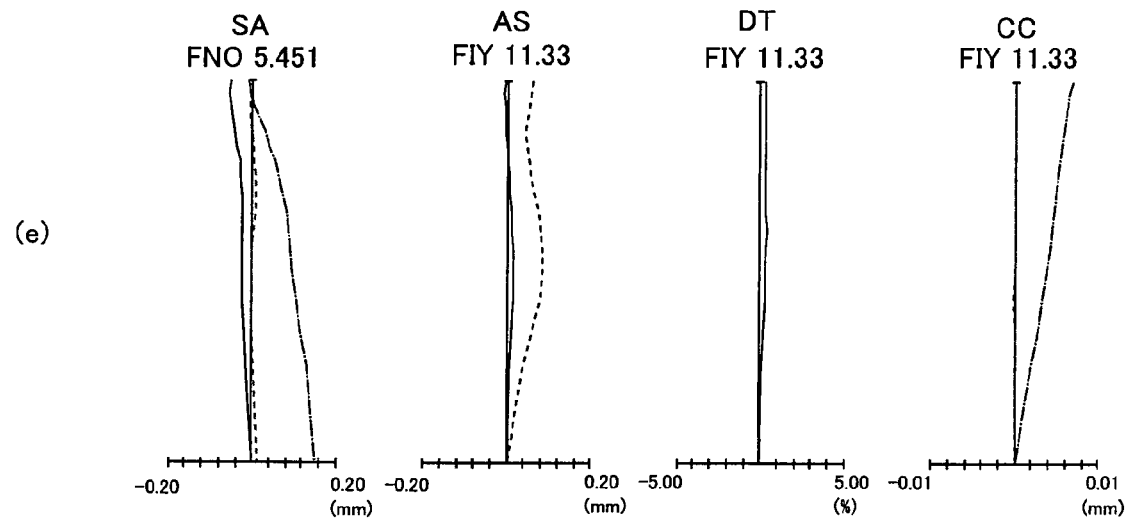
Figure 18:
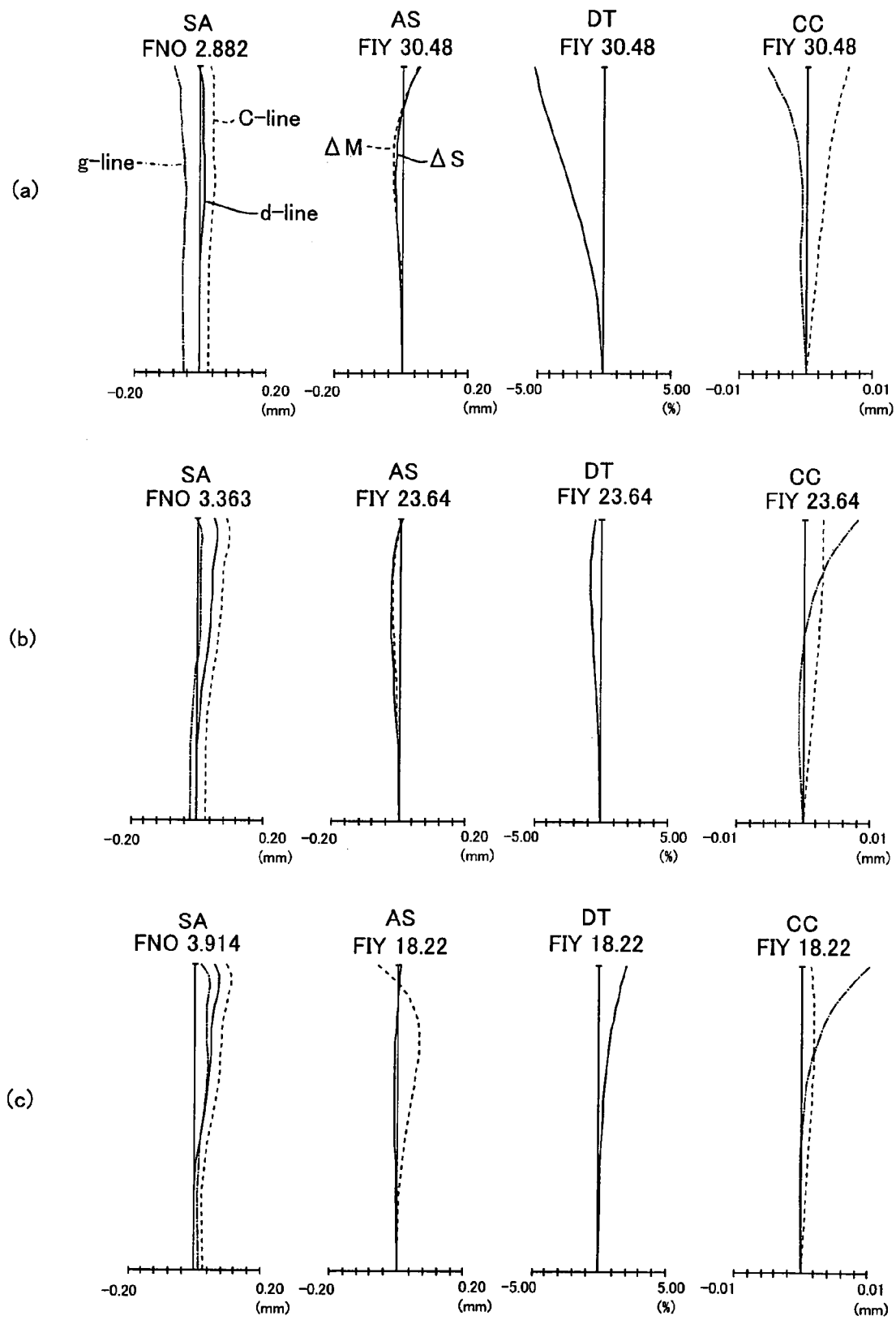
FIG. 18 is an aberration diagram for Example 4 upon focusing on an object point at infinity.
Figure 19:
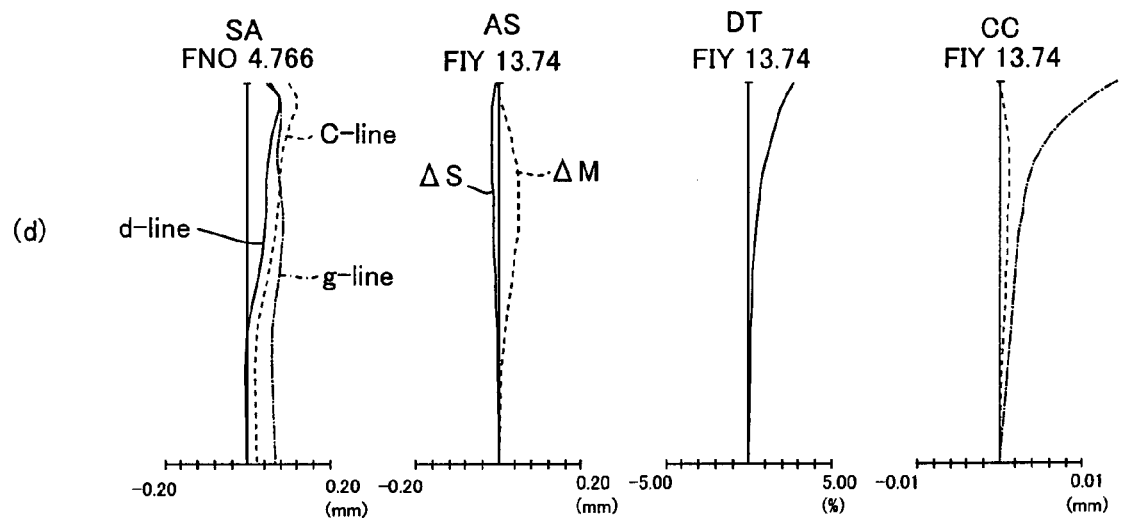
FIG. 19 is an aberration diagram for Example 4 upon focusing on an object point at infinity.
Figure 19:
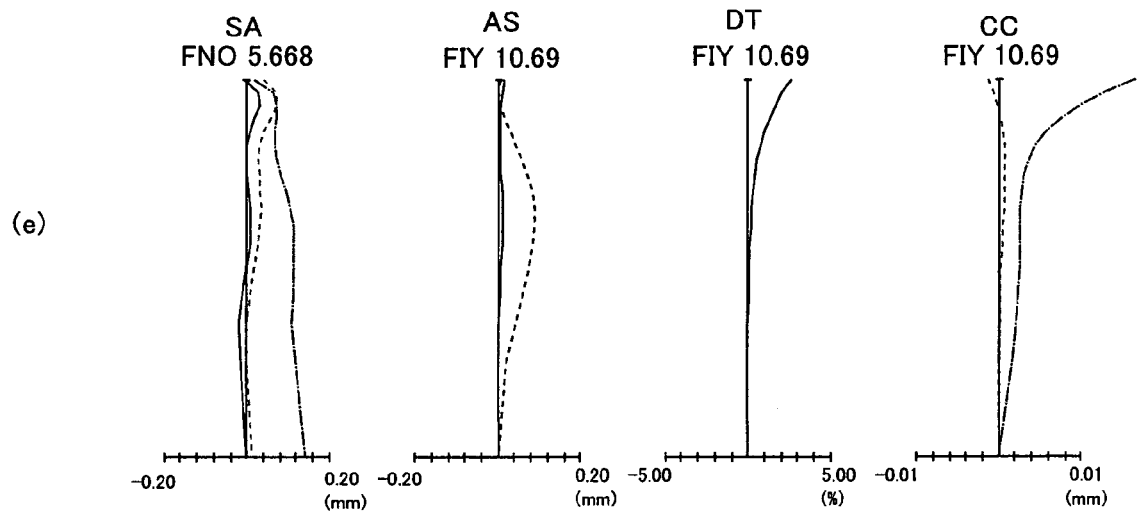
Figure 20:
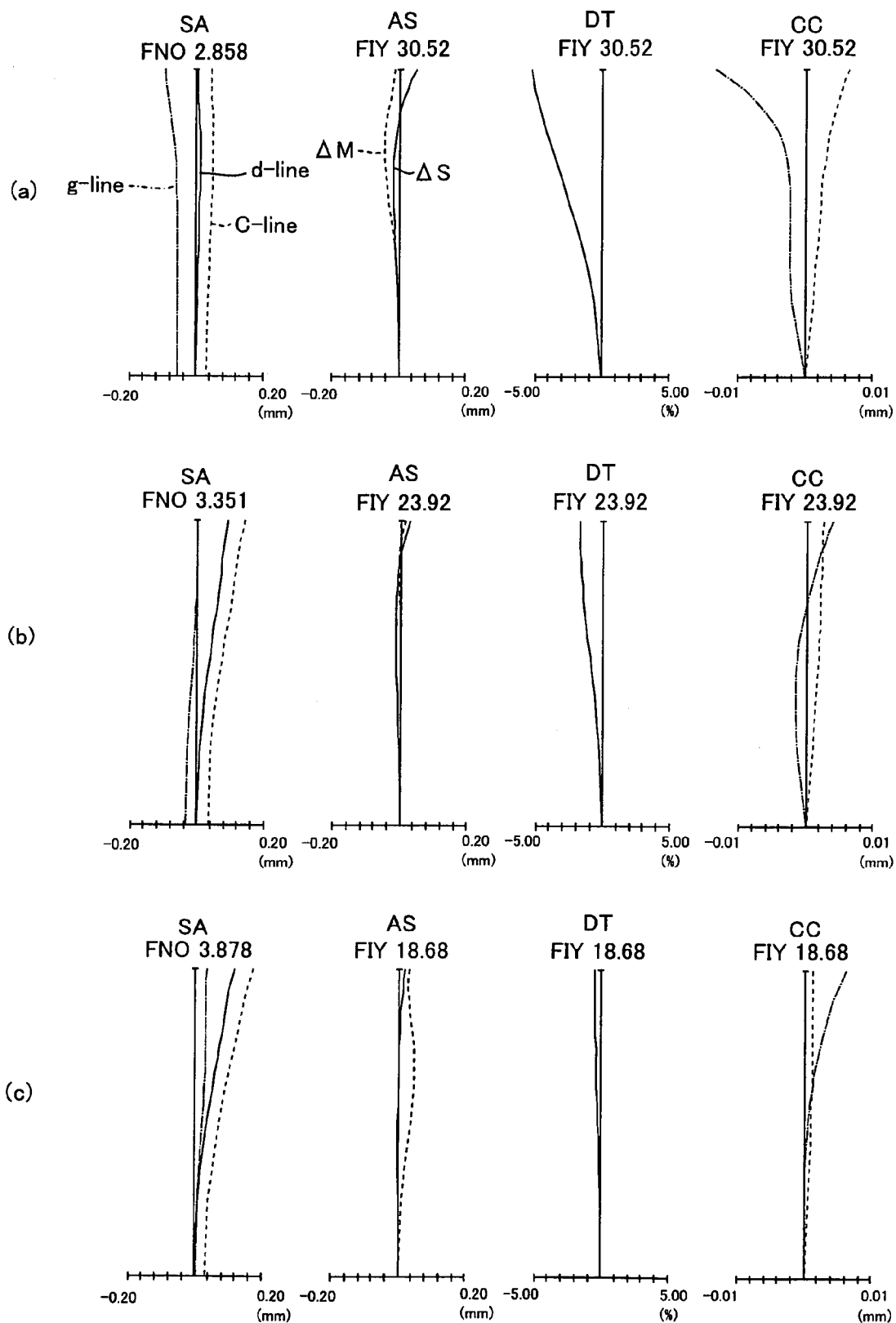
FIG. 20 is an aberration diagram for Example 5 upon focusing on an object point at infinity.
Figure 21:
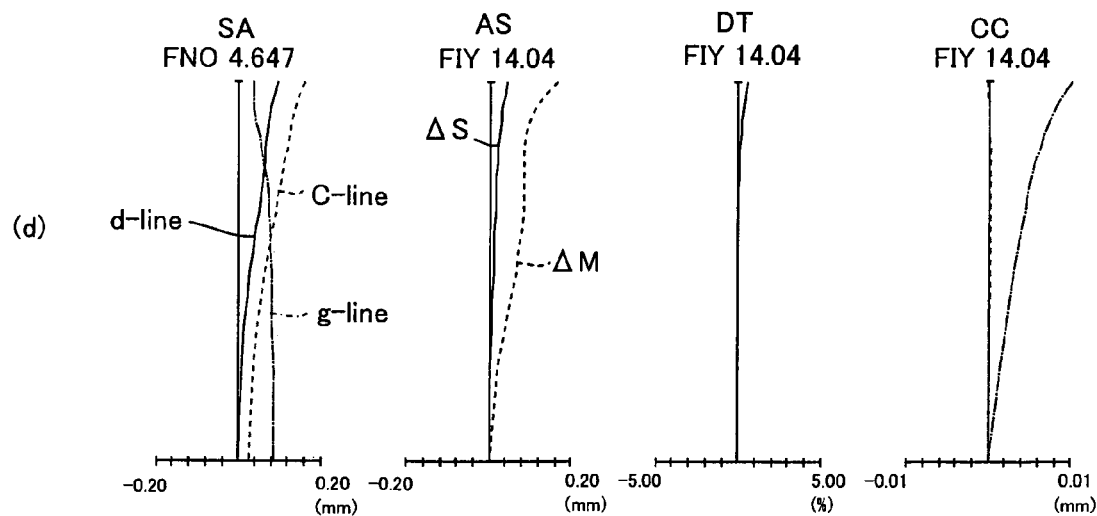
FIG. 21 is an aberration diagram for Example 5 upon focusing on an object point at infinity.
Figure 21:
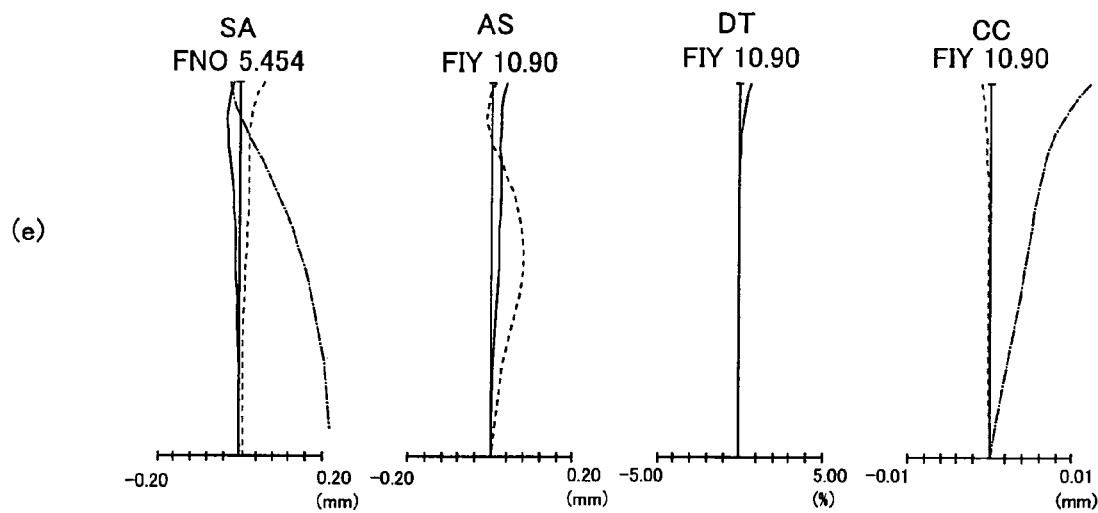
Figure 22:
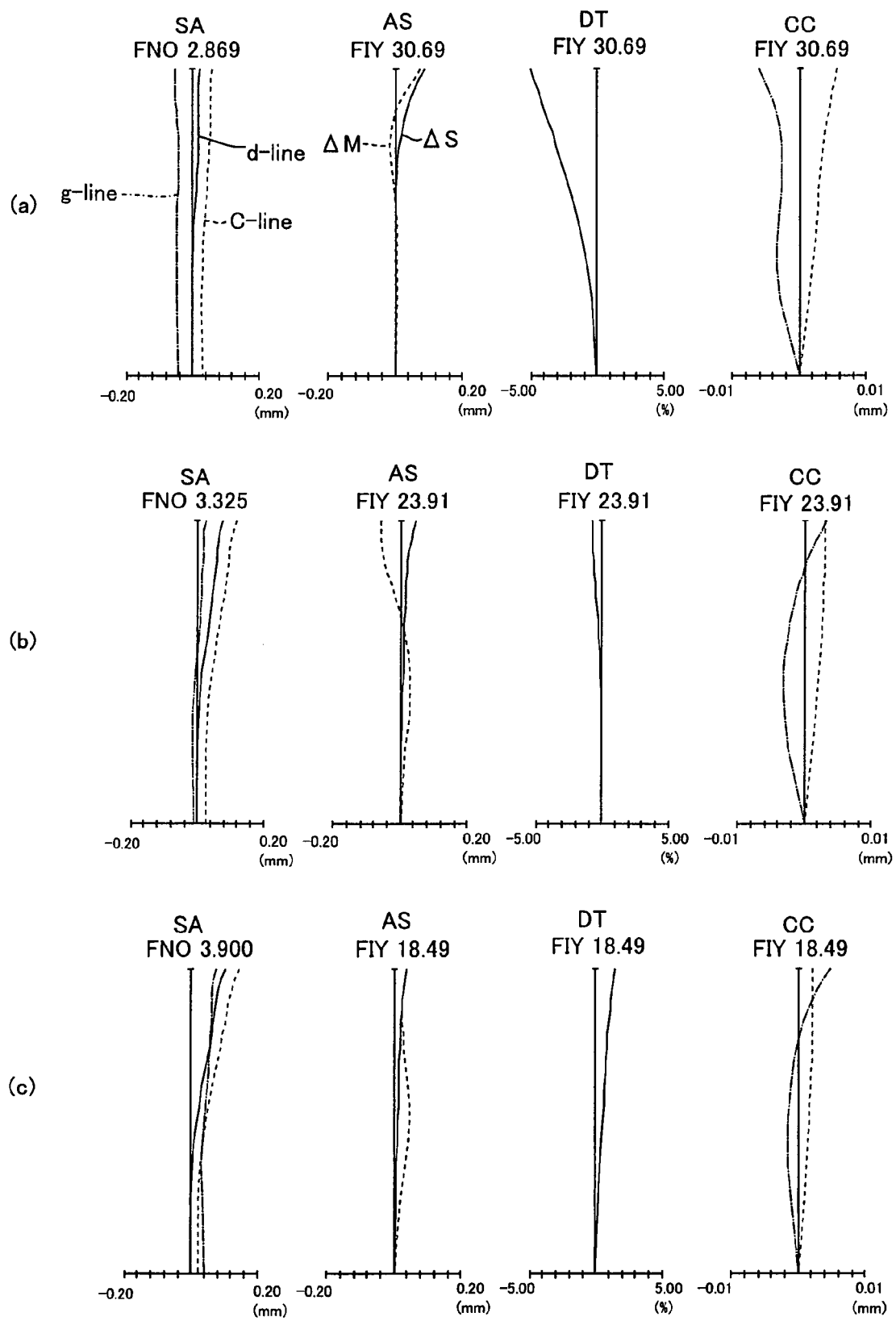
FIG. 22 is an aberration diagram for Example 6 upon focusing on an object point at infinity.
Figure 23:
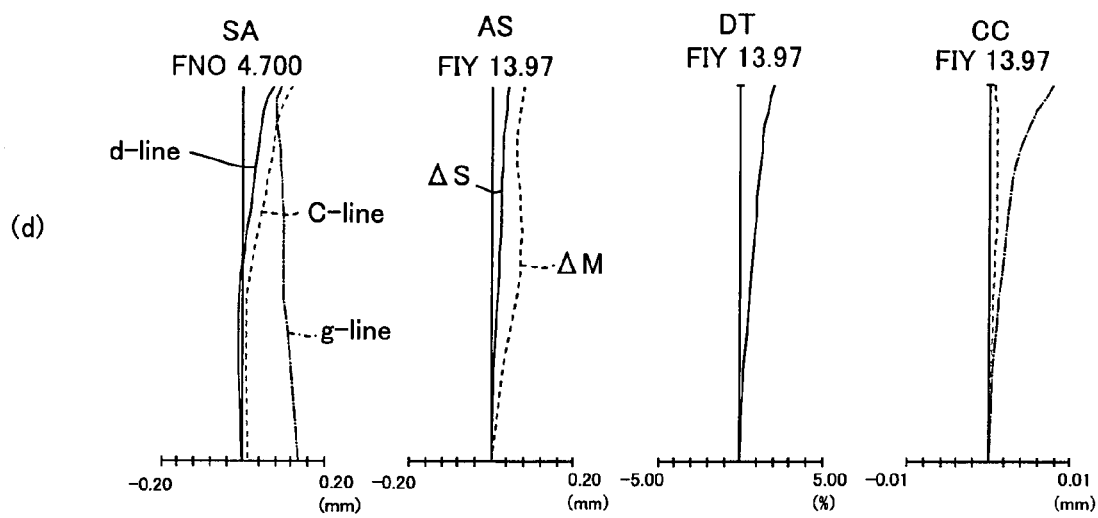
FIG. 23 is an aberration diagram for Example 6 upon focusing on an object point at infinity.
Figure 23:
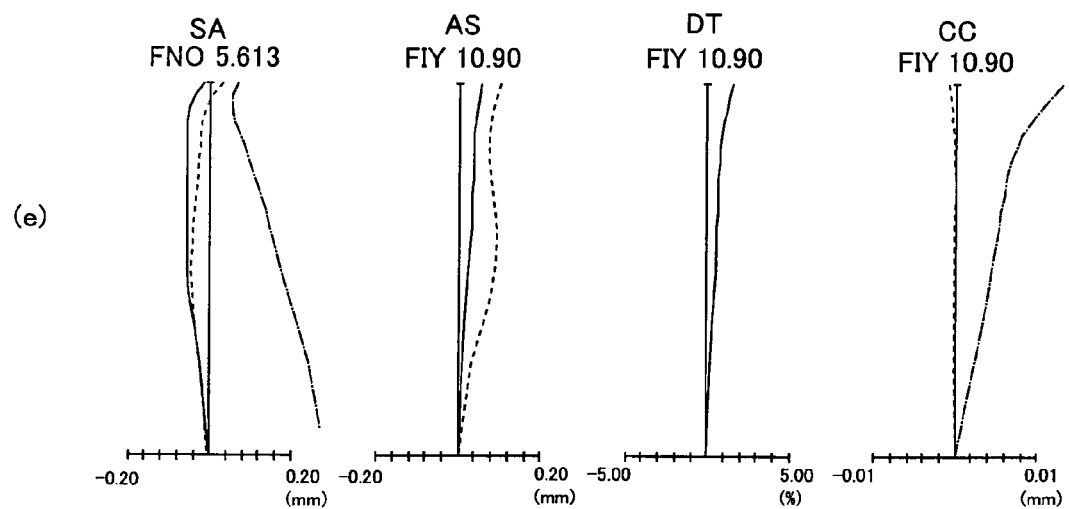
Figure 24:
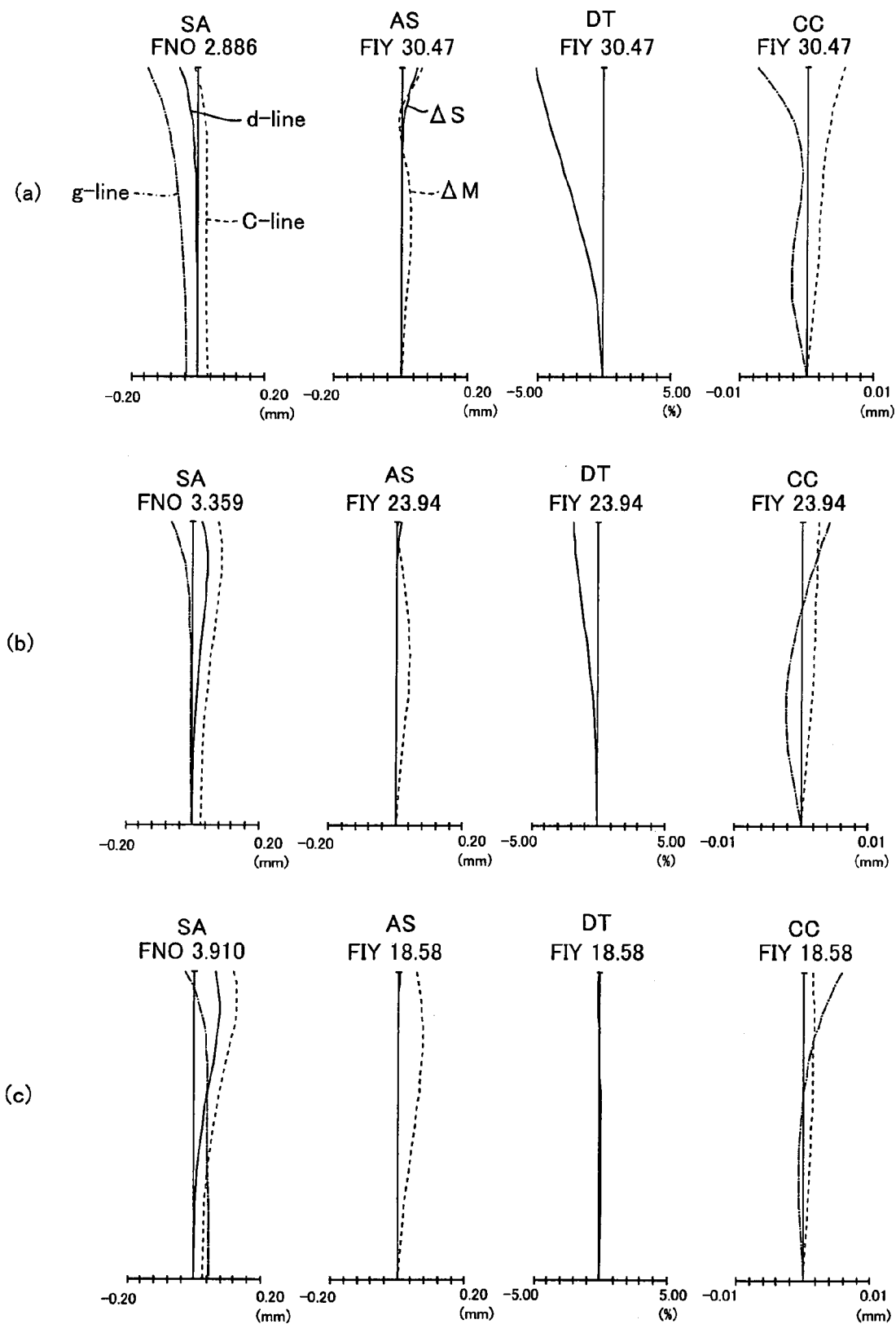
FIG. 24 is an aberration diagram for Example 7 upon focusing on an object point at infinity.
Figure 25:
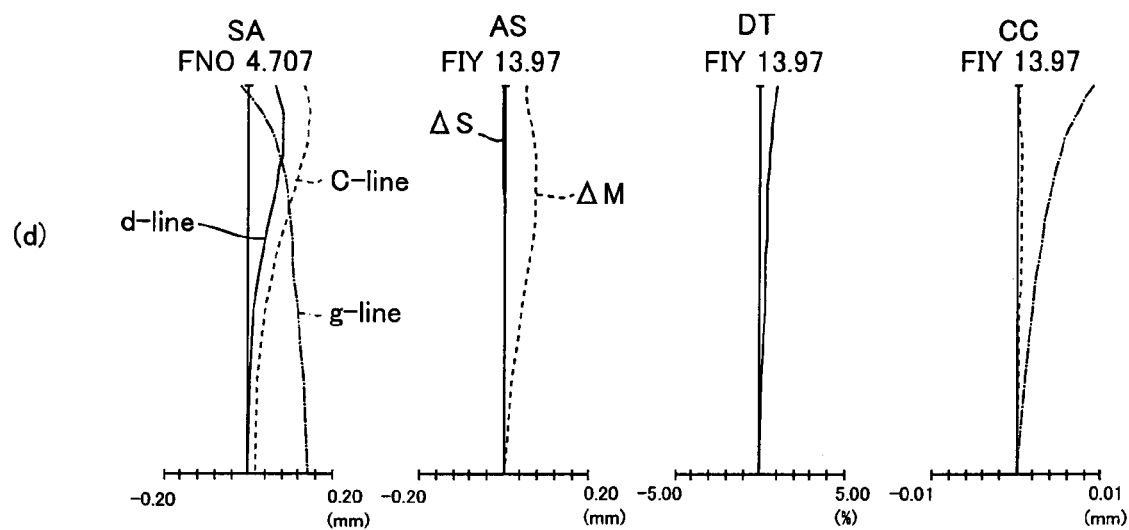
FIG. 25 is an aberration diagram for Example 7 upon focusing on an object point at infinity.
Figure 25:
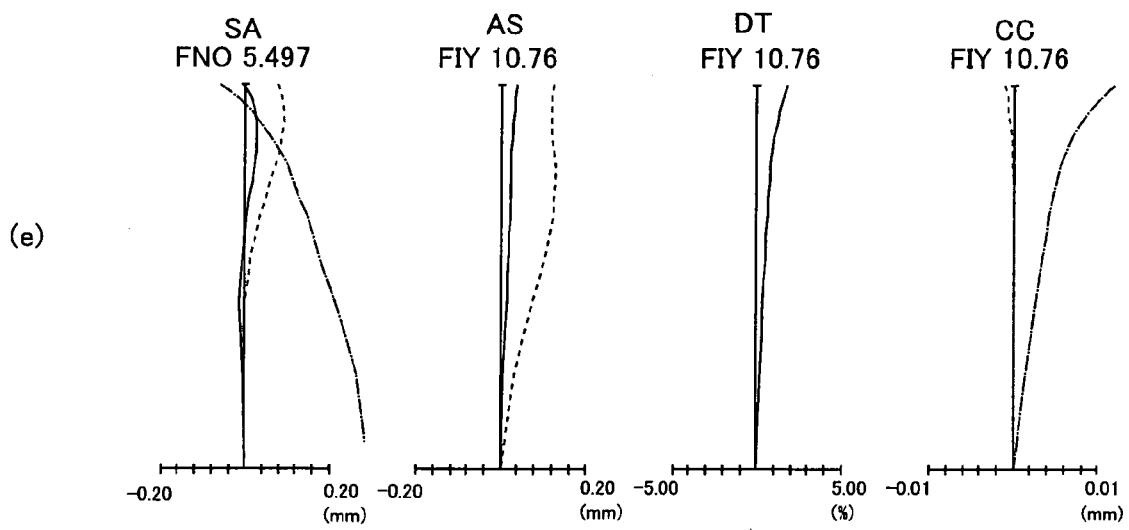
Figure 26:
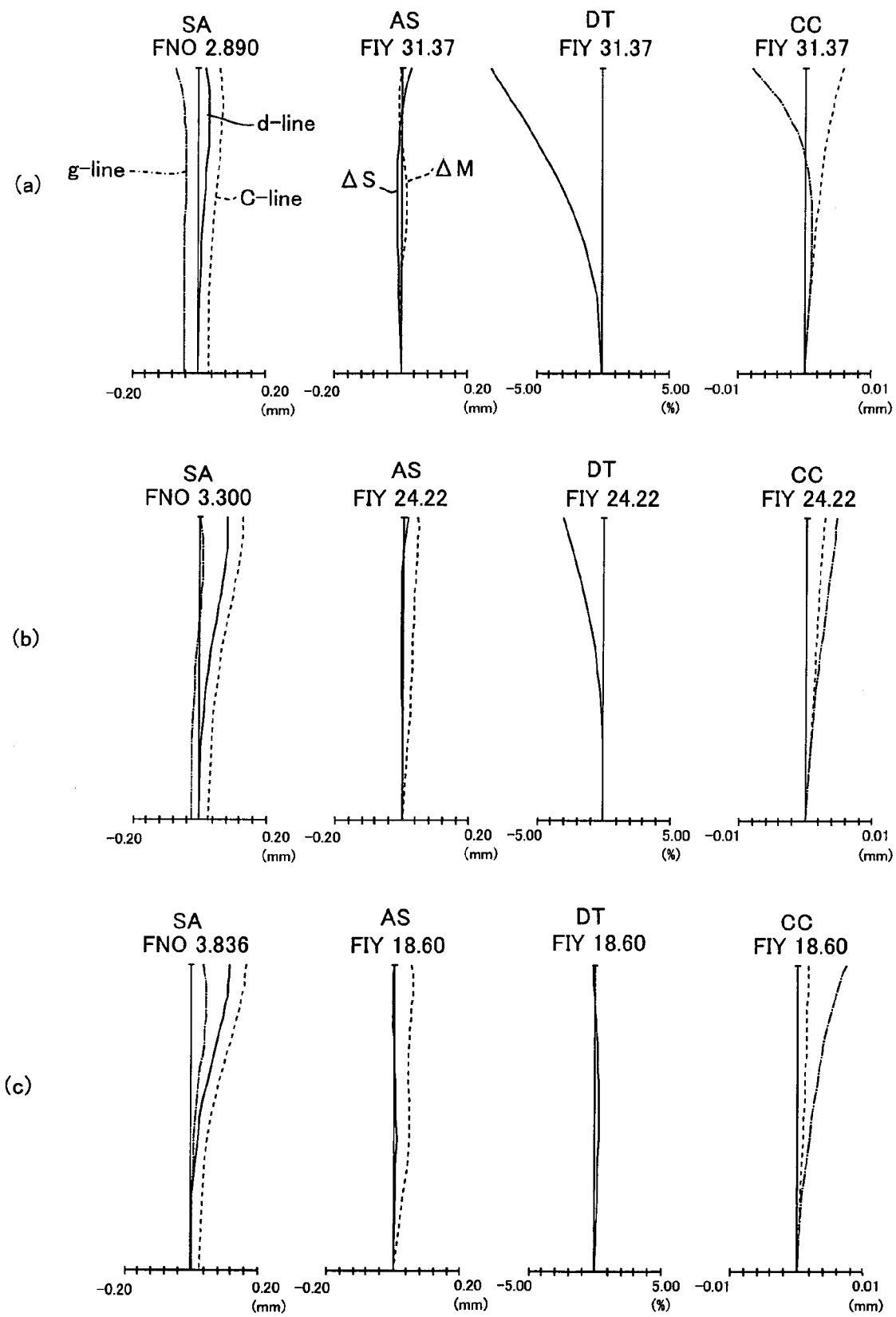
FIG. 26 is an aberration diagram for Example 8 upon focusing on an object point at infinity.
Figure 27:
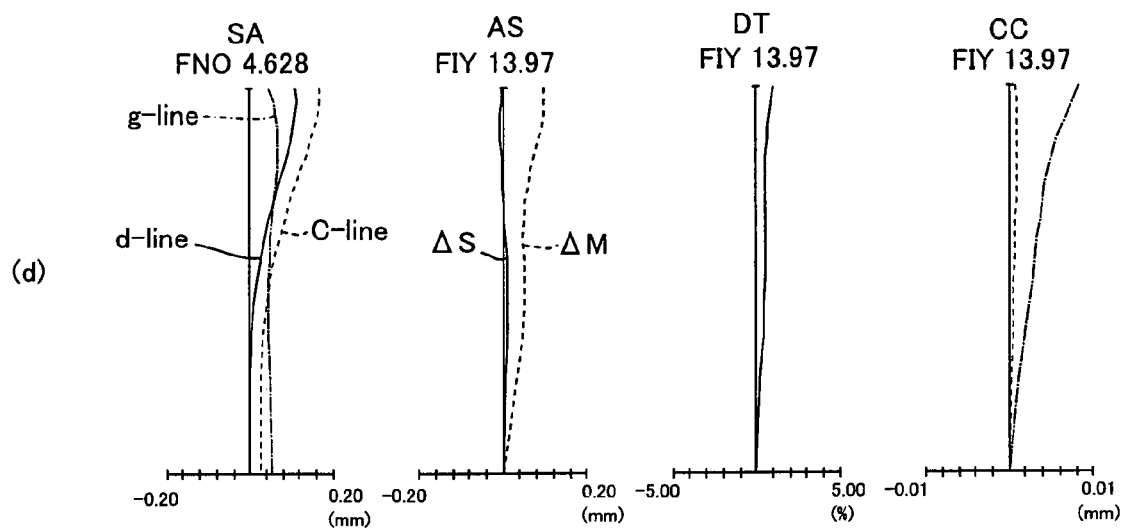
FIG. 27 is an aberration diagram for Example 8 upon focusing on an object point at infinity.
Figure 27:
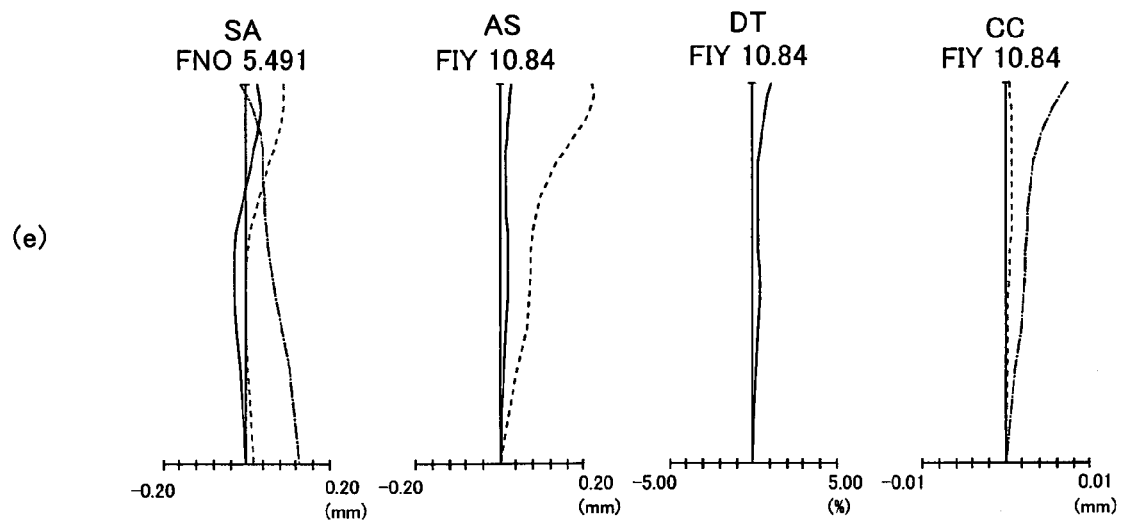
Figure 28:
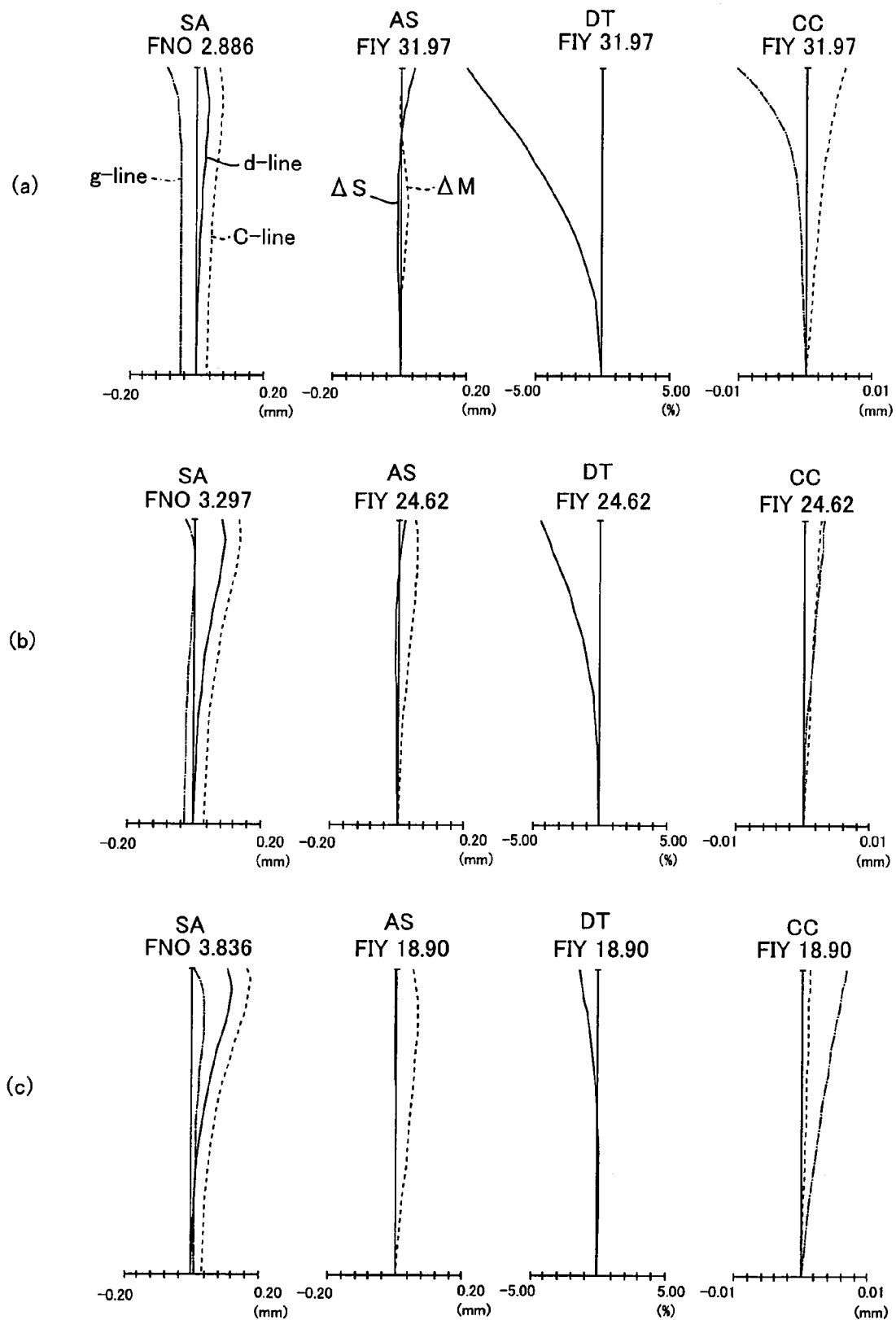
FIG. 28 is an aberration diagram for Example 9 upon focusing on an object point at infinity.
Figure 29:
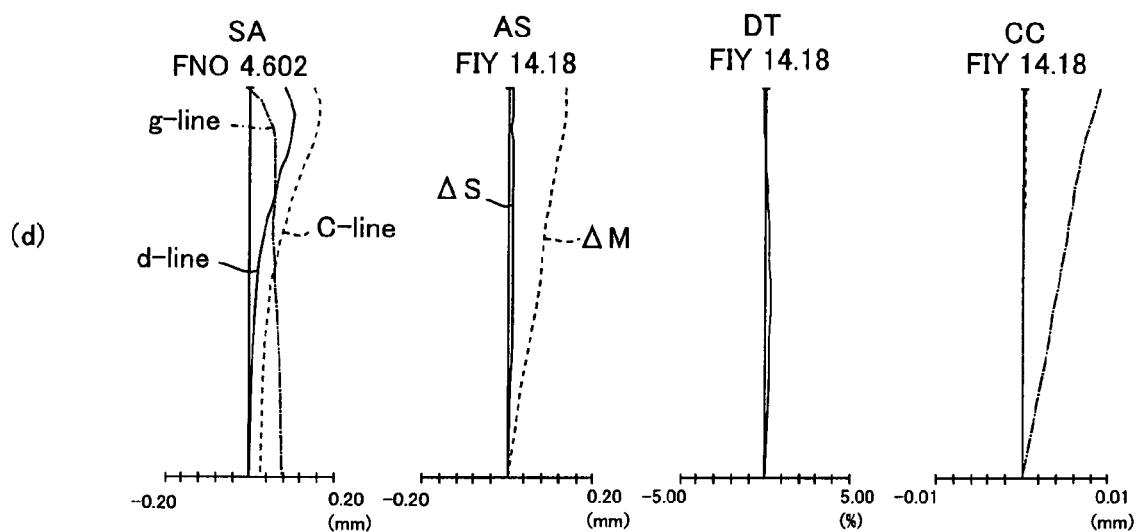
FIG. 29 is an aberration diagram for Example 9 upon focusing on an object point at infinity.
Figure 29:
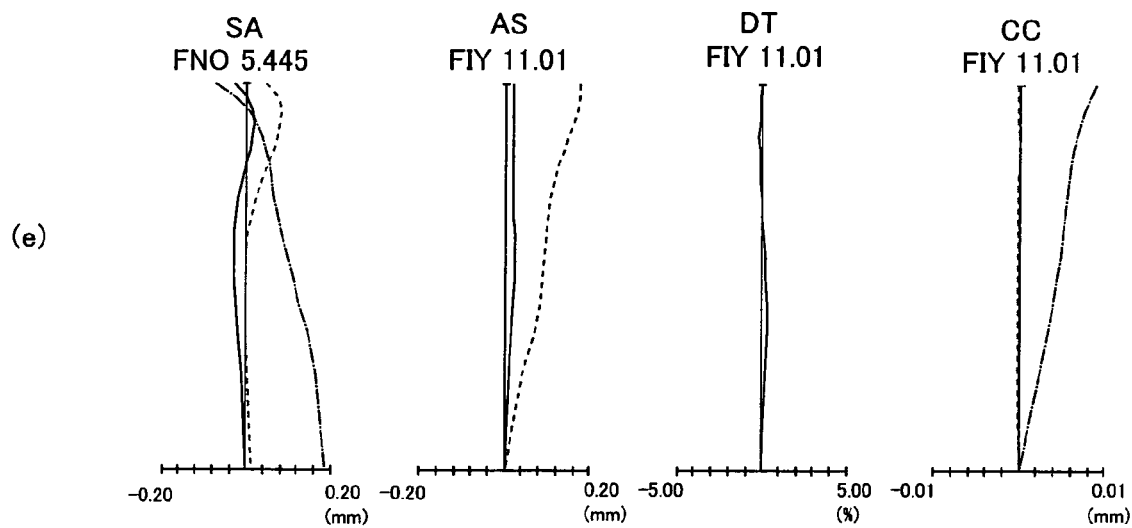
Figure 30:
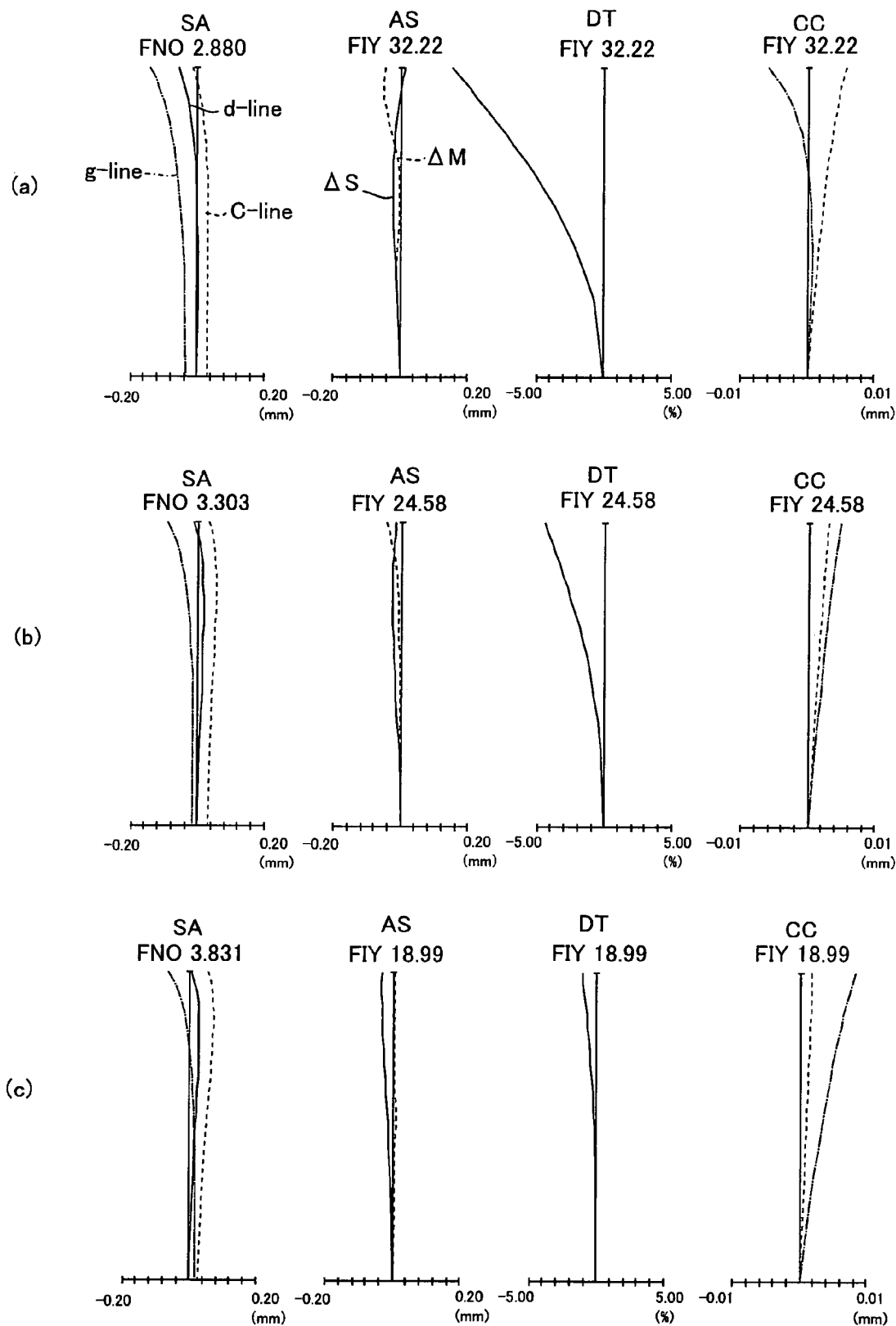
FIG. 30 is an aberration diagram for Example 10 upon focusing on an object point at infinity.
Figure 31:
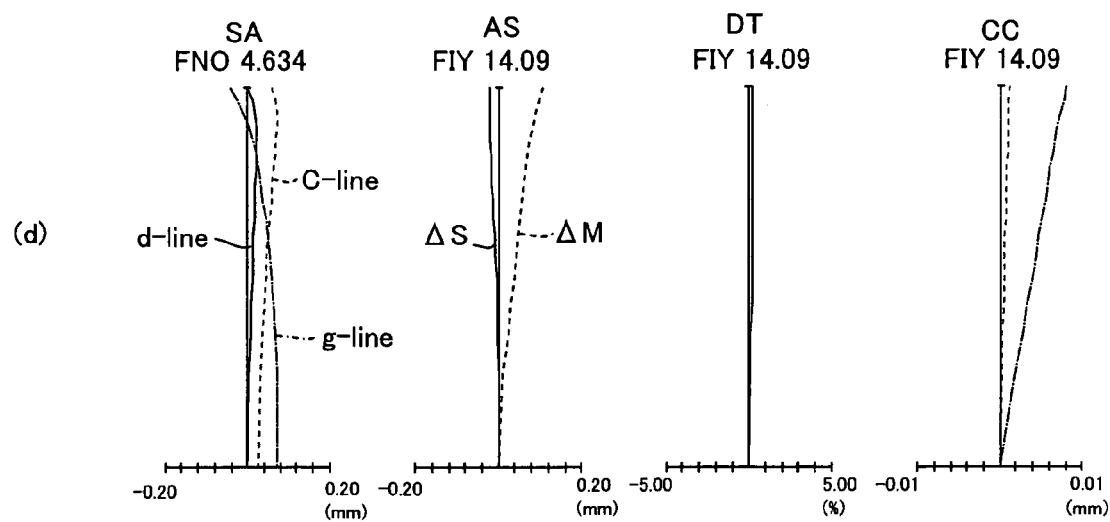
FIG. 31 is an aberration diagram for Example 10 upon focusing on an object point at infinity.
Figure 31:
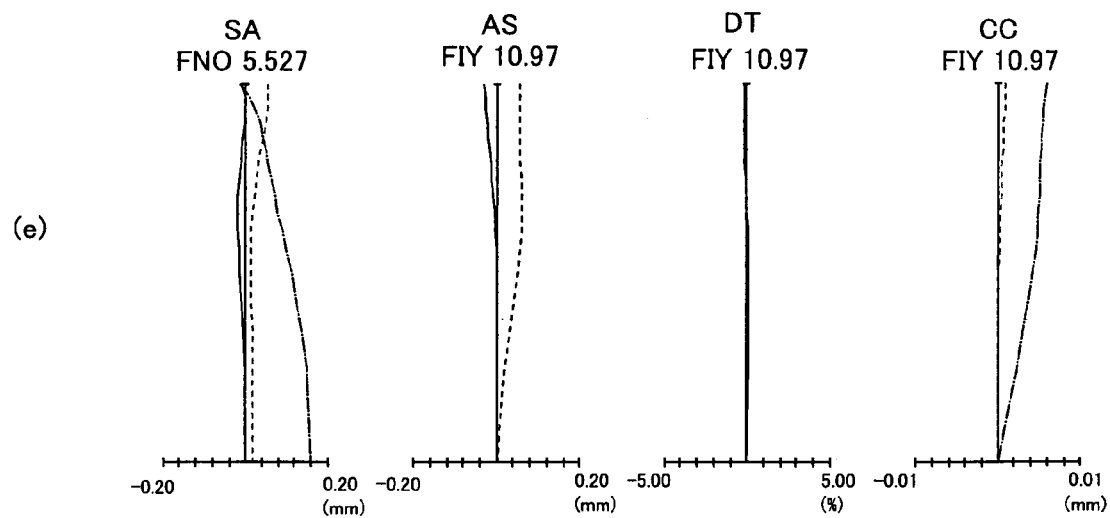
Figure 32:
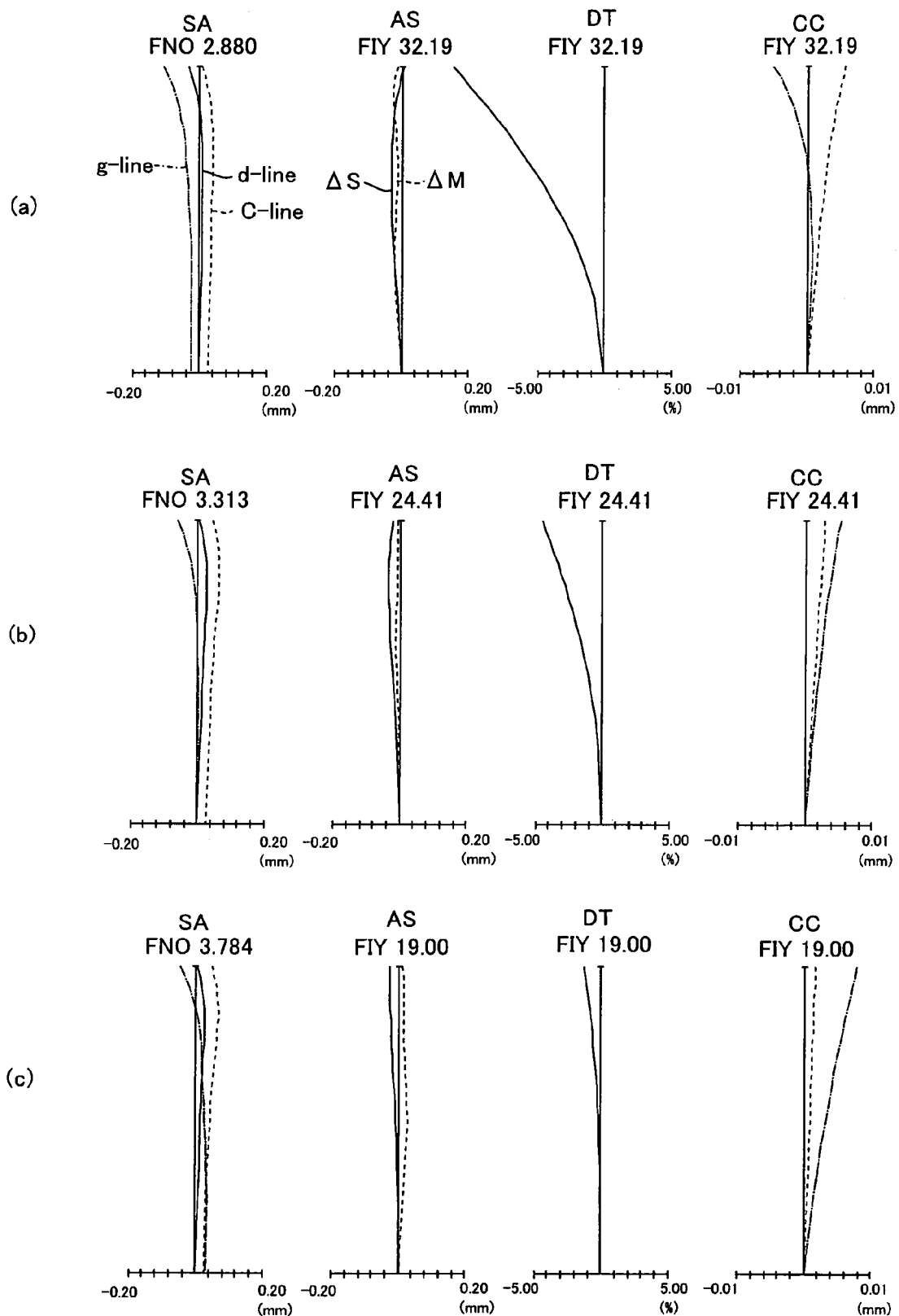
FIG. 32 is an aberration diagram for Example 11 upon focusing on an object point at infinity.
Figure 33:
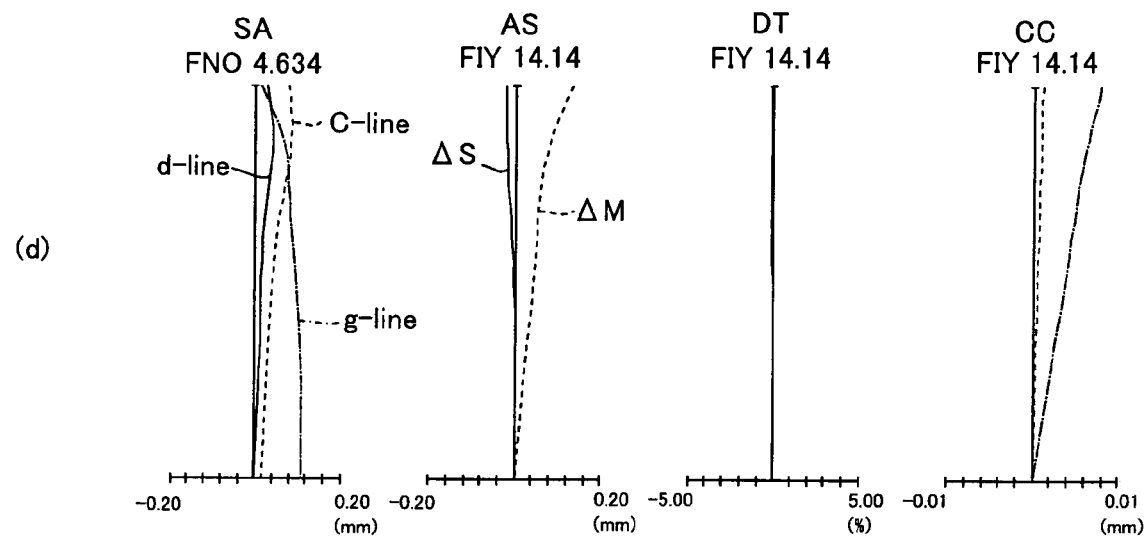
FIG. 33 is an aberration diagram for Example 11 upon focusing on an object point at infinity.
Figure 33:
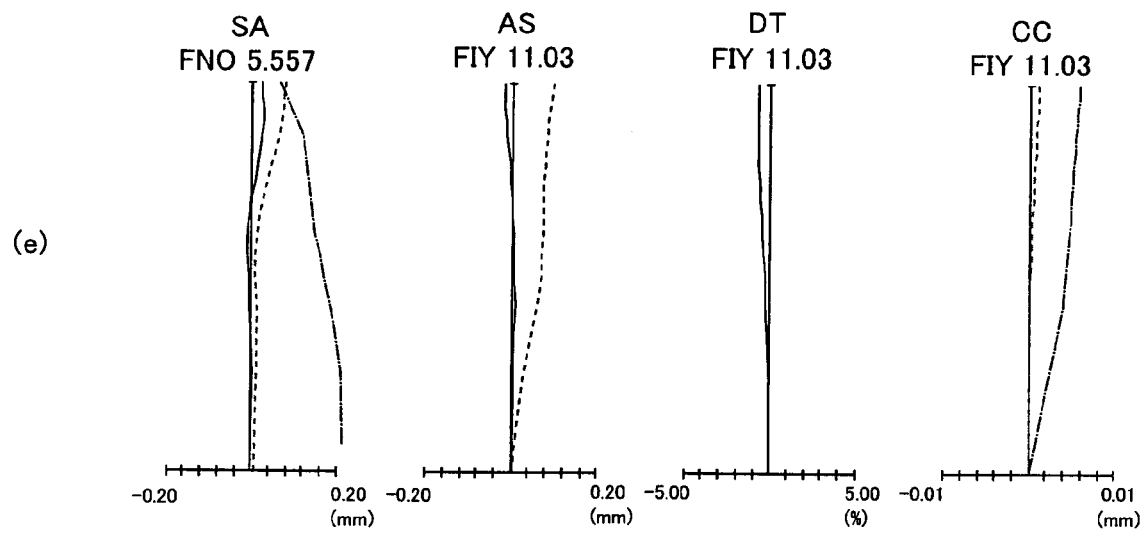

This example is directed to a zoom lens made up of, in order from its object side, the first lens group G1 having negative refracting power, the aperture stop S, the second lens group G2 having positive refracting power, the third lens group G3 having negative refracting power and the fourth lens group G4 having positive refracting power, as shown in FIG. 11.

Reference is now made to what states the respective components move in upon zooming from the wide-angle end to the telephoto end.

The first lens group G1 moves toward the image side from the wide-angle end to the intermediate setting, moves toward the object side from the intermediate setting to the telephoto end, and moves in a concave locus toward the object side from the wide-angle end to the telephoto end. At the telephoto end, the first lens group G1 is positioned more on the image side than at the wide-angle end.

From the wide-angle end to the telephoto end, a set of the aperture stop S and the second lens group G2 moves integrally toward the object side with a decreasing spacing with the first lens group G1 and an increasing spacing with the third lens group G3. At the telephoto end, that set is positioned more on the object side than at the wide-angle end.

The third lens group G3 moves toward the image side with an increasing spacing with the second lens group G2 and a decreasing spacing with the fourth lens group G4 from the wide-angle end to the intermediate setting, moves toward the object side with an increasing spacing with the second G2, and the fourth lens group G4 from the intermediate setting to the telephoto end, and moves in a concave locus toward the object side from the wide-angle end to the telephoto end. At the telephoto end, the third lens group G3 is positioned more on the object side than at the wide-angle end.

The fourth lens group G4 moves toward the image side with a decreasing spacing with the third lens group G3 from the wide-angle end to the intermediate setting and with an increasing spacing with the third lens group G3 from the intermediate setting to the telephoto end. At the telephoto end, the fourth lens group G4 is positioned more on the image side than at the wide-angle end.

In order from the object side, the first lens group G1 is made up of a cemented lens of a double-concave negative lens and a positive meniscus lens convex on its object side; the second lens group G2 is made up of a double-convex positive lens and a negative meniscus lens convex on its object side; the third lens group G3 is made up of one negative meniscus lens convex on its object side; and the fourth lens group G4 is made up of one positive meniscus lens convex on its image side.

Seven aspheric surfaces are used: three at all surfaces of the cemented lens in the first lens group G1, two at both surfaces of the double-convex positive lens in the second lens group G2, one at the image-side surface of the negative meniscus lens in the third lens group G3, and one at the image-side surface of the positive meniscus lens in the fourth lens group G4.

Numerical data on the lenses in the respective examples are set out below.

Here, R is the radius of curvature of each lens surface; D is the thickness of each lens across; Nd is the d-line refractive index of each lens; vd is the d-line Abbe constant of each lens; K is the conical coefficient; A4, A6, A8, and A10 is the aspheric coefficient; and $E\pm n$ is $\times 10^{\pm n}$.

Each aspheric surface in each example is expressed by the following equation using each aspheric coefficient in each example.

$$Z=(Y^2/r)/[1+\{1-(1+K)\cdot(Y/r)^2\}^{1/2}]+A4\times Y^4+A6\times Y^6+A8\times Y^8+A10\times Y^{10}$$

where Z is the coordinates in the axial direction, and Y is the coordinates in the direction perpendicular to the optical axis.

Numerical Example 1

Unit mm

Surface Data

| Surface No. | r | d | nd | vd |
|---|---|---|---|---|
| 1 (Aspheric) | −11.981 | 0.70 | 1.58313 | 59.38 |
| 2 (Aspheric) | 37.532 | 0.70 | 1.63494 | 23.22 |
| 3 (Aspheric) | −210.729 | Variable | | |
| 4 (Stop) | ∞ | 0.00 | | |
| 5 (Aspheric) | 4.871 | 1.50 | 1.83481 | 42.71 |
| 6 (Aspheric) | −86.685 | 0.15 | | |
| 7 | 13.016 | 1.08 | 1.88300 | 40.76 |
| 8 | 457.725 | 0.51 | 1.80518 | 25.42 |

-continued

Unit mm

| | | | | |
|---|---|---|---|---|
| 9 | 3.309 | Variable | | |
| 10 | 50.796 | 0.80 | 1.52542 | 55.78 |
| 11 (Aspheric) | 23.127 | Variable | | |
| 12 | 30.869 | 2.60 | 1.58313 | 59.38 |
| 13 (Aspheric) | −9.130 | Variable | | |
| 14 | ∞ | 0.50 | 1.54771 | 62.84 |
| 15 | ∞ | 0.50 | | |
| 16 | ∞ | 0.50 | 1.51633 | 64.14 |
| 17 | ∞ | 0.50 | | |
| Image Plane | ∞ | | | |

Aspheric Data

First Surface $K = 0.696, A4 = 8.15954E{-}04, A6 = -9.02964E{-}06,$
$A8 = 7.06618E{-}08, A10 = 1.64985E{-}10$
Second Surface $K = -7.816, A4 = 5.93790E{-}04, A6 = -1.17684E{-}05$
Third Surface $K = -418.955, A4 = 5.24806E{-}04, A6 = -3.91612E{-}06,$
$A8 = -1.24273E{-}07, A10 = 2.82606E{-}09$
Fifth Surface $K = 0.139, A4 = -6.03643E{-}04, A6 = -5.31230E{-}05,$
$A8 = 2.70195E{-}06$
Sixth Surface $K = 0.000, A4 = 6.99714E{-}04, A6 = -7.25503E{-}05,$
$A8 = 8.68547E{-}06, A10 = -1.54245E{-}07$
Eleventh Surface $K = 0.000, A4 = -1.32093E{-}05, A6 = -4.00985E{-}06,$
$A8 = 1.56930E{-}07, A10 = -5.79143E{-}09$
Thirteenth Surface $K = -0.432, A4 = 3.83764E{-}04, A6 = -7.83432E{-}06,$
$A8 = 1.38963E{-}07, A10 = -4.62646E{-}10$ Various Data
Zoom Ratio 2.87

| | Wide-Angle | Point of Change on the Wide-Angle Side | Intermediate |
|---|---|---|---|
| Focal Length | 7.71 | 10.35 | 13.4 |
| F-number | 2.88 | 3.4 | 3.98 |
| Angle of View | 63.51 | 47.92 | 37.44 |
| Image Height | 4.55 | 4.55 | 4.55 |
| Whole Lens Length | 32.46 | 30.10 | 29.46 |
| BF | 5.41 | 4.78 | 4.31 |
| d3 | 15.26 | 10.54 | 7.33 |
| d9 | 1 | 5.1 | 7.34 |
| d11 | 2.76 | 1.65 | 2.46 |
| d13 | 3.76 | 3.13 | 2.66 |

| | Point of Change on the Telephoto End Side | Telephoto |
|---|---|---|
| Focal Length | 18.19 | 22.1 |
| F-number | 4.79 | 5.49 |
| Angle of View | 28.04 | 23.39 |
| Image Height | 4.55 | 4.55 |
| Whole Lens Length | 29.49 | 30.79 |
| BF | 4.14 | 3.92 |
| d3 | 3.74 | 2.18 |
| d9 | 10.76 | 12.11 |
| d11 | 2.82 | 4.55 |
| d13 | 2.49 | 2.27 |

-continued

Unit mm

Data on Lens Groups

| Group | Start Surface | Focal Length |
|---|---|---|
| 1 | 1 | −22.66 |
| 2 | 5 | 12.16 |
| 3 | 10 | −81.62 |
| 4 | 12 | 12.38 |

Numerical Example 2

Unit mm

Surface Data

| Surface No. | r | d | nd | vd |
|---|---|---|---|---|
| 1 (Aspheric) | −14.217 | 0.70 | 1.58313 | 59.38 |
| 2 (Aspheric) | 24.136 | 0.65 | 1.63494 | 23.22 |
| 3 (Aspheric) | 72.792 | Variable | | |
| 4 (Stop) | ∞ | 0.00 | | |
| 5 (Aspheric) | 4.961 | 1.54 | 1.82080 | 42.71 |
| 6 (Aspheric) | −89.208 | 0.15 | | |
| 7 | 11.451 | 1.00 | 1.88300 | 40.76 |
| 8 | 142.631 | 0.51 | 1.80518 | 25.42 |
| 9 | 3.372 | Variable | | |
| 10 | 29.312 | 0.80 | 1.52542 | 55.78 |
| 11 (Aspheric) | 21.393 | Variable | | |
| 12 | 49.315 | 2.47 | 1.52542 | 55.78 |
| 13 (Aspheric) | −8.540 | Variable | | |
| 14 | ∞ | 0.50 | 1.54771 | 62.84 |
| 15 | ∞ | 0.50 | | |
| 16 | ∞ | 0.50 | 1.51633 | 64.14 |
| 17 | ∞ | 0.50 | | |
| Image Plane | ∞ | | | |

Aspheric Data

First Surface $K = 2.777, A4 = 4.38487E{-}04, A6 = 1.16381E{-}05,$
$A8 = -3.29372E{-}07, A10 = 4.18427E{-}09$
Second Surface $K = -3.418, A4 = 5.12543E{-}04, A6 = -3.82583E{-}06$
Third Surface $K = 26.883, A4 = 1.65598E{-}04, A6 = 1.41400E{-}05,$
$A8 = -3.80117E{-}07, A10 = 3.81175E{-}09$
Fifth Surface $K = 0.348, A4 = -8.05884E{-}04, A6 = -5.80311E{-}05,$
$A8 = 2.18950E{-}06$
Sixth Surface $K = 0.000, A4 = 6.47271E{-}04, A6 = -5.81071E{-}05,$
$A8 = 7.29418E{-}06, A10 = -3.29262E{-}08$
Eleventh Surface $K = 0.000, A4 = 1.33935E{-}04, A6 = -1.96248E{-}05,$
$A8 = 4.60497E{-}07, A10 = -6.31473E{-}09$
Thirteenth Surface $K = -0.391, A4 = 2.59050E{-}04, A6 = 2.68519E{-}06,$
$A8 = 6.96644E{-}08, A10 = -4.04915E{-}10$

-continued

Unit mm

Various Data
Zoom Ratio 2.88

|  | Wide-Angle | Point of Change on the Wide-Angle Side | Intermediate |
|---|---|---|---|
| Focal Length | 7.78 | 10.35 | 13.4 |
| F-number | 2.88 | 3.44 | 4 |
| Angle of View | 63.34 | 48.08 | 37.52 |
| Image Height | 4.55 | 4.55 | 4.55 |
| Whole Lens Length | 31.66 | 30.64 | 29.80 |
| BF | 5.48 | 4.65 | 4.20 |
| d3 | 14.57 | 10.9 | 7.6 |
| d9 | 1.58 | 4.35 | 7.94 |
| d11 | 2.21 | 2.93 | 2.24 |
| d13 | 3.83 | 3 | 2.55 |

|  | Point of Change on the Telephoto End Side | Telephoto |
|---|---|---|
| Focal Length | 18 | 22.42 |
| F-number | 4.84 | 5.51 |
| Angle of View | 28.21 | 22.88 |
| Image Height | 4.55 | 4.55 |
| Whole Lens Length | 30.32 | 31.57 |
| BF | 3.74 | 4.04 |
| d3 | 4.66 | 2.38 |
| d9 | 10.8 | 14.07 |
| d11 | 3.3 | 3.27 |
| d13 | 2.09 | 2.39 |

Data on Lens Groups

| Group | Start Surface | Focal Length |
|---|---|---|
| 1 | 1 | −20.90 |
| 2 | 5 | 11.88 |
| 3 | 10 | −156.15 |
| 4 | 12 | 14.06 |

Numerical Example 3

Unit mm

Surface Data

| Surface No. | r | d | nd | vd |
|---|---|---|---|---|
| 1 (Aspheric) | −14.249 | 0.70 | 1.58313 | 59.38 |
| 2 (Aspheric) | 23.234 | 0.57 | 1.63494 | 23.22 |
| 3 (Aspheric) | 86.974 | Variable |  |  |
| 4 (Stop) | ∞ | 0.00 |  |  |
| 5 (Aspheric) | 5.042 | 1.49 | 1.83481 | 42.71 |
| 6 (Aspheric) | −86.330 | 0.15 |  |  |
| 7 | 12.427 | 1.02 | 1.88300 | 40.76 |
| 8 | 509.464 | 0.55 | 1.80518 | 25.42 |
| 9 | 3.426 | Variable |  |  |
| 10 | 25.791 | 0.80 | 1.52542 | 55.78 |
| 11 (Aspheric) | 20.006 | Variable |  |  |
| 12 | 35.484 | 2.60 | 1.52542 | 55.78 |
| 13 (Aspheric) | −9.171 | Variable |  |  |
| 14 | ∞ | 0.50 | 1.54771 | 62.84 |
| 15 | ∞ | 0.50 |  |  |
| 16 | ∞ | 0.50 | 1.51633 | 64.14 |
| 17 | ∞ | 0.50 |  |  |
| Image Plane | ∞ |  |  |  |

-continued

Unit mm

Aspheric Data

First Surface

K = 2.687, A4 = 5.38597E−04, A6 = 4.61021E−06,
A8 = −1.84142E−07, A10 = 2.94944E−09

Second Surface

K = −2.810, A4 = 3.98204E−04, A6 = −4.78082E−06

Third Surface

K = 19.023, A4 = 2.58400E−04, A6 = 6.91398E−06,
A8 = −2.61693E−07, A10 = 3.30720E−09

Fifth Surface

K = −0.334, A4 = −8.96571E−05, A6 = −3.54061E−05,
A8 = 2.97005E−06

Sixth Surface

K = 0.000, A4 = 6.29371E−04, A6 = −6.76395E−05,
A8 = 7.12232E−06, A10 = −1.56331E−07

Eleventh Surface

K = 0.000, A4 = 2.01335E−05, A6 = −1.19486E−05,
A8 = 2.65168E−07, A10 = −3.91123E−09

Thirteenth Surface

K = −1.321, A4 = 2.34507E−04, A6 = −5.97599E−06,
A8 = 2.24954E−07, A10 = −1.97170E−09

Various Data
Zoom Ratio 2.82

|  | Wide-Angle | Point of Change on the Wide-Angle Side | Intermediate |
|---|---|---|---|
| Focal Length | 8.02 | 10.35 | 13.4 |
| F-number | 2.88 | 3.36 | 3.92 |
| Angle of View | 61.72 | 48.07 | 37.54 |
| Image Height | 4.55 | 4.55 | 4.55 |
| Whole Lens Length | 31.67 | 30.58 | 29.80 |
| BF | 5.44 | 4.79 | 4.30 |
| d3 | 14.45 | 10.94 | 7.63 |
| d9 | 1.49 | 3.95 | 7.76 |
| d11 | 2.41 | 3.02 | 2.23 |
| d13 | 3.79 | 3.14 | 2.65 |

|  | Point of Change on the Telephoto End Side | Telephoto |
|---|---|---|
| Focal Length | 18.2 | 22.64 |
| F-number | 4.76 | 5.45 |
| Angle of View | 27.93 | 22.67 |
| Image Height | 4.55 | 4.55 |
| Whole Lens Length | 30.29 | 31.62 |
| BF | 3.89 | 4.01 |
| d3 | 4.43 | 2.29 |
| d9 | 10.93 | 13.79 |
| d11 | 3.17 | 3.66 |
| d13 | 2.24 | 2.36 |

Data on Lens Groups

| Group | Start Surface | Focal Length |
|---|---|---|
| 1 | 1 | −21.65 |
| 2 | 5 | 12.13 |
| 3 | 10 | −178.21 |
| 4 | 12 | 14.15 |

Numerical Example 4

Unit mm

Surface Data

| Surface No. | r | d | nd | vd |
|---|---|---|---|---|
| 1 (Aspheric) | −18.911 | 0.80 | 1.58313 | 59.38 |
| 2 | 12.725 | 0.80 | 1.63494 | 23.22 |
| 3 (Aspheric) | 30.290 | Variable | | |
| 4 (Stop) | ∞ | 0.00 | | |
| 5 (Aspheric) | 6.081 | 1.60 | 1.74320 | 49.34 |
| 6 (Aspheric) | −22.773 | 0.15 | | |
| 7 | 10.604 | 1.69 | 1.83481 | 42.71 |
| 8 | 134.114 | 0.52 | 1.80518 | 25.42 |
| 9 | 3.704 | Variable | | |
| 10 | 56.233 | 0.80 | 1.52542 | 55.78 |
| 11 (Aspheric) | 17.069 | Variable | | |
| 12 | 134.146 | 2.18 | 1.80610 | 40.92 |
| 13 (Aspheric) | −10.349 | Variable | | |
| 14 | ∞ | 0.50 | 1.54771 | 62.84 |
| 15 | ∞ | 0.50 | | |
| 16 | ∞ | 0.50 | 1.51633 | 64.14 |
| 17 | ∞ | 0.50 | | |
| Image Plane | ∞ | | | |

Aspheric Data

First Surface $K = 1.051, A4 = 5.07602E-06, A6 = 1.30112E-05,$
$A8 = -2.87458E-07, A10 = 2.32505E-09$ Third Surface $K = 26.006, A4 = -2.35130E-04, A6 = 1.12544E-05,$
$A8 = -1.09983E-07, A10 = -4.61435E-09$ Fifth Surface $K = -1.634, A4 = -9.16990E-05, A6 = -1.18179E-04,$
$A8 = 1.12848E-05, A10 = -2.01021E-06$ Sixth Surface $K = -37.172, A4 = -7.71139E-04, A6 = -1.00279E-04,$
$A8 = 5.88476E-06, A10 = -1.42926E-06$ Eleventh Surface $K = 0.000, A4 = 2.19655E-04, A6 = 2.87695E-06,$
$A8 = -1.81203E-06, A10 = 4.76216E-08$ Thirteenth Surface $K = -2.283, A4 = -1.17618E-04, A6 = -2.42901E-08,$
$A8 = 6.63928E-08, A10 = 1.33000E-09$

Various Data
Zoom Ratio 2.88

| | Wide-Angle | Point of Change on the Wide-Angle Side | Intermediate |
|---|---|---|---|
| Focal Length | 8.16 | 10.44 | 13.55 |
| F-number | 2.88 | 3.36 | 3.91 |
| Angle of View | 60.96 | 47.28 | 36.44 |
| Image Height | 4.55 | 4.55 | 4.55 |
| Whole Lens Length | 31.65 | 30.66 | 29.65 |
| BF | 5.67 | 4.94 | 4.51 |
| d3 | 13.45 | 10.38 | 7.12 |
| d9 | 1.51 | 4.03 | 6.73 |
| d11 | 2.5 | 2.78 | 2.76 |
| d13 | 4.02 | 3.28 | 2.85 |

| | Point of Change on the Telephoto End Side | Telephoto |
|---|---|---|
| Focal Length | 18.12 | 23.5 |
| F-number | 4.77 | 5.67 |
| Angle of View | 27.49 | 21.38 |
| Image Height | 4.55 | 4.55 |
| Whole Lens Length | 30.22 | 31.53 |
| BF | 3.90 | 3.71 |
| d3 | 4.57 | 2.4 |
| d9 | 9.17 | 11.92 |
| d11 | 4.05 | 4.98 |
| d13 | 2.25 | 2.06 |

Data on Lens Groups

| Group | Start Surface | Focal Length |
|---|---|---|
| 1 | 1 | −20.72 |
| 2 | 5 | 11.30 |
| 3 | 10 | −46.98 |
| 4 | 12 | 12.00 |

Numerical Example 5

Unit mm

Surface Data

| Surface No. | r | d | nd | vd |
|---|---|---|---|---|
| 1 (Aspheric) | −22.653 | 0.70 | 1.58313 | 59.38 |
| 2 | 16.559 | 0.53 | 1.63494 | 23.22 |
| 3 (Aspheric) | 25.127 | Variable | | |
| 4 (Stop) | ∞ | 0.00 | | |
| 5 (Aspheric) | 4.860 | 1.49 | 1.83481 | 42.71 |
| 6 (Aspheric) | −106.734 | 0.15 | | |
| 7 | 10.872 | 1.03 | 1.83481 | 42.71 |
| 8 | 48.837 | 0.54 | 1.80518 | 25.42 |
| 9 | 3.226 | Variable | | |
| 10 | 35.000 | 0.80 | 1.52542 | 55.78 |
| 11 (Aspheric) | 21.080 | Variable | | |
| 12 | 31.125 | 2.43 | 1.52542 | 55.78 |
| 13 (Aspheric) | −9.817 | Variable | | |
| 14 | ∞ | 0.50 | 1.54771 | 62.84 |
| 15 | ∞ | 0.50 | | |
| 16 | ∞ | 0.50 | 1.51633 | 64.14 |
| 17 | ∞ | 0.50 | | |
| Image Plane | ∞ | | | |

Aspheric Data

First Surface $K = 4.541, A4 = -2.29064E-04, A6 = 20.09731E-05,$
$A8 = -3.82878E-07, A10 = 2.81320E-09$ Third Surface $K = 15.256, A4 = -4.82788E-04, A6 = 1.65349E-05,$
$A8 = -1.40821E-07, A10 = -3.15256E-09$ Fifth Surface $K = -0.919, A4 = 3.68452E-04, A6 = 4.06370E-06,$
$A8 = 7.47374E-07$ Sixth Surface $K = 0.000, A4 = 4.16616E-04, A6 = -9.39191E-06,$
$A8 = 8.31094E-07$ Eleventh Surface $K = 0.000, A4 = -1.88499E-05, A6 = -1.78170E-05,$
$A8 = 2.94314E-07, A10 = -5.69112E-09$ Thirteenth Surface $K = -1.098, A4 = 8.78574E-05, A6 = 8.97907E-06,$
$A8 = -2.39271E-07, A10 = 6.89604E-09$ -continued Unit mm Various Data
Zoom Ratio 2.88

|  | Wide-Angle | Point of Change on the Wide-Angle Side | Intermediate |
|---|---|---|---|
| Focal Length | 8.15 | 10.43 | 13.53 |
| F-number | 2.86 | 3.35 | 3.88 |
| Angle of View | 61.03 | 47.85 | 37.35 |
| Image Height | 4.55 | 4.55 | 4.55 |
| Whole Lens Length | 31.65 | 30.93 | 29.71 |
| BF | 5.44 | 4.56 | 4.15 |
| d3 | 14.57 | 11.58 | 8.06 |
| d9 | 1.5 | 3.93 | 7.57 |
| d11 | 2.48 | 3.2 | 2.27 |
| d13 | 3.79 | 2.91 | 2.5 |

|  | Point of Change on the Telephoto End Side | Telephoto |
|---|---|---|
| Focal Length | 18.1 | 23.48 |
| F-number | 4.65 | 5.45 |
| Angle of View | 28.09 | 21.8 |
| Image Height | 4.55 | 4.55 |
| Whole Lens Length | 30.02 | 31.65 |
| BF | 3.86 | 4.17 |
| d3 | 5.01 | 2.5 |
| d9 | 10.38 | 13.57 |
| d11 | 3.11 | 3.75 |
| d13 | 2.21 | 2.51 |

Data on Lens Groups

| Group | Start Surface | Focal Length |
|---|---|---|
| 1 | 1 | −20.70 |
| 2 | 5 | 11.64 |
| 3 | 10 | −102.92 |
| 4 | 12 | 14.50 |

Numerical Example 6

Unit mm

Surface Data

| Surface No. | r | d | nd | vd |
|---|---|---|---|---|
| 1 (Aspheric) | −33.739 | 0.80 | 1.58313 | 59.38 |
| 2 | 13.645 | 0.67 | 1.63494 | 23.22 |
| 3 (Aspheric) | 19.343 | Variable | | |
| 4 (Stop) | ∞ | 0.00 | | |
| 5 (Aspheric) | 5.010 | 1.44 | 1.83481 | 42.71 |
| 6 (Aspheric) | −69.498 | 0.15 | | |
| 7 | 11.772 | 1.10 | 1.83481 | 42.71 |
| 8 | −614.613 | 0.50 | 1.80518 | 25.42 |
| 9 | 3.408 | Variable | | |
| 10 | 212.094 | 0.80 | 1.52542 | 55.78 |
| 11 (Aspheric) | 24.454 | Variable | | |
| 12 | 103.939 | 2.11 | 1.74320 | 49.34 |
| 13 (Aspheric) | −10.380 | Variable | | |
| 14 | ∞ | 0.50 | 1.54771 | 62.84 |
| 15 | ∞ | 0.50 | | |
| 16 | ∞ | 0.50 | 1.51633 | 64.14 |
| 17 | ∞ | 0.50 | | |
| Image Plane | ∞ | | | |

-continued

Unit mm

Aspheric Data

First Surface

K = 8.816, A4 = −4.13122E−04, A6 = 2.62067E−05,
A8 = −5.70488E−07, A10 = 4.91698E−09

Third Surface

K = 9.676, A4 = −7.27584E−04, A6 = 2.58033E−05,
A8 = −5.21907E−07, A10 = −1.06649E−09

Fifth Surface

K = −1.245, A4 = 7.19784E−04, A6 = −1.53107E−05,
A8 = 3.19896E−06

Sixth Surface

K = 0.000, A4 = 5.31100E−04, A6 = −2.86233E−05,
A8 = 3.81056E−06

Eleventh Surface

K = 0.000, A4 = 1.07531E−04, A6 = −9.60733E−07,
A8 = −7.21707E−07, A10 = 1.57456E−08

Thirteenth Surface

K = −0.560, A4 = 2.26496E−04, A6 = −1.07789E−05,
A8 = 4.12967E−07, A10 = −3.58833E−09

Various Data
Zoom Ratio 2.88

|  | Wide-Angle | Point of Change on the Wide-Angle Side | Intermediate |
|---|---|---|---|
| Focal Length | 8.08 | 10.34 | 13.41 |
| F-number | 2.87 | 3.32 | 3.9 |
| Angle of View | 61.37 | 47.82 | 36.98 |
| Image Height | 4.55 | 4.55 | 4.55 |
| Whole Lens Length | 31.35 | 29.99 | 29.27 |
| BF | 6.13 | 5.39 | 4.77 |
| d3 | 14 | 10.62 | 7.52 |
| d9 | 1.15 | 4.22 | 6.96 |
| d11 | 2.51 | 2.2 | 2.46 |
| d13 | 4.48 | 3.74 | 3.12 |

|  | Point of Change on the Telephoto End Side | Telephoto |
|---|---|---|
| Focal Length | 17.93 | 23.26 |
| F-number | 4.7 | 5.61 |
| Angle of View | 27.94 | 21.79 |
| Image Height | 4.55 | 4.55 |
| Whole Lens Length | 29.46 | 30.75 |
| BF | 4.22 | 3.85 |
| d3 | 4.61 | 2.5 |
| d9 | 10.08 | 12.89 |
| d11 | 2.98 | 3.95 |
| d13 | 2.57 | 2.2 |

Data on Lens Groups

| Group | Start Surface | Focal Length |
|---|---|---|
| 1 | 1 | −21.39 |
| 2 | 5 | 11.52 |
| 3 | 10 | −52.69 |
| 4 | 12 | 12.80 |

Numerical Example 7

Unit mm

Surface Data

| Surface No. | r | d | nd | νd |
|---|---|---|---|---|
| 1 (Aspheric) | −44.139 | 0.70 | 1.58313 | 59.38 |
| 2 | 12.363 | 0.67 | 1.63494 | 23.22 |
| 3 (Aspheric) | 16.544 | Variable | | |
| 4 (Stop) | ∞ | 0.00 | | |
| 5 (Aspheric) | 4.836 | 1.66 | 1.80139 | 45.46 |
| 6 (Aspheric) | −49.496 | 0.15 | | |
| 7 | 11.072 | 1.40 | 1.80810 | 22.76 |
| 8 | 3.337 | Variable | | |
| 9 | 100.000 | 0.80 | 1.52542 | 55.78 |
| 10 (Aspheric) | 25.815 | Variable | | |
| 11 | 25.727 | 2.46 | 1.52542 | 55.78 |
| 12 (Aspheric) | −10.468 | Variable | | |
| 13 | ∞ | 0.50 | 1.54771 | 62.84 |
| 14 | ∞ | 0.50 | | |
| 15 | ∞ | 0.50 | 1.51633 | 64.14 |
| 16 | ∞ | 0.50 | | |
| Image Plane | ∞ | | | |

Aspheric Data

First Surface $K = -38.771, A4 = -6.70403E-04, A6 = 3.53973E-05,$
$A8 = -7.64753E-07,$
$A10 = 6.56335E-09$ Third Surface $K = 6.806, A4 = -8.94941E-04, A6 = 3.38549E-05,$
$A8 = -6.96377E-07, A10 = -1.43567E-10$ Fifth Surface $K = -1.226, A4 = 7.06424E-04, A6 = 1.12713E-06,$
$A8 = 6.74850E-07$ Sixth Surface $K = -259.534, A4 = 2.66611E-04$

第10面

$K = 0.000, A4 = -1.42025E-04, A6 = -1.27034E-06,$
$A8 = -6.79574E-07, A10 = 1.28770E-08$

第12面

$K = -9.186, A4 = -5.90762E-04, A6 = 1.89978E-05,$
$A8 = -3.29764E-07, A10 = 6.07274E-09$

Various Data
Zoom Ratio 2.88

| | Wide-Angle | Point of Change on the Wide-Angle Side | Intermediate |
|---|---|---|---|
| Focal Length | 8.16 | 10.44 | 13.55 |
| F-number | 2.89 | 3.36 | 3.91 |
| Angle of View | 60.93 | 47.88 | 37.16 |
| Image Height | 4.55 | 4.55 | 4.55 |
| Whole Lens Length | 32.15 | 31.17 | 30.18 |
| BF | 6.07 | 5.26 | 4.71 |
| d3 | 14.8 | 11.55 | 8.19 |
| d9 | 1 | 3.68 | 6.75 |
| d11 | 2.46 | 2.86 | 2.71 |
| d13 | 4.42 | 3.6 | 3.06 |

| | Point of Change on the Telephoto End Side | Telephoto |
|---|---|---|
| Focal Length | 18.11 | 23.5 |
| F-number | 4.71 | 5.5 |
| Angle of View | 27.94 | 21.53 |
| Image Height | 4.55 | 4.55 |
| Whole Lens Length | 30.58 | 32.10 |

-continued

Unit mm

| | | |
|---|---|---|
| BF | 4.22 | 4.69 |
| d3 | 5.25 | 2.6 |
| d9 | 9.58 | 12.29 |
| d11 | 3.7 | 4.7 |
| d13 | 2.57 | 3.04 |

Data on Lens Groups

| Group | Start Surface | Focal Length |
|---|---|---|
| 1 | 1 | −20.95 |
| 2 | 5 | 11.71 |
| 3 | 9 | −66.47 |
| 4 | 11 | 14.50 |

Numerical Example 8

Unit mm

Surface Data

| Surface No. | r | d | nd | νd |
|---|---|---|---|---|
| 1 (Aspheric) | −14.890 | 0.70 | 1.58313 | 59.38 |
| 2 | 15.930 | 0.68 | 1.63494 | 23.22 |
| 3 (Aspheric) | 49.617 | Variable | | |
| 4 (Stop) | ∞ | 0.00 | | |
| 5 (Aspheric) | 4.953 | 1.68 | 1.69350 | 53.21 |
| 6 (Aspheric) | −30.326 | 0.20 | | |
| 7 | 9.435 | 1.52 | 1.80810 | 22.76 |
| 8 | 3.555 | Variable | | |
| 9 | 80.000 | 0.80 | 1.52542 | 55.78 |
| 10 (Aspheric) | 26.236 | Variable | | |
| 11 | −82.545 | 1.90 | 1.74320 | 49.34 |
| 12 (Aspheric) | −10.496 | Variable | | |
| 13 | ∞ | 0.50 | 1.54771 | 62.84 |
| 14 | ∞ | 0.50 | | |
| 15 | ∞ | 0.50 | 1.51633 | 64.14 |
| 16 | ∞ | 0.50 | | |
| Image Plane | ∞ | | | |

Aspheric Data

First Surface $K = -16.025, A4 = -3.11310E-04, A6 = 1.28912E-05,$
$A8 = -2.32621E-07,$
$A10 = 1.94746E-09$ Third Surface $K = 70.098, A4 = 2.81845E-05, A6 = 1.91821E-07,$
$A8 = 5.60745E-08, A10 = -2.48830E-09$ Fifth Surface $K = -1.211, A4 = 4.77122E-04, A6 = 2.36137E-06,$
$A8 = 3.39207E-07, A10 = 2.60202E-09$ Sixth Surface $K = 0.000, A4 = 4.20224E-04, A6 = -3.82318E-06$

第10面

$K = 0.000, A4 = 3.32937E-05, A6 = 4.46490E-06,$
$A8 = -2.08795E-06, A10 = 7.95117E-08$

第12面

$K = -9.714, A4 = -7.62805E-04, A6 = 1.43896E-05,$
$A8 = -6.63909E-08, A10 = -7.05542E-10$

-continued

Unit mm

Various Data
Zoom Ratio 2.88

| | Wide-Angle | Point of Change on the Wide-Angle Side | Intermediate |
|---|---|---|---|
| Focal Length | 8.16 | 10.44 | 13.55 |
| F-number | 2.89 | 3.3 | 3.84 |
| Angle of View | 62.74 | 48.44 | 37.19 |
| Image Height | 4.55 | 4.55 | 4.55 |
| Whole Lens Length | 32.45 | 30.57 | 29.80 |
| BF | 6.62 | 6.05 | 5.65 |
| d3 | 14.75 | 10.89 | 7.57 |
| d9 | 1.1 | 3.82 | 5.84 |
| d11 | 2.5 | 2.33 | 3.25 |
| d13 | 4.97 | 4.4 | 4 |

| | Point of Change on the Telephoto End Side | Telephoto |
|---|---|---|
| Focal Length | 18.12 | 23.5 |
| F-number | 4.63 | 5.49 |
| Angle of View | 27.94 | 21.69 |
| Image Height | 4.55 | 4.55 |
| Whole Lens Length | 30.53 | 32.38 |
| BF | 5.22 | 5.23 |
| d3 | 4.75 | 2.53 |
| d9 | 7.63 | 9.42 |
| d11 | 5.45 | 7.72 |
| d13 | 3.57 | 3.58 |

Data on Lens Groups

| Group | Start Surface | Focal Length |
|---|---|---|
| 1 | 1 | −20.38 |
| 2 | 5 | 11.59 |
| 3 | 9 | −74.68 |
| 4 | 11 | 16.00 |

Numerical Example 9

Unit mm

Surface Data

| Surface No. | r | d | nd | νd |
|---|---|---|---|---|
| 1 (Aspheric) | −14.706 | 0.70 | 1.58313 | 59.38 |
| 2 | 18.885 | 0.78 | 1.63494 | 23.22 |
| 3 (Aspheric) | 49.972 | Variable | | |
| 4 (Stop) | ∞ | 0.00 | | |
| 5 (Aspheric) | 5.032 | 1.71 | 1.74320 | 49.34 |
| 6 (Aspheric) | −30.235 | 0.30 | | |
| 7 | 10.531 | 1.49 | 1.80810 | 22.76 |
| 8 | 3.487 | Variable | | |
| 9 | 80.000 | 0.80 | 1.52542 | 55.78 |
| 10 (Aspheric) | 26.257 | Variable | | |
| 11 (Aspheric) | 61.805 | 2.40 | 1.52542 | 55.78 |
| 12 (Aspheric) | −9.600 | Variable | | |
| 13 | ∞ | 0.50 | 1.54771 | 62.84 |
| 14 | ∞ | 0.50 | | |
| 15 | ∞ | 0.50 | 1.51633 | 64.14 |
| 16 | ∞ | 0.50 | | |
| Image Plane | ∞ | | | |

-continued

Unit mm

Aspheric Data

First Surface

K = −15.776, A4 = −4.22513E−04, A6 = 1.52534E−05,
A8 = −2.58294E−07,
A10 = 2.15094E−09

Third Surface

K = 62.986, A4 = −5.46325E−05, A6 = 5.22355E−07,
A8 = 7.47251E−08, A10 = −2.59679E−09

Fifth Surface

K = −1.375, A4 = 5.92760E−04, A6 = 3.29704E−06,
A8 = −2.37832E−07

Sixth Surface

K = 58.183, A4 = 6.74242E−04, A6 = 6.09294E−06

第10面

K = 0.000, A4 = −2.61727E−05, A6 = 5.69324E−06,
A8 = −1.96963E−06, A10 = 6.99317E−08

Eleventh Surface

K = 70.208

第12面

K = −8.029, A4 = −7.13654E−04, A6 = 1.19084E−05,
A8 = 1.96023E−08, A10 = −1.05869E−09

Various Data
Zoom Ratio 2.88

| | Wide-Angle | Point of Change on the Wide-Angle Side | Intermediate |
|---|---|---|---|
| Focal Length | 8.12 | 10.4 | 13.48 |
| F-number | 2.89 | 3.3 | 3.84 |
| Angle of View | 63.95 | 49.24 | 37.8 |
| Image Height | 4.55 | 4.55 | 4.55 |
| Whole Lens Length | 32.45 | 30.57 | 29.80 |
| BF | 5.93 | 5.35 | 4.97 |
| d3 | 14.93 | 11.15 | 7.91 |
| d9 | 1.1 | 3.88 | 5.84 |
| d11 | 2.5 | 2.2 | 3.1 |
| d13 | 4.28 | 3.7 | 3.31 |

| | Point of Change on the Telephoto End Side | Telephoto |
|---|---|---|
| Focal Length | 18.03 | 23.39 |
| F-number | 4.6 | 5.45 |
| Angle of View | 28.36 | 22.02 |
| Image Height | 4.55 | 4.55 |
| Whole Lens Length | 30.43 | 32.40 |
| BF | 4.80 | 5.05 |
| d3 | 4.98 | 2.73 |
| d9 | 7.43 | 9.23 |
| d11 | 5.23 | 7.41 |
| d13 | 3.14 | 3.4 |

Data on Lens Groups

| Group | Start Surface | Focal Length |
|---|---|---|
| 1 | 1 | −19.69 |
| 2 | 5 | 11.34 |
| 3 | 9 | −74.77 |
| 4 | 11 | 16.00 |

Numerical Example 10

Unit mm

Surface Data

| Surface No. | r | d | nd | vd |
|---|---|---|---|---|
| 1 (Aspheric) | −14.992 | 0.70 | 1.58313 | 59.38 |
| 2 (Aspheric) | 13.949 | 0.70 | 1.63387 | 23.38 |
| 3 (Aspheric) | 37.831 | Variable | | |
| 4 (Stop) | ∞ | 0.00 | | |
| 5 (Aspheric) | 5.607 | 1.58 | 1.74320 | 49.34 |
| 6 (Aspheric) | −32.147 | 0.15 | | |
| 7 | 8.542 | 1.77 | 1.92286 | 18.90 |
| 8 | 3.770 | Variable | | |
| 9 | 80.000 | 0.80 | 1.52542 | 55.78 |
| 10 (Aspheric) | 22.579 | Variable | | |
| 11 | 195.714 | 2.22 | 1.74320 | 49.34 |
| 12 (Aspheric) | −11.538 | Variable | | |
| 13 | ∞ | 0.50 | 1.54771 | 62.84 |
| 14 | ∞ | 0.50 | | |
| 15 | ∞ | 0.50 | 1.51633 | 64.14 |
| 16 | ∞ | 0.50 | | |
| Image Plane | ∞ | | | |

Aspheric Data

First Surface $K = -3.208, A4 = 1.45834E-05, A6 = 9.31907E-06,$
$A8 = -2.35085E-07, A10 = 2.17381E-09$ Second Surface $K = -3.058, A4 = -9.88721E-05, A6 = 2.22517E-05,$
$A8 = -4.94745E-07$ Third Surface $K = 0.000, A4 = -2.95854E-05, A6 = 1.64938E-05,$
$A8 = -4.19469E-07, A10 = 4.62753E-09$ Fifth Surface $K = -1.749, A4 = 6.63921E-04, A6 = -1.17196E-05,$
$A8 = -1.16625E-06, A10 = 3.08705E-08$ Sixth Surface $K = 0.000, A4 = 3.37846E-04, A6 = -2.69871E-05$

第 10 面

$K = 0.000, A4 = 6.52998E-05, A6 = 3.66885E-07,$
$A8 = -4.92201E-07, A10 = 1.40308E-08$

第 12 面

$K = -5.146, A4 = -2.75156E-04, A6 = 1.08356E-06,$
$A8 = 4.53615E-08, A10 = -5.01467E-10$

Various Data
Zoom Ratio 2.89

| | | Point of Change on | |
|---|---|---|---|
| Focal Length | 8.14 | 10.42 | 13.37 |
| F-number | 2.88 | 3.3 | 3.83 |
| Angle of View | 64.45 | 49.15 | 37.97 |
| Image Height | 4.55 | 4.55 | 4.55 |
| Whole Lens Length | 31.19 | 29.71 | 29.25 |
| BF | 6.01 | 5.44 | 5.03 |
| d3 | 13.36 | 9.92 | 7.08 |
| d9 | 1.58 | 4.13 | 6.12 |
| d11 | 2.33 | 2.29 | 3.1 |
| d13 | 4.38 | 3.81 | 3.41 |

-continued
Unit mm

| | Point of Change on the Telephoto End Side | Telephoto |
|---|---|---|
| Focal Length | 18.09 | 23.52 |
| F-number | 4.63 | 5.53 |
| Angle of View | 28.18 | 21.93 |
| Image Height | 4.55 | 4.55 |
| Whole Lens Length | 30.07 | 32.09 |
| BF | 4.82 | 4.76 |
| d3 | 4.25 | 2.28 |
| d9 | 8.16 | 10.54 |
| d11 | 4.91 | 6.6 |
| d13 | 3.21 | 3.15 |

Data on Lens Groups

| Group | Start Surface | Focal Length |
|---|---|---|
| 1 | 1 | −19.05 |
| 2 | 5 | 10.99 |
| 3 | 9 | −60.16 |
| 4 | 11 | 14.73 |

Numerical Example 11

Unit mm

Surface Data

| Surface No. | r | d | nd | vd |
|---|---|---|---|---|
| 1 (Aspheric) | −15.671 | 0.70 | 1.58313 | 59.38 |
| 2 (Aspheric) | 14.047 | 0.70 | 1.63387 | 23.38 |
| 3 (Aspheric) | 35.585 | Variable | | |
| 4 (Stop) | ∞ | 0.00 | | |
| 5 (Aspheric) | 5.496 | 1.57 | 1.74320 | 49.34 |
| 6 (Aspheric) | −35.657 | 0.15 | | |
| 7 | 8.705 | 1.82 | 1.92286 | 18.90 |
| 8 | 3.746 | Variable | | |
| 9 | 80.000 | 0.80 | 1.52542 | 55.78 |
| 10 (Aspheric) | 29.136 | Variable | | |
| 11 | −419.759 | 2.20 | 1.74320 | 49.34 |
| 12 (Aspheric) | −10.902 | Variable | | |
| 13 | ∞ | 0.50 | 1.54771 | 62.84 |
| 14 | ∞ | 0.50 | | |
| 15 | ∞ | 0.50 | 1.51633 | 64.14 |
| 16 | ∞ | 0.50 | | |
| Image Plane | ∞ | | | |

Aspheric Data

First Surface $K = -3.122, A4 = -3.61952E-05, A6 = 1.00973E-05,$
$A8 = -2.32003E-07, A10 = 2.09996E-09$ Second Surface $K = 0.970, A4 = -2.46910E-04, A6 = 1.48213E-05,$
$A8 = -2.65313E-07$ Third Surface $K = 0.000, A4 = -8.54922E-05, A6 = 1.65424E-05,$
$A8 = -3.97467E-07, A10 = 4.80196E-09$ Fifth Surface $K = -1.838, A4 = 8.72041E-04, A6 = 1.55077E-05,$
$A8 = -5.16964E-06, A10 = 5.97515E-07$ Sixth Surface $K = 0.000, A4 = 4.66902E-04, A6 = 5.33655E-06,$
$A8 = -4.29970E-06, A10 = 6.58448E-07$ -continued Unit mm

第10面

$K = 0.000, A4 = 1.83567E-04, A6 = -1.58925E-05,$
$A8 = 5.62901E-07, A10 = -1.12511E-08$

第12面

$K = -6.584, A4 = -5.37999E-04, A6 = 1.01657E-05,$
$A8 = -1.17559E-07, A10 = 5.95227E-10$

Various Data
Zoom Ratio 2.88

|  | Wide-Angle | Point of Change on the Wide-Angle Side | Intermediate |
|---|---|---|---|
| Focal Length | 8.16 | 10.5 | 13.39 |
| F-number | 2.88 | 3.31 | 3.78 |
| Angle of View | 64.38 | 48.82 | 37.99 |
| Image Height | 4.55 | 4.55 | 4.55 |
| Whole Lens Length | 30.97 | 29.43 | 28.51 |
| BF | 5.81 | 5.26 | 5.02 |
| d3 | 13.27 | 9.74 | 6.63 |
| d9 | 1.59 | 4.53 | 7.88 |
| d11 | 2.36 | 1.96 | 1.04 |
| d13 | 4.15 | 3.61 | 3.37 |

|  | Point of Change on the Telephoto End Side | Telephoto |
|---|---|---|
| Focal Length | 18.08 | 23.51 |
| F-number | 4.63 | 5.56 |
| Angle of View | 28.28 | 22.06 |
| Image Height | 4.55 | 4.55 |
| Whole Lens Length | 29.82 | 31.98 |
| BF | 4.67 | 4.51 |
| d3 | 4.15 | 2.27 |
| d9 | 8.34 | 10.06 |
| d11 | 4.72 | 7.2 |
| d13 | 3.01 | 2.85 |

Data on Lens Groups

| Group | Start Surface | Focal Length |
|---|---|---|
| 1 | 1 | -19.27 |
| 2 | 5 | 11.06 |
| 3 | 9 | -87.69 |
| 4 | 11 | 15.03 |

Aberration diagrams for Examples 1 to 11 upon focusing on an object point at infinity are attached hereto as FIGS. 12 to 33, indicative of spherical aberrations, astigmatism, distortion and chromatic aberration of magnification (a) at the wide-angle end, (b) at the point of change on the wide-angle side, (c) in the intermediate state, (d) at the point of change on the telephoto side, and (e) at the telephoto end. In each drawing, FIY is indicative of a half angle of view.

Set out below are the values of conditions (1) to (12) in the respective examples. Note here that the values of conditions (1) and (2) are obtained in the intermediate state where the first lens group is positioned nearest to the image side.

| Condition | Example 1 | Example 2 | Example 3 | Example 4 | Example 5 | Example 6 |
|---|---|---|---|---|---|---|
| (1) | -0.182 | -0.160 | -0.165 | -0.111 | -0.184 | -0.175 |
| (2) | 0.039 | -0.004 | 0.022 | -0.032 | 0.026 | 0.007 |
| (3) | -0.182 | -0.160 | -0.165 | -0.111 | -0.184 | -0.175 |
| (3A) | 1.026 | 1.015 | 0.994 | 0.978 | 0.978 | 0.978 |
| (4) | 0.039 | -0.004 | 0.022 | -0.032 | 0.026 | 0.007 |
| (5) | -0.389 | -0.239 | -0.233 | -0.246 | -0.238 | -0.257 |
| (6) | 0.144 | -0.004 | 0.022 | -0.032 | 0.026 | -0.058 |
| (7) | 0.182 | 0.173 | 0.158 | 0.196 | 0.151 | 0.181 |
| (8) | 36.165 | 36.165 | 36.165 | 36.165 | 36.165 | 36.165 |
| (9) | -0.946 | -0.865 | -0.888 | -0.869 | -0.915 | -0.851 |
| (11) | 2.467 | 2.529 | 2.469 | 2.426 | 2.593 | 2.488 |

| Condition | Example 7 | Example 8 | Example 9 | Example 10 | Example 11 |
|---|---|---|---|---|---|
| (1) | -0.135 | -0.026 | -0.045 | -0.025 | -0.259 |
| (2) | -0.031 | -0.092 | -0.074 | -0.095 | 0.163 |
| (3) | -0.135 | -0.026 | -0.045 | -0.025 | -0.259 |
| (3A) | 0.978 | 0.978 | 0.978 | 0.966 | 0.967 |
| (4) | -0.031 | -0.092 | -0.074 | -0.095 | 0.163 |
| (5) | -0.241 | -0.325 | -0.327 | -0.238 | -0.302 |
| (6) | -0.031 | 0.021 | 0.037 | 0.004 | 0.163 |
| (7) | 0.167 | 0.169 | 0.158 | 0.172 | 0.172 |
| (8) | 36.165 | 36.165 | 36.165 | 35.998 | 35.998 |
| (9) | -0.864 | -0.797 | -0.852 | -0.768 | -0.805 |
| (10A) | 1.801 | 1.694 | 1.743 | 1.743 | 1.743 |
| (10B) | 45.456 | 53.210 | 49.340 | 49.340 | 49.340 |
| (10C) | 22.760 | 22.760 | 22.760 | 18.900 | 18.900 |
| (11) | 2.557 | 2.415 | 2.485 | 2.449 | 2.438 |

Further, each example may as well be constructed as follows.

To cut off unwanted light such as ghosts and flares, a flare stop may be provided in addition to the aperture stop S. That flare stop may then be located somewhere on the object side of the first lens group G1, between the first lens group G1 and the second lens group G2, between the second lens group G2 and the third lens group G3, between the third lens group G3 and the fourth lens group G4, and between the fourth lens group G4 and the image plane I. A frame member or other member may also be located to cut off flare rays. For that purpose, the optical system may be directly printed, coated or sealed in any desired shape inclusive of round, oval, rectangular, polygonal shapes or a shape delimited by a function curve. Further, just only a harmful light beam but also coma flares around the screen may be cut off.

Each lens may be applied with an antireflection coating to reduce ghosts and flares. A multicoating is then desired because of being capable of effectively reducing ghosts and flares. Each lens, a cover glass or the like may just as well be applied with an infrared cut coating.

Desirously, focusing for adjusting the focus is implemented with the fourth lens group G4. Focusing with the fourth lens group G4 eases off loads on a drive system such as a motor because there is a light lens weight, and works for making the lens barrel compact because there is none of the change in the total length during zooming, and a drive motor is mounted in the lens barrel. As noted just above, it is desired that focusing for adjusting the focus is implemented with the fourth lens group G4; however, it may be implemented with the second lens group G2 or the third lens group G3, or by the movement of multiple lens groups. Moreover, focusing may be implemented by letting out the whole lens system or letting out or in some lenses in the lens groups.

The shading of brightness at the peripheral position of an image may be reduced by shifting the microlenses of a CCD. For instance, the CCD microlens design may be modified in conformity with the angle of incidence of light rays at each image height, or decreases in the quantity of light at the peripheral position of the image may be corrected by image processing.

It is also acceptable to intentionally produce distortion at the optical system so as to correct image distortion by implementing electrical processing after taking operation. Alternatively, the distortion may be electrically corrected by imaging processing.

In the zoom lens of each example, there is a roughly barrel type distortion remaining on a rectangular photoelectric transformation plane near the wide-angle end. On the other hand, there is a change in the occurrence of distortion in a near-intermediate focal length state or at the telephoto end. When distortion is electrically corrected, an effective imaging area is varied such that there is a barrel shape at the wide-angle end, a rectangular shape in a near-intermediate focal length state or at the telephoto end, and so on. And an image at the predetermined imaging area is converted into rectangular image information with much less distortion. For instance, image transformation is implemented such that the maximum image height IHw at the wide-angle end gets smaller than the maximum image height IHs in the intermediate focal length state or the maximum image height IHt at the telephoto end.

For instance, the effective imaging area may as well be predetermined such that, at the wide-angle end, the length of the photoelectric transformation plane in the short-side direction is identical with the length of the effective imaging area in the short-side direction, letting about −3% of distortion remain after image processing. As a matter of course, a smaller barrel area may just as well be used as the effective imaging area so that an image transformed into a rectangular shape may be recorded and reproduced.

Figure 34:
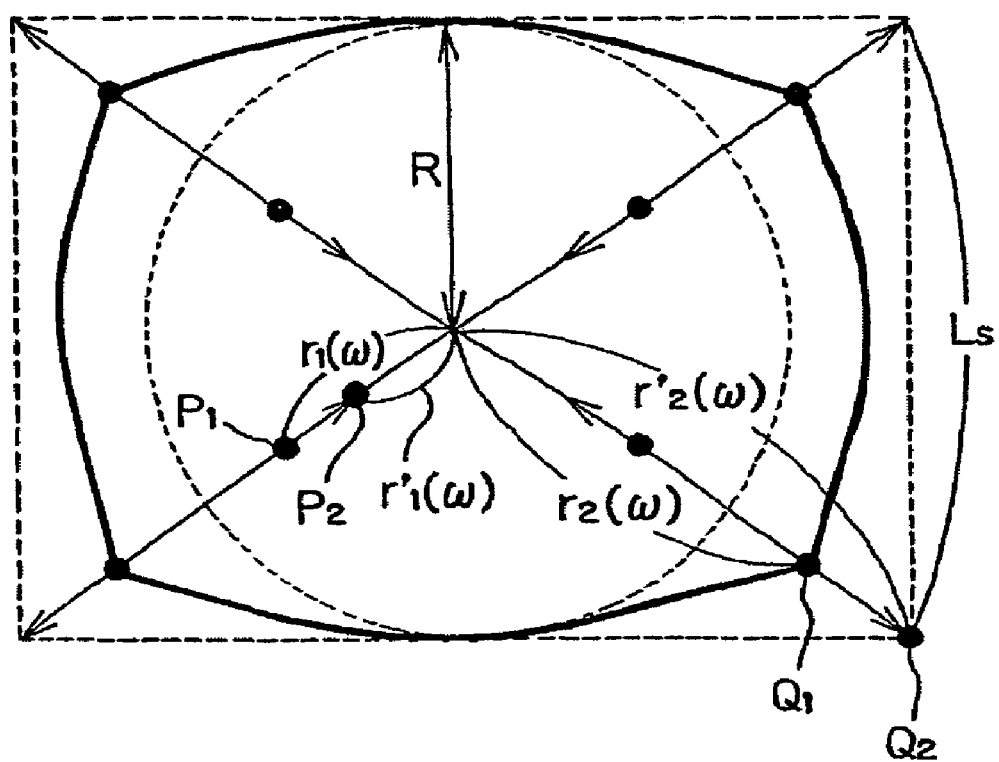
FIG. 34 is illustrative of correction of distortion.

As shown typically in FIG. 34, there is a magnification fixed on the circumference (image height) of a circle of radius R inscribed in the long side of an effective imaging plane with the point of intersection of an optical axis with the imaging plane as a center, and that circumference is used as the reference for correction. And then, points on the circumference of other arbitrary circle of radius $r(\omega)$ are moved in substantially radial directions; they are concentrically moved to a radius $r(\omega)$ for correction. In FIG. 34 as an example, a point $P_1$ on the circumference of an arbitrary circle of radius $r_1(\omega)$ positioned inside the circle of radius R is moved to a point $P_2$ on the circumference of an arbitrary circle of radius $r_2$ to be corrected in a direction toward the center of the circle. On the other hand, a point $Q_1$ on the circumference of an arbitrary circle of radius $r_2(\omega)$ positioned outside the circle of radius R is moved to a point $Q_2$ on the circumference of a circle of radius $r_2(\omega)$ to be corrected in a direction away from the center of the circle. Here, $r(\omega)$ may be represented by $$r(\omega) = \alpha f \tan \omega \, (0 \leq \alpha \leq 1)$$

where $\omega$ is a subject half angle of view, and f is the focal length of an imaging optical system (the zoom lens in the invention).

Here let Y be an ideal image height corresponding to $\omega$ on the aforesaid circle of radius R. Then, $$\alpha = R/Y = R/f \tan \omega$$

The optical system here is ideally rotationally symmetric about the optical axis; distortion occurs rotationally symmetrically about the optical axis, too. Therefore, when optically produced distortion is electrically corrected as described above, it would be favorable in view of the quantities of data and computation to implement correction by fixing, on a reproduced image, a magnification on the circumference (image height) of the circle of radius R inscribed in the long side of an effective imaging plane with the point of intersection of an optical axis with the imaging plane as a center, and moving points on the circumference (image height) of other arbitrary circle of radius $r(\omega)$ moved in substantially radial directions to move them concentrically to radius $r(\omega)$.

However, an optical image stops being a continuous quantity (for sampling) at the time of being imaged at an electronic imaging device. Strictly speaking, therefore, the aforesaid circle of radius R drawn on the optical image, too, stops being an accurate circle unless pixels on the electronic imaging device are lined up in a radial way. It follows that when it comes to the shape correction of image data represented per discrete coordinate point, there is none of the circle capable of fixing the aforesaid circle. It is therefore preferable to make use of a method that determines coordinates $(X_i, Y_j)$ for where the points are to be moved to per each pixel $(X_i, Y_j)$. Note that when two or more points $(X_i, Y_j)$ are moved to the coordinates $(X_i, Y_j)$, there is the average of the values the respective pixels taken, and when there are no incoming points, interpolation may be implemented using the values of the coordinates $(X_i, Y_j)$ for some neighboring pixels.

Such a method is effective for especially when the aforesaid circle of radius R written on the aforesaid optical image becomes badly distorted and asymmetric with respect to the optical axis for the reason of fabrication errors of the optical system and electronic imaging device of an electronic imaging system the zoom lens has. That method is also effective for correction of geometric distortion or the like occurring at the time of reproduction of signals as an image at the imaging device or various output devices.

With the electronic imaging system of the invention, $r(\omega)$, i.e., the relation between the half angle of view and the image height or the relation between the real image height r and the ideal image height $r/\alpha$ may have been recorded in a recording medium built in it for the purpose of figuring out $r(\omega)-r(\omega)$.

It is here noted that to prevent the image after the correction of distortion from running extremely short of light quantity at both ends in the short side direction, it is preferable for the aforesaid radius R to satisfy the following condition:

$$0 \leq R \leq 0.6 L_s$$

where $L_s$ is the length of the short side of the effective imaging plane.

For the aforesaid radius R it is more preferable to satisfy the following condition.

$$0.3 L_s \leq R \leq 0.6 L_s$$

Most preferably, the aforesaid radius R should be much the same as that of a circle inscribed in the effective imaging plane in the short side direction. Note here that the correction with the magnification fixed at or near the radius R=0, viz., at or near the optical axis is somewhat disadvantageous in terms of the substantial number of images; even in a wide-angle arrangement, however, there is the advantage of compactness still ensured.

It is noted that the focal length interval for which correction is in need is divided into several focal zones. And then, correction may be implemented in the same quantity as there is the result of correction obtained which satisfies substantially $r(\omega)=\alpha f \tan \omega$ at or near the telephoto end within the divided focal zones. In that case, however, there is some barrel distortion remaining at the wide-angle end within the divided focal zones. Too many divided zones are not that preferable because of the need of storing too much intrinsic data necessary for correction in the recording medium. Therefore, one or a few coefficients in association with the focal lengths in the divided focal zones have been figured out in advance. Such coefficients may have been determined on the basis of simulations or measuring devices. And then, there is the quantity of correction worked out corresponding to the result of correction that satisfies substantially $r(\omega)=\alpha f \tan \omega$ at or near the telephoto end within the divided focal zones, and that amount of correction may be evenly multiplied by the aforesaid coefficients per focal length to obtain the final quantity of correction.

By the way, when there is no distortion in the image obtained by imaging an infinite object, $$f = y/\tan \omega$$

Here y is the height (image height) of an image point from the optical axis, f is the focal length of an imaging system (the zoom lens in the invention), and $\omega$ is the angle (subject half angle of view) with the optical axis of an object point direction corresponding to an image point formed from the center on the imaging plane to the position of y.

When there is barrel distortion in the imaging system, $$f > y/\tan \omega$$

It follows that with both the focal length f of the imaging system and the image height y kept constant, the value of $\omega$ grows large.

Figure 35:
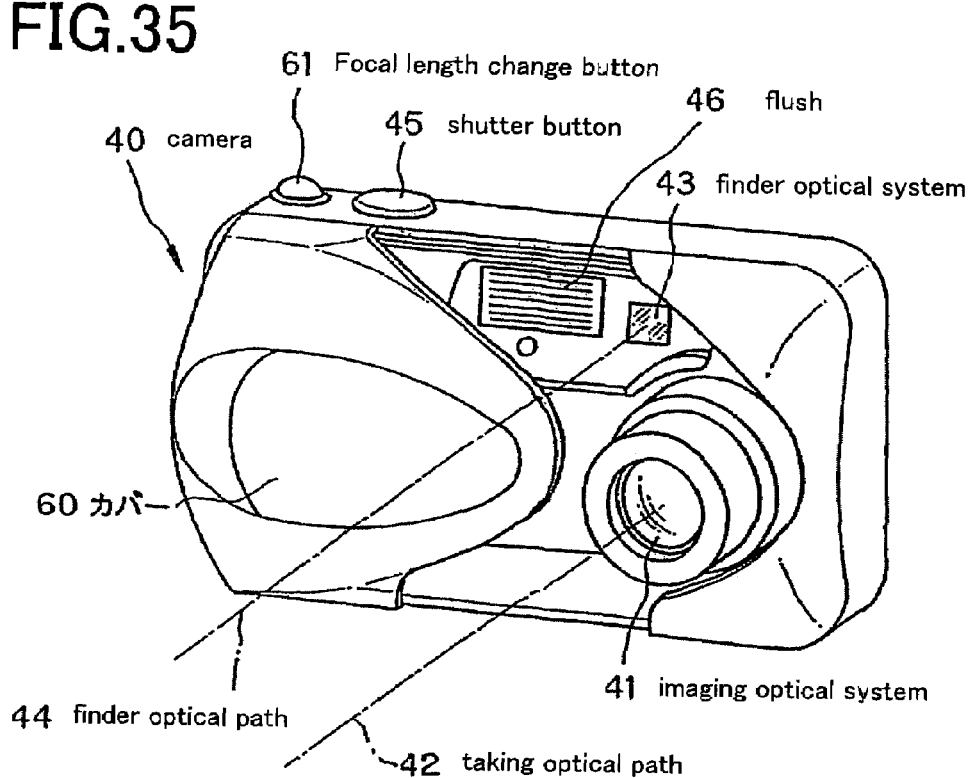
FIG. 35 is a front perspective view of the outside shape of the inventive digital camera.
Figure 36:
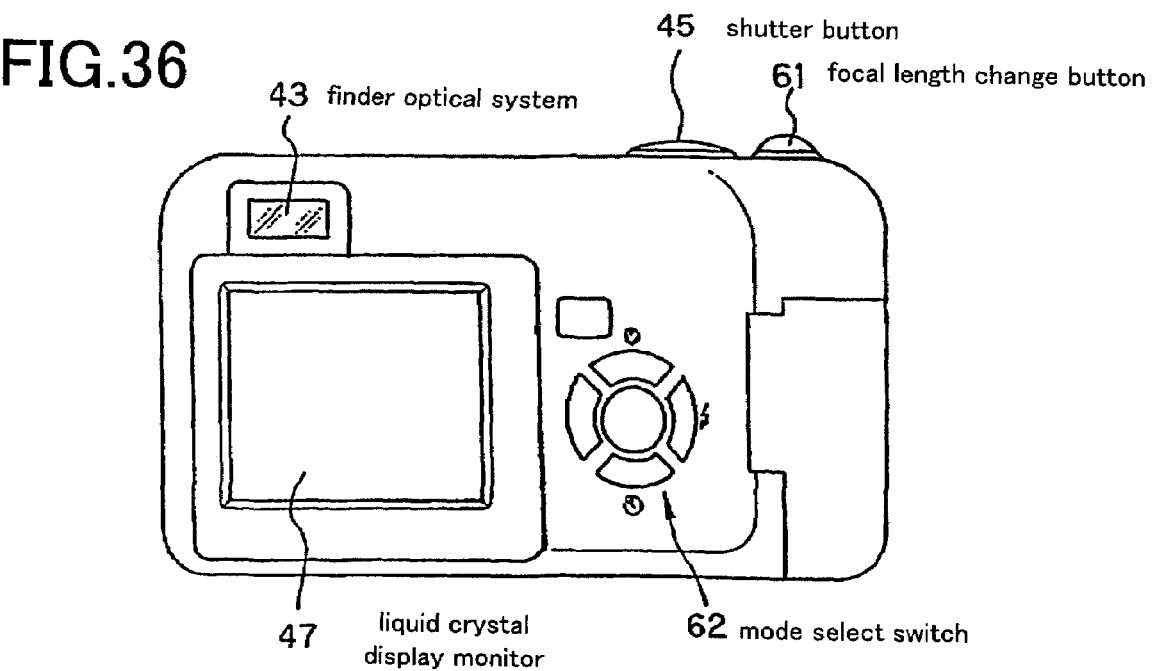
FIG. 36 is a rear perspective view of the digital camera of FIG. 35.
Figure 37:
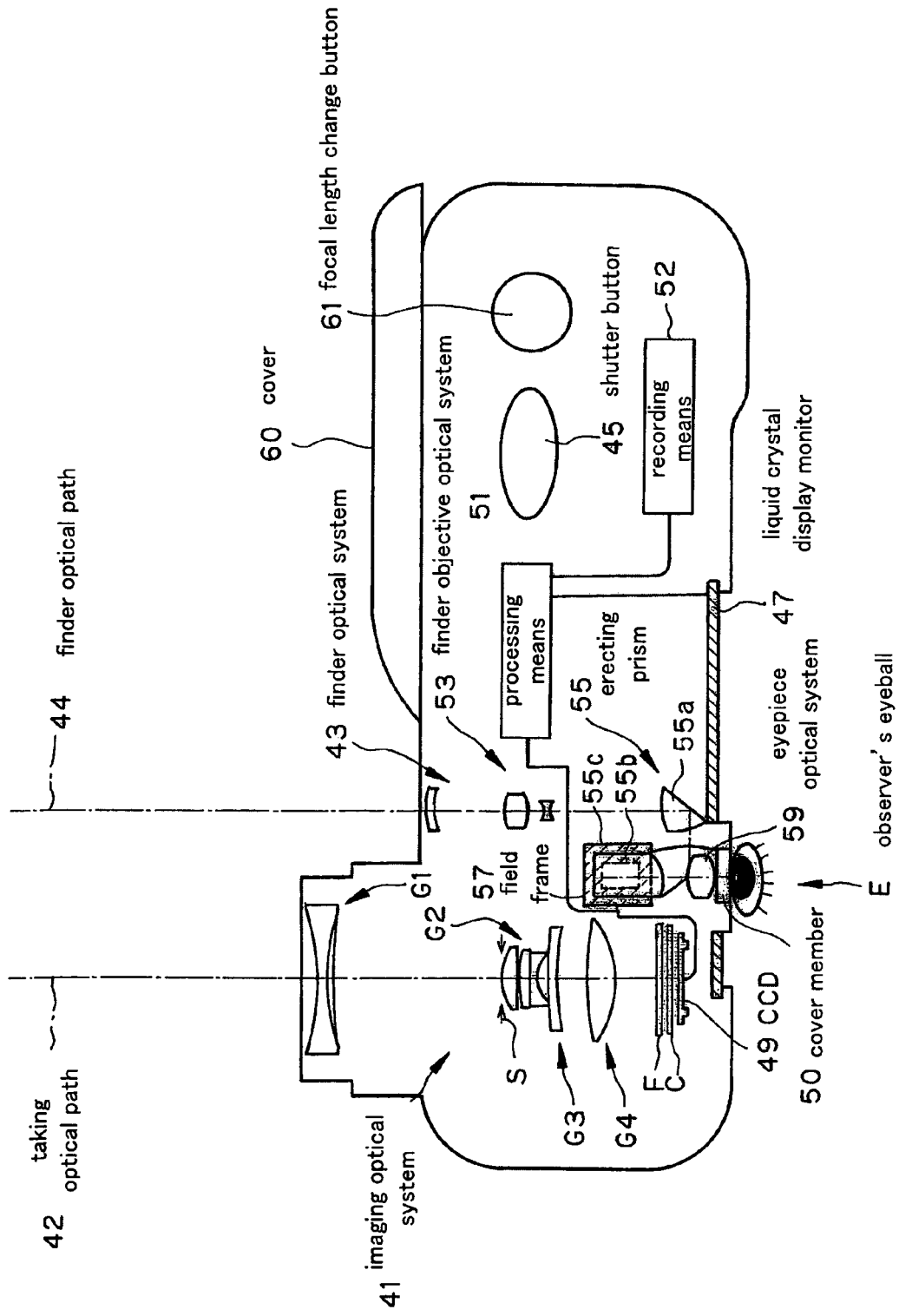
FIG. 37 is a sectional view of the digital camera of FIG. 35.

FIGS. 35, 36 and 37 are conceptual illustrations of a taking optical system 41 for digital cameras, in which the zoom lens of the invention as described above is incorporated. FIG. 35 is a front perspective view of the appearance of a digital camera 40; FIG. 36 is a rear perspective view of the same; and FIG. 37 is a schematic sectional view of the setup of the digital camera 40. However, FIGS. 35 and 37 show the taking optical system 41 in operation. In this embodiment, the digital camera 40 comprises a taking optical system 41 positioned on a taking optical path 42, a finder optical system 43 positioned on a finder optical path 44, a shutter button 45, a flash 46, a liquid crystal display monitor 47, a focal length change button 61, a mode select switch 62, and so on. With the taking optical system 41 received at a lens mount, a cover 60 is slid over the taking optical system 41, finder optical system 43 and flash 46. And, as the cover 60 is slid open to place the camera 40 in operation, the taking optical system 41 is let out, as in FIG. 37. As the shutter 45 mounted on the upper portion of the camera 40 is pressed down, it causes an image to be taken through the taking optical system 41, for instance, the zoom lens of Example 1. An object image formed by the taking optical system 41 is formed on the imaging plane (photoelectric transformation plane) of CCD 49 via a low-pass filter F with a wavelength limiting coating applied on it and a cover glass C. An object image received at CCD 49 is shown as an electronic image on the liquid crystal display monitor 47 via processing means 51, which monitor is mounted on the back of the camera. This processing means 51 is connected with recording means 52 in which the taken electronic image may be recorded. It is here noted that the recording means 52 may be separate from the processing means 51 or, alternatively, it may be constructed in such a way that images are electronically recorded and written therein by means of floppy discs, memory cards, MOs or the like. This camera could also be constructed in the form of a silver-halide camera using a silver-halide film in place of CCD 49.

Moreover, a finder objective optical system 53 is located on the finder optical path 44. The finder objective optical system 53 comprises a zoom optical system which is made up of a plurality of lens groups (three in FIGS. 35-37) and an erecting prism system 55 composed of erecting prisms 55a, 55b and 55c, and whose focal length varies in association with the zoom lens that is the taking optical system 41. An object image formed by the finder objective optical system 53 is in turn formed on the field frame 57 of the erecting prism system 55 that is an image-erecting member. In the rear of the erecting prism system 55 there is an eyepiece optical system 59 located for guiding an erected image into the eyeball E of an observer. It is here noted that a cover member 50 is provided on the exit side of the eyepiece optical system 59.

Figure 38:
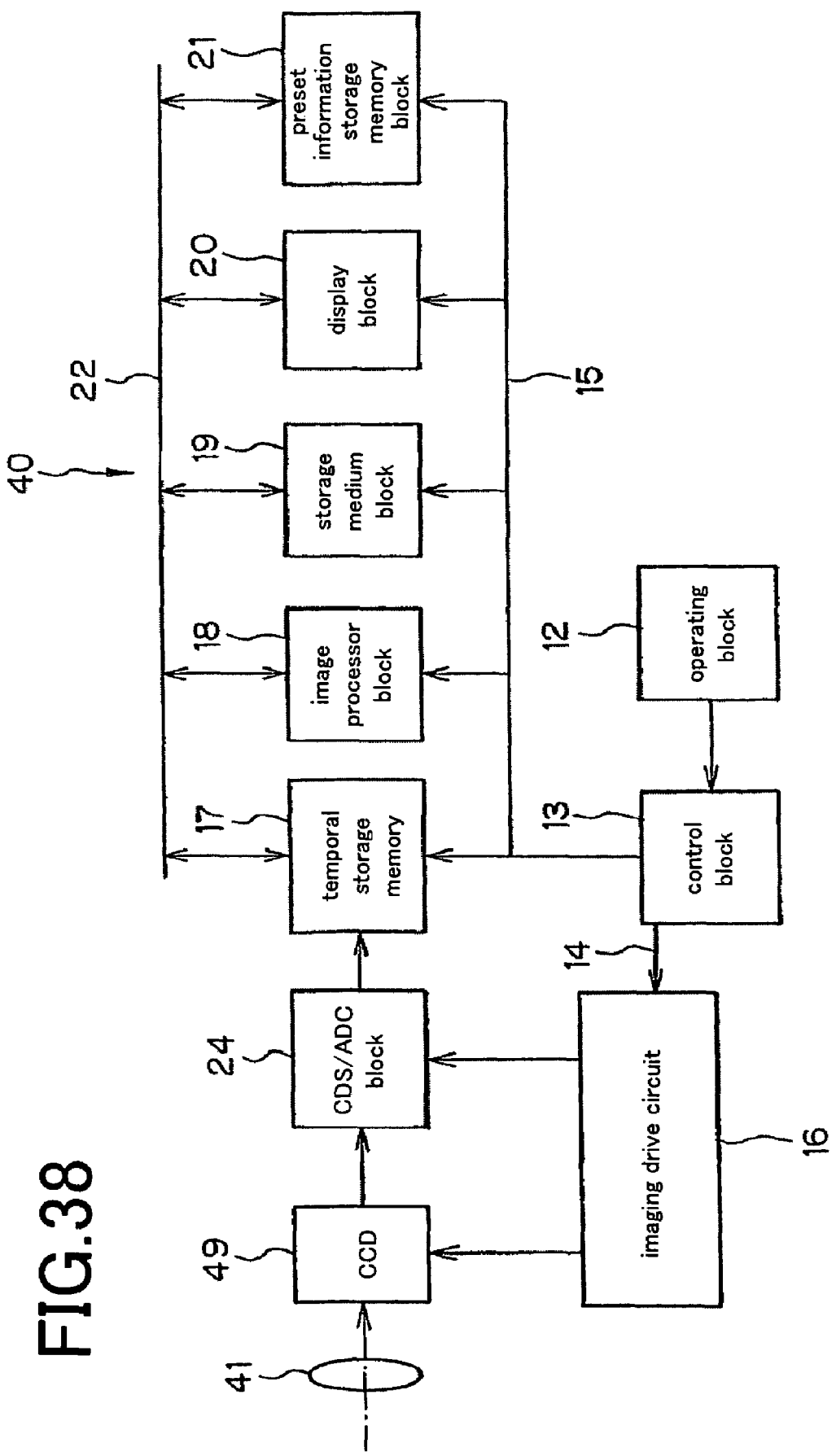
FIG. 38 is a block diagram of the construction of internal circuits in the main part of the digital camera of FIG. 35.

FIG. 38 is a block diagram for the internal circuits of the main part of the aforesaid digital camera 40. In the following explanation, the aforesaid processing means 51 comprises, for instance, a CDS/ADC block 24, a temporal storage memory block 17, an image processor block 18 and so on, and the storage means 52 comprises, for instance, a storage medium block 19 and so on.

As shown in FIG. 38, the digital camera 40 is built up of an operating block 12, a control block 13 connected to the operating block 12 and an imaging drive circuit 16 connected to the control signal output port of the control block 13 via buses 14 and 15 as well as a temporal storage memory 17, an image processor block 18, a storage medium block 19, a display block 20 and a preset information storage memory block 21.

Data may be entered in or produced out of the aforesaid temporal storage memory block 17, image processor block 18, storage medium block 19, display block 20 and preset information storage memory block 21 via bus 21, and the imaging drive circuit 16 is connected with CCD 49 and CDS/ADC block 24.

The operating block 12 comprising various input buttons and switches is a circuit through which event information entered from outside (a camera operator) via such input buttons and switches is notified to the control block. The control block 13 is a central processor comprising a CPU as an example: it is a circuit that, according to a program loaded in a program memory (not shown) stored therein, puts the whole digital camera 40 under control in response to the instruction and order entered by the camera operator via the operating block 12.

The CCD 49 receives an object image formed through the inventive taking optical system 41. The CCD 49 is an imaging device that is driven and controlled by the imaging drive circuit 16 to convert the quantity of light of that object image for each pixel into an electric signal and produce it to the CDS/ADC block 24.

The CDS/ADC block 24 is a circuit that amplifies an electric signal entered from CCD 49 and subjects it to analog/digital conversion to produce image raw data (Bayer data: hereinafter called RAW data) only subjected to such amplification and digital conversion to the temporal storage memory 17.

The temporal storage memory 17 is a buffer comprising SDRAM for instance: it is a memory device that temporarily stores the aforesaid RAW data produced out of the CDS/ADC block 24. The image processor block 18 is a circuit that reads the RAW data stored in the temporal storage memory 17 or the RAW data stored in the storage medium 19 to implement a variety of image processing including distortion correction on the basis of an image quality parameter designated from the control block 13.

The recording medium block 19 is a control circuit that detachably receives a card type or stick type recording medium comprising, for instance, a flash memory or the like so that the RAW data transferred from the temporal storage memory 17 or the image data subjected to image processing at the image processor block 18 are recorded and loaded in the card type or stick type flash memory.

The display block 20 is a circuit that comprises a liquid crystal display monitor 47 to display images, menus or the like on that liquid crystal display monitor 47. The preset information storage memory block 21 comprises a ROM block having various image quality parameters previously loaded in it and a RAM block in which an image quality parameter selected by input operation at the operating block 12 from the image quality parameters read out of that ROM block is stored. The preset information storage memory block 21 is a control that puts inputs in and outputs from those memories under control.

With the thus constructed digital camera 40, it is possible to achieve high performance, size reductions and a wide-angle arrangement, because the taking optical system 41 incorporated in it has high zoom capabilities and extremely stable image-formation capabilities all over the zoom zones, albeit having a sufficient wide-angle arrangement and compact construction. And faster focusing operation is achievable on the wide-angle and telephoto sides.

The present invention may be applied to just only the so-called compact digital camera adapted to take pictures of general subjects but also surveillance cameras required to have wide angles of view and lens interchangeable type cameras.

What is claimed is:

1. A zoom lens, comprising, in order from an object side thereof,
   a first lens group having negative refracting power,
   a second lens group having positive refracting power,
   a third lens group having negative refracting power, and
   a fourth lens group having positive refracting power, wherein:
   said first lens group consists of one negative lens component wherein one negative lens and one positive lens are cemented together;
   upon zooming from a wide-angle end to a telephoto end of the zoom lens,
   said second lens group moves toward the object side, and
   said third lens group moves, with a decreasing spacing between said first lens group and said second lens group, a changing spacing between said second lens group and said third lens group, and a changing spacing between said third lens group and said fourth lens group; and
   when a near-intermediate zooming state is defined as any zooming state where a focal length of the whole zoom lens system is from $0.9 \times \sqrt{(fw \cdot ft)}$ to $1.05 \times \sqrt{(fw \cdot ft)}$ where fw is a focal length of the whole zoom lens system at the wide-angle end and ft is a focal length of the whole zoom lens system at the telephoto end, said third lens group satisfies the following condition in any near-intermediate zooming state:

$$\Delta 3G(s)/fw \leq 0 \quad (1)$$

where $\Delta 3G(s)$ is a positional difference of the third lens group at the wide-angle end relative to the near-intermediate zooming state provided that plus and minus signs are indicative of directions of travel of the lens groups toward the object side and an image side, respectively.

2. The zoom lens according to claim 1, which satisfies the following condition:

$$-0.2 < (D3(w) - D3(s))/fw < 0.3 \quad (2)$$

where D3(w) is the spacing between the third lens group and the fourth lens group at the wide-angle end, and
   D3(s) is the spacing between the third lens group and the fourth lens group in any near-intermediate zooming state that satisfies condition (1).

3. The zoom lens according to claim 1, which satisfies the following condition:

$$0.1 < \Sigma G1d/fw < 0.25 \quad (7)$$

where $\Sigma G1d$ is a thickness of the first lens group on an optical axis, and
   fw is a focal length of the whole zoom lens system at the wide-angle end.

4. The zoom lens according to claim 3, wherein a lens surface located nearest to an image side in said first lens group is a concave surface, wherein said lens surface is an aspheric surface.

5. The zoom lens according to claim 3, wherein a lens surface located nearest to the object side in said first lens group is a concave surface, wherein said lens surface is an aspheric surface having negative refracting power decreasing with a distance from the optical axis.

6. The zoom lens according to claim 3, wherein said positive lens in said first lens group is made of a resin material.

7. The zoom lens according to claim 6, wherein said positive lens in said first lens group is made of an energy-curing type resin, and said negative lens component in said first lens group has said positive lens formed directly on its lens surface.

8. The zoom lens according to claim 3, wherein a cementing surface of said positive lens and said negative lens in said first lens group is an aspheric surface.

9. The zoom lens according to claim 3, which satisfies the following condition:

$$30 < (vdL1n - vdL1p) < 50 \quad (8)$$

where vdL1n is an Abbe constant of the negative lens in the first lens group, and vdL1p is an Abbe constant of the positive lens in said first lens group.

10. The zoom lens according to claim 1, wherein said second lens group consists of, in order from the object side, a positive lens component having positive refracting power and a negative lens component having negative refracting power.

11. The zoom lens according to claim 1, wherein said second lens groups consists of, in order from the object side, a first positive lens element and a cemented lens of a second positive lens element and a negative lens element.

12. The zoom lens according to claim 1, wherein said second lens group consists of, in order from the object side, a positive lens element and a negative lens element.

13. The zoom lens according to claim 12, which satisfies the following conditions:

$$ndL2p > 1.65 \quad (10A)$$

$$vdL2p > 40.0 \quad (10B)$$

$$vdL2n < 30.0 \quad (10C)$$

where ndL2p is a d-line refractive index of the positive lens in the second lens group, vdL2p is an Abbe constant of the positive lens in the second lens group, and vdL2n is an Abbe constant of the negative lens in said second lens group.

14. The zoom lens according to claim 1, wherein a lens surface located nearest to the object side in said second lens group is an aspheric surface.

15. The zoom lens according to claim 1, wherein said third lens group consists of one negative lens element.

16. The zoom lens according to claim 15, wherein said negative lens in said third lens group includes at least one aspheric surface.

17. The zoom lens according to claim 15, wherein said negative lens in said third lens group has an aspheric lens surface on an image plane side.

18. The zoom lens according to claim 15, wherein said negative lens in said third lens group is made of a resin material.

19. The zoom lens according to claim 1, which satisfies the following condition:

$$2.2 < \{\beta2(t)/\beta2(w)\}/\{\beta3(t)/\beta3(w)\} < 3.0 \quad (11)$$

where $\beta2(t)$ is a transverse magnification of the second lens group at the telephoto end, $\beta2(w)$ is a transverse magnification of the second lens group at the wide-angle end, $\beta3(t)$ is a transverse magnification of the third lens group at the telephoto end, and $\beta3(w)$ is a transverse magnification of the third lens group at the wide-angle end.

20. The zoom lens according to claim 1, wherein said fourth lens group consists of one positive lens element.

21. The zoom lens according to claim 20, wherein said positive lens in said fourth lens group includes at least one aspheric surface.

22. The zoom lens according to claim 20, wherein said positive lens in said fourth lens group has an aspheric lens surface located nearest to the image plane side.

23. The zoom lens according to claim 20, wherein said positive lens in said fourth lens group is made of a resin material.

24. The zoom lens according to claim 1, wherein said fourth lens group is positioned more on the image side at the telephoto end than at the wide-angle end.

25. An imaging apparatus, comprising:
a zoom lens as recited in claim 1, and
an imaging device located on an image side of said zoom lens and adapted to convert an image formed by said zoom lens into an electrical signal.

26. A zoom lens, comprising, in order from an object side thereof,
a first lens group having negative refracting power,
a second lens group having positive refracting power,
a third lens group having negative refracting power, and
a fourth lens group having positive refracting power, wherein:
said first lens group consists of one negative lens component wherein one negative lens and one positive lens are cemented together;
upon zooming from a wide-angle end to a telephoto end of the zoom lens,
said first lens group moves toward an image plane side and then turns back and moves toward the object side,
said second lens group moves toward the object side, and
said third lens group moves, with a decreasing spacing between said first lens group and said second lens group, a changing spacing between said second lens group and said third lens group, and a changing spacing between said third lens group and said fourth lens group; and
when letting fw being a focal length of the whole zoom lens system at the wide-angle end, and a zooming state at the shortest whole length be a zooming state where the first lens group is positioned nearest to the image plane side, said third lens group satisfies the following condition:

$$\Delta 3G(s)/fw \leqq 0 \quad (3)$$

where $\Delta 3G(s)$ is a positional difference of the third lens group at the wide-angle end relative to the zooming state at the shortest whole length provided that plus and minus signs are indicative of directions of travel of the lens groups toward the object side and an image side, respectively.

27. The zoom lens according to claim 26, which satisfies the following condition:

$$0.9 < fs/\sqrt{(fw \cdot ft)} < 1.10 \quad (3A)$$

where fs is a focal length of the whole zoom lens system in a zooming state where, upon zooming, the first lens group is positioned nearest to the image plane side, and
ft is a focal length of the whole zoom lens system at the telephoto end.

28. The zoom lens according to claim 26, which satisfies the following condition:

$$-0.2 < (D3(w) - D3(s))/fw < 0.3 \quad (4)$$

where D3(w) is the spacing between the third lens group and the fourth lens group at the wide-angle end, and
D3(s) is the spacing between the third lens group and the fourth lens group in the zooming state at the shortest whole length.

29. The zoom lens according to claim 26, which satisfies the following condition:

$$-0.5 < \Delta 1G(s)/fw < -0.1 \quad (5)$$

where Δ1G(s) is a positional difference of the first lens group at the wide-angle end relative to the zooming state at the shortest whole length provided that plus and minus signs are indicative of directions of travel of the lens groups toward the object side and the image side, respectively.

30. A zoom lens, comprising, in order from an object side thereof,
a first lens group having negative refracting power,
a second lens group having positive refracting power,
a third lens group having negative refracting power, and
a fourth lens group having positive refracting power, wherein:
said first lens group consists of one negative lens component wherein one negative lens and one positive lens are cemented together; and
upon zooming from a wide-angle end to a telephoto end of the zoom lens,
said second lens group moves toward the object side, and
said third lens group moves toward an image side plane and then turns back and moves toward the object side, with a decreasing spacing between said first lens group and said second lens group, a changing spacing between said second lens group and said third lens group and a changing spacing between said third lens group and said fourth lens group.

31. The zoom lens according to claim 30, which satisfies the following condition:

$$-0.2 < (D3(w) - D3(s))/fw < 0.3 \tag{6}$$

where D3(w) is the spacing between the third lens group and the fourth lens group at the wide-angle end,
D3(s) is the spacing between the third lens group and the fourth lens group in a zooming state where the third lens group is positioned nearest to an image plane side, and
fw is a focal length of the zoom lens at the wide-angle end.

32. An imaging apparatus, comprising:
a zoom lens, and
an imaging device located on an image side of said zoom lens and adapted to convert an image formed by said zoom lens into an electrical signal, wherein said zoom lens comprises, in order from an object side thereof,
a first lens group having negative refracting group,
a second lens group having positive refracting power,
a third lens group having negative refracting power, and
a fourth lens group having positive refracting power, wherein:
said first lens group consists of one negative lens component wherein one negative lens and one positive lens are cemented together;
upon zooming from a wide-angle end to a telephoto end of the zoom lens,
there is a decreasing spacing between said first lens group and second lens group,
there is a changing spacing between said second lens group and said third lens group, and
there is a changing spacing between said third lens group and said fourth lens group; and
said zoom lens satisfies the following condition:

$$-1.2 < Hf2/Y < -0.7 \tag{13}$$

where Hf2 is a distance on an optical axis from an object-side lens surface in said second lens group to a front principal point of the second lens group, provided that there is a minus sign involved when the front principal point is on an object side with respect to the second lens group, and
Y is a maximum image height within a possible effective imaging area.

33. The imaging apparatus according to claim 32, which satisfies the following condition:

$$0.1 < \Sigma G1d/fw < 0.25 \tag{7}$$

where ΣG1d is a thickness of the first lens group on an optical axis, and
fw is a focal length of the whole zoom lens system at the wide-angle end.

34. The imaging apparatus according to claim 32, wherein a lens surface located nearest to an image side in said first lens group is a concave surface, wherein said lens surface is an aspheric surface.

35. The imaging apparatus according to claim 34, wherein said aspheric surface is such that said lens surface has negative refracting power decreasing with a distance from an optical axis.

36. The imaging apparatus according to claim 32, wherein said positive lens in said first lens group is made of a resin material.

37. The imaging apparatus according to claim 36, wherein said positive lens in said first lens group is made of an energy-curing type resin, and said negative lens component in said first lens group has said positive lens formed directly on its lens surface.

38. The imaging apparatus according to claim 32, wherein a cementing surface of said positive lens and said negative lens in said first lens group is an aspheric surface.

39. The imaging apparatus according to claim 32, which satisfies the following condition:

$$30 < (vdL1n - vdL1p) < 50 \tag{8}$$

where vdL1n is an Abbe constant of the negative lens in the first lens group, and
vdL1p is an Abbe constant of the positive lens in said first lens group.

40. The imaging apparatus according to claim 32, wherein said second lens group consists of, in order from the object side, a positive lens component having positive refracting power and a negative lens component having negative refracting power.

41. The imaging apparatus according to claim 32, wherein said second lens groups consists of, in order from the object side, a first positive lens element and a cemented lens of a second positive lens element and a negative lens element.

42. The imaging apparatus according to claim 32, wherein said second lens group consists of, in order from the object side, a positive lens element and a negative lens element.

43. The imaging apparatus according to claim 42, which satisfies the following conditions:

$$ndL2p > 1.65 \tag{10A}$$

$$vdL2p > 40.0 \tag{10B}$$

$$vdL2n < 30.0 \tag{10C}$$

where ndL2p is a d-line refractive index of the positive lens in the second lens group,
vdL2p is an Abbe constant of the positive lens in the second lens group, and
vdL2n is an Abbe constant of the negative lens in said second lens group.

44. The imaging apparatus according to claim 32, wherein a lens surface located nearest to the object side in said second lens group is an aspheric surface.

45. The imaging apparatus according to claim 32, wherein said third lens group consists of one negative lens element.

46. The imaging apparatus according to claim 45, wherein said negative lens in said third lens group includes at least one aspheric surface.

47. The imaging apparatus according to claim 45, wherein said negative lens in said third lens group has an aspheric lens surface on the image plane side.

48. The imaging apparatus according to claim 45, wherein said negative lens in said third lens group is made of a resin material.

49. The imaging apparatus according to claim 32, which satisfies the following condition:

$$2.2<\{\beta 2(t)/\beta 2(w)\}/\{\beta 3(t)/\beta 3(w)\}<3.0 \tag{11}$$

where $\beta 2(t)$ is a transverse magnification of the second lens group at the telephoto end,
- $\beta 2(w)$ is a transverse magnification of the second lens group at the wide-angle end,
- $\beta 3(t)$ is a transverse magnification of the third lens group at the telephoto end, and
- $\beta 3(w)$ is a transverse magnification of the third lens group at the wide-angle end.

50. The imaging apparatus according to claim 32, wherein said fourth lens group consists of one positive lens element.

51. The imaging apparatus according to claim 50, wherein said positive lens in said fourth lens group includes at least one aspheric surface.

52. The imaging apparatus according to claim 50, wherein said positive lens in said fourth lens group has an aspheric lens surface located nearest to the image plane side.

53. The imaging apparatus according to claim 50, wherein said positive lens in said fourth lens group is made of a resin material.

54. The imaging apparatus according to claim 32, wherein an aperture stop is interposed between a space on an object side and a space on an image side of the second lens group, wherein said aperture stop moves together with the second lens group.

55. The imaging apparatus according to claim 54, wherein upon zooming from the wide-angle end to the telephoto end,
- said first lens group moves toward the image plane side, and then turns back and moves toward the object side,
- said second lens group moves toward the object side,
- said third lens group moves such that a distance with the second lens group grows longer at the telephoto end than at the wide-angle end, and
- said fourth lens group moves more toward the image plane side at the telephoto end than at the wide-angle end.

56. The imaging apparatus according to claim 54, wherein, when any zooming state where a focal length of the whole zoom lens system becomes from $0.95\times\sqrt{(fw\cdot ft)}$ to $1.05\times\sqrt{(fw\cdot ft)}$ is defined as a near-intermediate zooming state, the zoom lens satisfies the following conditions in any near-intermediate zooming state:

$$-0.6<\Delta 1GWS/fw<-0.1 \tag{6}$$

$$-4.0<\Delta 1GWS/\Delta 1GST<-0.25 \tag{7}$$

$$0.3<\Delta 2GWS/\Delta 2GST<0.95 \tag{8}$$

$$-20.0<\Delta 3GWS/\Delta 3GST<0.5 \tag{9}$$

$$-0.5<\Delta 4GST/\Delta 4GWS<1.5 \tag{10}$$

where $\Delta 1GWS$ is a positional difference of the first lens group at the wide-angle end relative to the near-intermediate zooming state,
- $\Delta 2GWS$ is a positional difference of the second lens group at the wide-angle end relative to the near-intermediate zooming state,
- $\Delta 3GWS$ is a positional difference of the third lens group at the wide-angle end relative to the near-intermediate zooming state,
- $\Delta 4GWS$ is a positional difference of the fourth lens group at the wide-angle end relative to the near-intermediate zooming state,
- $\Delta 1GST$ is a positional difference of the first lens group at the telephoto end relative to the near-intermediate zooming state,
- $\Delta 2GST$ is a positional difference of the second lens group at the telephoto end relative to the near-intermediate zooming state,
- $\Delta 3GST$ is a positional difference of the third lens group at the telephoto end relative to the near-intermediate zooming state, and
- $\Delta 4GST$ is a positional difference of the fourth lens group at the telephoto end relative to the near-intermediate zooming state, provided that plus and minus signs are indicative of directions of travel of the lens groups toward the object side and the image side, respectively, $\Delta 3GST$ is a positive value and $\Delta 4GWS$ is a negative value, and
- fw is a focal length of the zoom lens at the wide-angle end.

* * * * *